United States Patent
Chino

(10) Patent No.: US 8,390,578 B2
(45) Date of Patent: Mar. 5, 2013

(54) SENSING DEVICE, DISPLAY DEVICE, ELECTRONIC APPARATUS, AND SENSING METHOD

(75) Inventor: Taketo Chino, Hokuto (JP)

(73) Assignee: Sony Corporation, Tokyo (JP)

( * ) Notice: Subject to any disclaimer, the term of this patent is extended or adjusted under 35 U.S.C. 154(b) by 1060 days.

(21) Appl. No.: 12/368,729

(22) Filed: Feb. 10, 2009

(65) Prior Publication Data

US 2009/0207154 A1 Aug. 20, 2009

(30) Foreign Application Priority Data

Feb. 18, 2008 (JP) ................................. 2008-035640
Feb. 18, 2008 (JP) ................................. 2008-035641
Feb. 18, 2008 (JP) ................................. 2008-035646
Feb. 18, 2008 (JP) ................................. 2008-035647

(51) Int. Cl.
    *G06F 3/041* (2006.01)
(52) U.S. Cl. ..... 345/173; 345/104; 345/175; 178/18.01; 178/18.03; 178/18.09
(58) Field of Classification Search ................. 345/156, 345/157, 173–179, 104; 178/18.01–18.07, 178/19.01, 19.03–19.05
    See application file for complete search history.

(56) References Cited

U.S. PATENT DOCUMENTS

| 7,277,087 | B2 | 10/2007 | Hill et al. | |
|---|---|---|---|---|
| 2002/0171635 | A1* | 11/2002 | Takahashi et al. | 345/177 |
| 2007/0229466 | A1* | 10/2007 | Peng et al. | 345/173 |
| 2007/0291016 | A1* | 12/2007 | Philipp | 345/174 |

FOREIGN PATENT DOCUMENTS

| JP | 04-308916 | 10/1992 |
|---|---|---|
| JP | HEI 07-200148 | 8/1995 |
| JP | HEI 08-129444 | 5/1996 |
| JP | 10-187331 | 7/1998 |
| JP | 2004-318819 | 11/2004 |
| JP | A-2004-318819 | 11/2004 |

(Continued)

OTHER PUBLICATIONS

Japanese Office Action for corresponding JP2008-035640 issued on Apr. 27, 2010.

(Continued)

*Primary Examiner* — Lun-Yi Lao
*Assistant Examiner* — Insa Sadio
(74) *Attorney, Agent, or Firm* — K&L Gates LLP

(57) ABSTRACT

A sensing device includes: a plurality of sensors that are arrayed on a screen and that generate first detection signals each having a level corresponding to a touch state of an object on the screen or a distance between the object and the screen; a read unit that reads the first detection signals from the plurality of sensors at predetermined periods; a binarization unit that compares a level of each of the first detection signals read by the read unit with a threshold value and generates a second detection signal that is binarized; a determination unit that determines whether or not the object touches the screen on the basis of each second detection signal; a detection unit that detects a touch position of the object on the screen on the basis of each second detection signal; and a control unit that controls the read unit such that the predetermined period becomes a first period when the determination unit determines that there is no touch and that controls the read unit such that the predetermined period becomes a second period shorter than the first period when the determination unit determines that there is a touch.

16 Claims, 16 Drawing Sheets

FOREIGN PATENT DOCUMENTS

| | | |
|---|---|---|
| JP | 2006-011568 | 1/2006 |
| JP | 2006-106844 | 4/2006 |
| JP | 2006-244218 | 9/2006 |
| JP | 2007-011152 | 1/2007 |
| JP | 2007-128497 | 5/2007 |
| JP | 2007-163891 | 6/2007 |
| JP | 2007-524970 | 8/2007 |

OTHER PUBLICATIONS

Japanese Office Action for corresponding JP2008-035647 issued on May 11, 2010.

Japanese Office Action issued on Nov. 9, 2010, for corresponding Japanese Patent Application No. 2008-035640.

\* cited by examiner

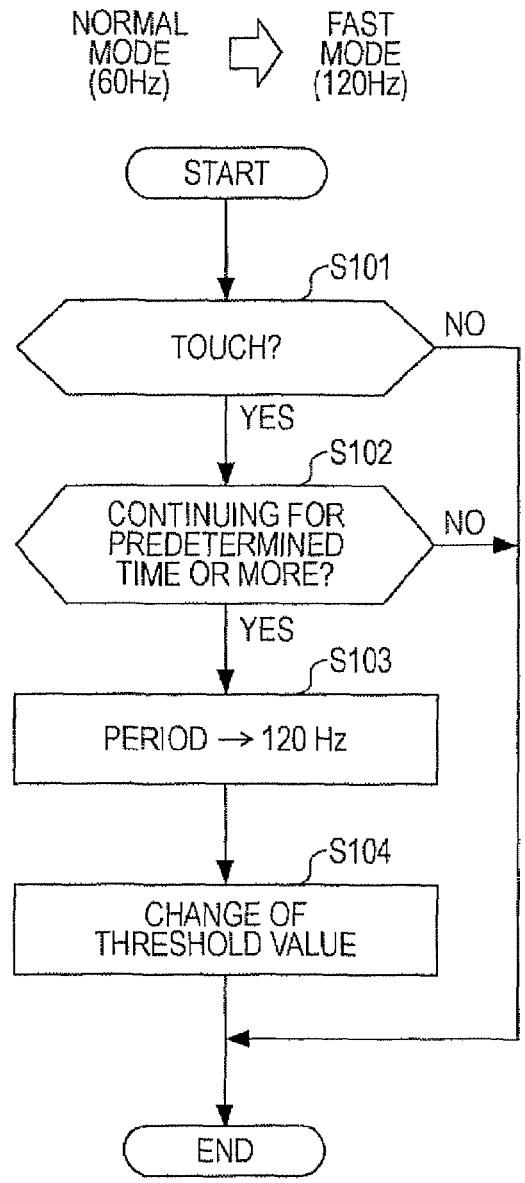
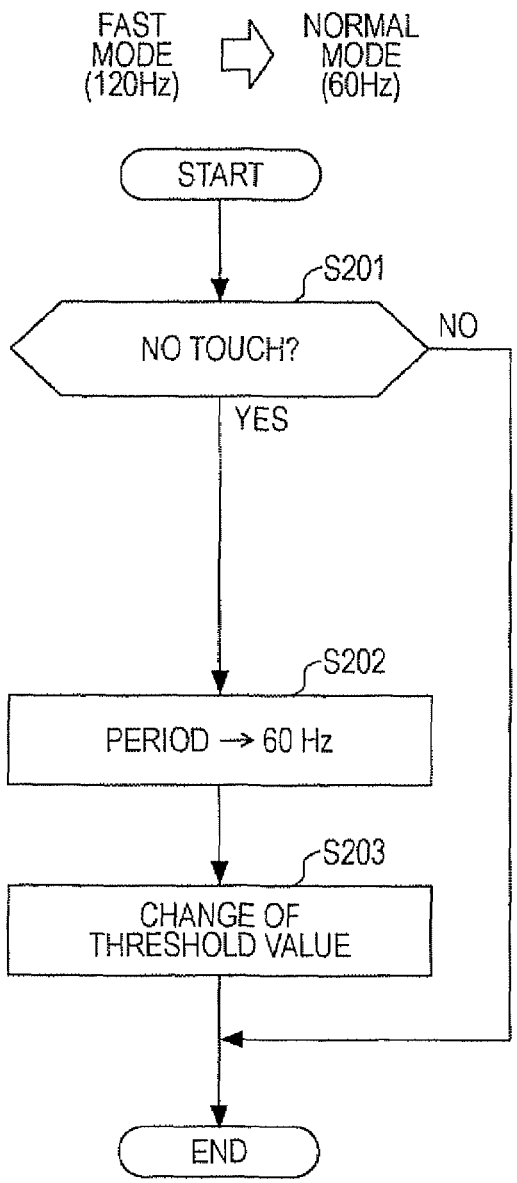

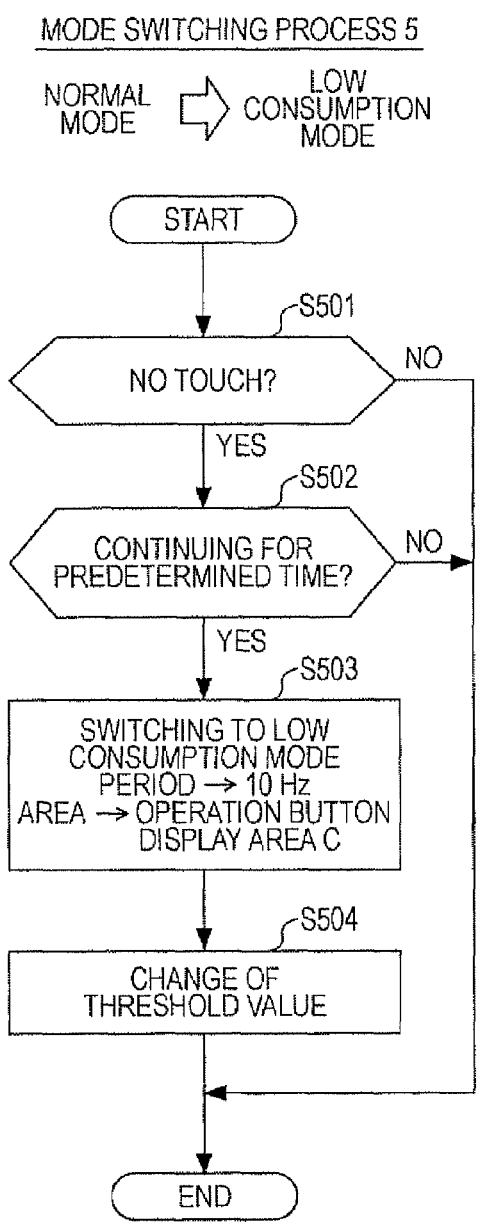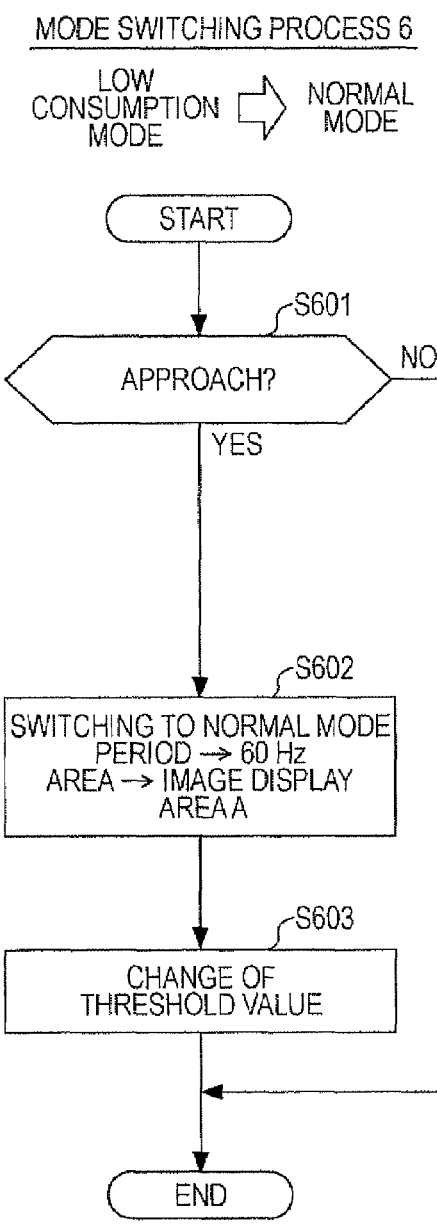

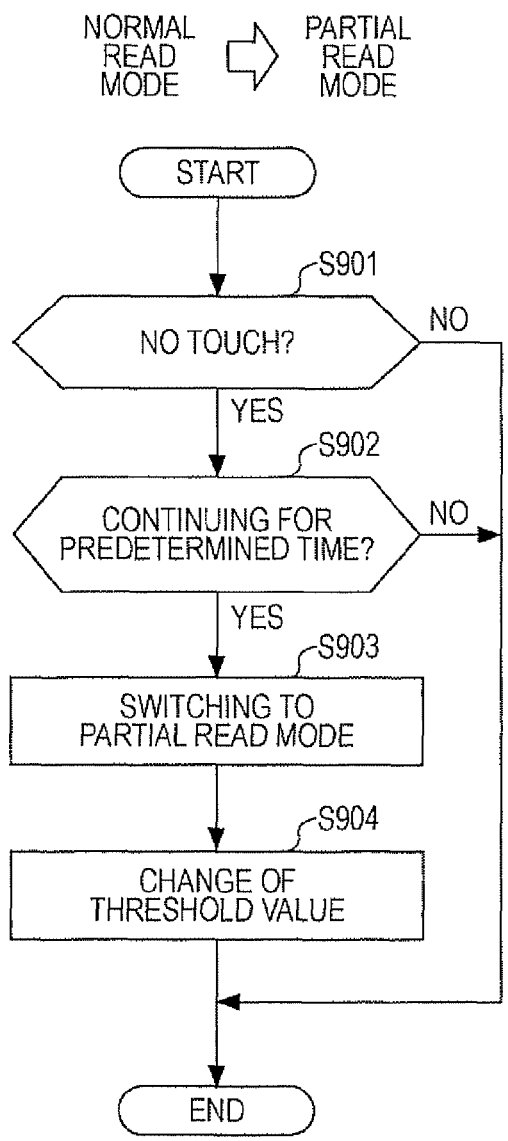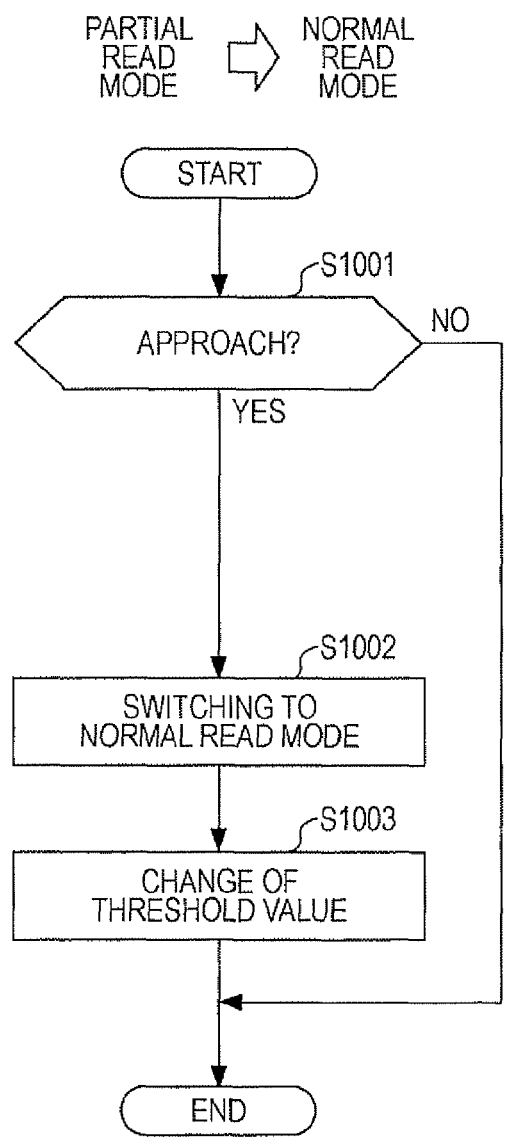

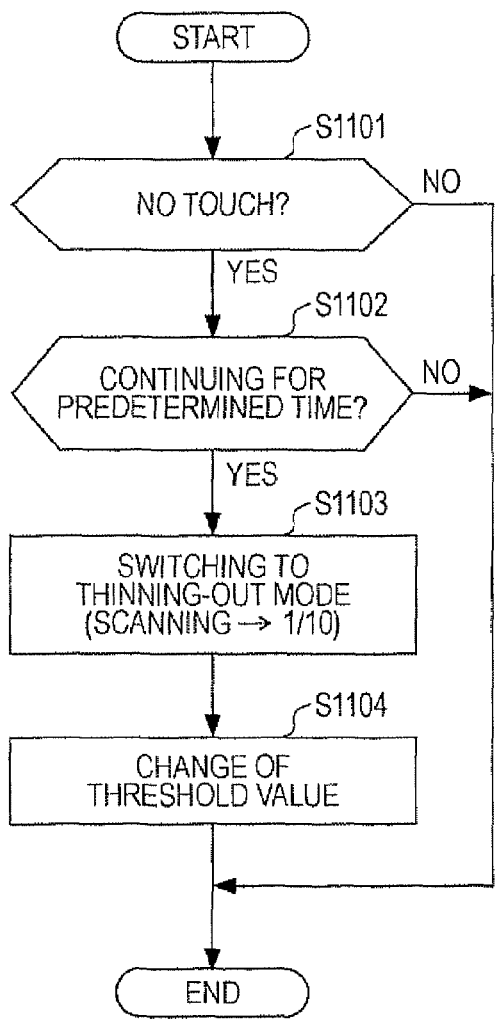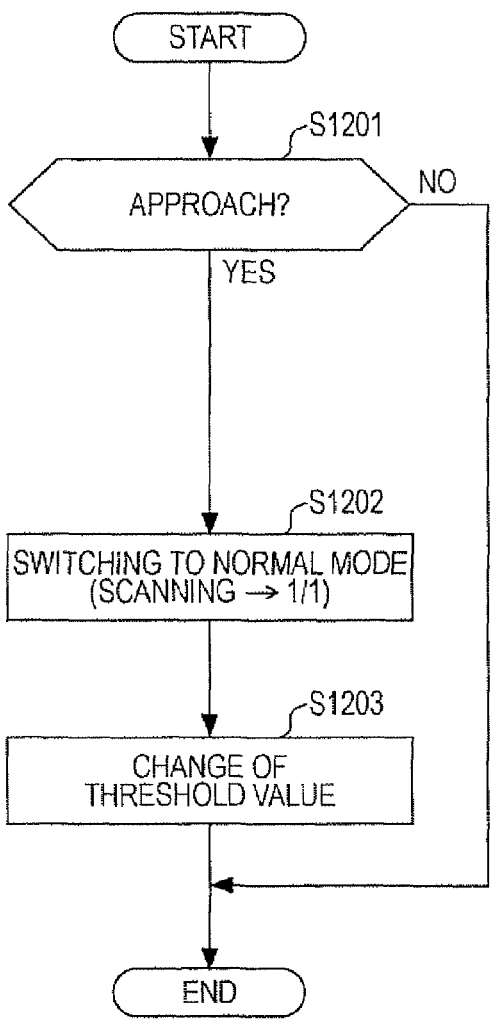

SENSING DEVICE, DISPLAY DEVICE, ELECTRONIC APPARATUS, AND SENSING METHOD

BACKGROUND

1. Technical Field

The present invention relates to a technique of detecting the touch position of an object, such as a finger or a pen, on a screen.

2. Related Art

A liquid crystal display device that detects the coordinate position on a screen designated by a finger or a light pen is disclosed in JP-A-2004-318819. The liquid crystal display device includes an image reading sensor 33, which images incident light, for every pixel and detects the coordinate position from a change of imaging data when the finger or the light pen approaches or touches the screen. In addition, in the liquid crystal display device, the imaging data is not read from all image reading sensors 33 arrayed in a pixel array section 1, but is read for every four rows in the row direction and for every three columns in the column direction.

In the liquid crystal display device disclosed in JP-A-2004-318819, the coordinate position designated by the finger or the light pen is always detected at the same period. Accordingly, for example, when a detection period of the coordinate position is 60 Hz, it is not possible to trace the high-speed movement of a finger or light pen. This makes it difficult to smoothly input a handwritten image or the like by touch input. On the other hand, when the detection period of the coordinate position is about 120 Hz, it is possible to sufficiently trace the high-speed movement of the finger or light pen. In this case, however, the power consumption increases in proportion to the shortened detection period.

SUMMARY

An advantage of some aspects of the invention is to make it possible to smoothly perform touch input while reducing the power consumption.

According to a first aspect of the invention, a sensing device includes: a plurality of sensors that are arrayed on a screen and that generate first detection signals each having a level corresponding to a touch state of an object on the screen or a distance between the object and the screen; a read unit that reads the first detection signals from the plurality of sensors at predetermined periods; a binarization unit that compares a level of each of the first detection signals read by the read unit with a threshold value and generates a second detection signal that is binarized; a determination unit that determines whether or not the object touches the screen on the basis of each second detection signal; a detection unit that detects a touch position of the object on the screen on the basis of each second detection signal; and a control unit that controls the read unit such that the predetermined period becomes a first period when the determination unit determines that there is no touch and that controls the read unit such that the predetermined period becomes a second period shorter than the first period when the determination unit determines that there is a touch.

According to such a configuration, the read unit reads the first detection signals for one screen at the first periods when the object does not touch the screen and reads the first detection signals for one screen at the second periods shorter than the first period when the object touches the screen. Accordingly, when the object does not touch the screen, the frequency at which the first detection signals for one screen are read can be reduced compared with that when the object touches the screen. For example, assuming that the first period is 60 Hz and the second period is 120 Hz, the frequency at which the first detection signals for one screen are read when the object does not touch the screen can be reduced to ½ of that when the object touches the screen. As a result, since the process load required for reading of the first detection signals or generation of binary signals can be reduced, the power consumption can be reduced in proportion to the reduced load. On the other hand, when the object touches the screen, the frequency at which the first detection signals for one screen are read can be increased compared with that when the object does not touch the screen. As a result, since the temporal resolution related to detection of a touch position is raised, it becomes possible to sufficiently trace the movement of an object even if the object moves at high speed.

Thus, according to the first aspect of the invention, a period in which the first detection signals for one screen are read may be changed, and the first detection signals for one screen are read at short periods only when the object touches the screen. Therefore, the power consumption can be reduced, and the touch input can be smoothly performed while tracing the movement of the object even if the object moves at high speed.

In addition, examples of the 'being arrayed on the screen' include a case where a touch panel including a plurality of sensors is bonded to a screen and a case where a plurality of sensors are built in a display panel as described in the following embodiments. In addition, the 'object' is a finger or a touch pen, for example. In addition, the level of the first detection signal generated by the sensor varies with a 'touch state of an object on the screen' in case of a touch panel that is of a resistance film type or a capacitive type and varies with a 'distance between the object and the screen' in case of a touch panel using an optical sensor as described in the following embodiments.

In the sensing device described above, the control unit may control the read unit such that the predetermined period becomes the first period when the determination unit determines that there is no touch and when the determination unit determines that there is a touch but the touch does not continue for a predetermined time or more and may control the read unit such that the predetermined period becomes the second period shorter than the first period when the determination unit determines that the touch continues for the predetermined time or more.

According to such a configuration, the frequency at which the first detection signals for one screen are read can be increased only when the object touches the screen continuously for the predetermined time or more. This is because if a period, in which the first detection signals for one screen are read as soon as the object touches the screen without considering the touch time, is set short, a change in period frequently occurs and accordingly, the power consumption may increase, which will be described in the following embodiments. In addition, the predetermined time may be arbitrarily set.

Furthermore, according to a second aspect of the invention, a sensing device includes: a plurality of sensors that are arrayed on a screen and that generate first detection signals each having a level corresponding to a touch state of an object on the screen or a distance between the object and the screen; a read unit that reads the first detection signals from the plurality of sensors at predetermined periods; a binarization unit that compares a level of each of the first detection signals read by the read unit with a threshold value and generates a second detection signal that is binarized; a determination unit that determines whether or not the object touches the screen on the basis of each second detection signal; a detection unit that detects a touch position of the object on the screen on the basis of each second detection signal; and a control unit that controls the read unit such that the predetermined period becomes a first period when reception of touch input starts and that controls the read unit such that the predetermined period becomes a second period shorter than the first period when the determination unit determines that there is a touch.

According to such a configuration, the read unit reads the first detection signals for one screen at the first periods when the reception of touch input starts and reads the first detection signals for one screen at the second periods shorter than the first period only when the object touches the screen. Accordingly, it becomes possible to increase the frequency at which the first detection signals for one screen are read only when the object touches the screen after starting reception of touch input, while reducing the frequency at which the first detection signals for one screen are read in other cases. As a result, the power consumption can be reduced. In addition, even if the object moves at high speed, the touch input can be smoothly performed while tracing the movement.

In the sensing device described above, the control unit may control the read unit such that the predetermined period becomes the first period when reception of touch input starts and control the read unit such that the predetermined period becomes the second period shorter than the first period when the determination unit determines that the touch continues for a predetermined time or more. According to such a configuration, the frequency at which the first detection signals for one screen are read can be increased only when the object touches the screen continuously for the predetermined time or more.

Furthermore, according to a third aspect of the invention, a sensing device includes: a plurality of sensors that are arrayed on a screen and that generate first detection signals each having a level corresponding to a touch state of an object on the screen or a distance between the object and the screen; a read unit that reads the first detection signals from the plurality of sensors at predetermined periods; a binarization unit that compares a level of each of the first detection signals read by the read unit with a threshold value and generates a second detection signal that is binarized; a determination unit that determines whether or not the object touches the screen on the basis of each second detection signal; a detection unit that detects a touch position of the object on the screen on the basis of each second detection signal; and a control unit that controls the read unit such that the predetermined period becomes a second period shorter than a first period when reception of touch input starts and that controls the read unit such that the predetermined period becomes the first period when the determination unit determines that there is no touch.

According to such a configuration, the read unit reads the first detection signals for one screen at the second periods shorter than the first period when the reception of touch input starts and reads the first detection signals for one screen at the first periods only when the object does not touch the screen. Accordingly, it becomes possible to reduce the frequency at which the first detection signals for one screen are read only when the object does not touch the screen after starting reception of touch input, while increasing the frequency at which the first detection signals for one screen are read in other cases. As a result, the power consumption can be reduced. In addition, even if the object moves at high speed, the touch input can be smoothly performed while tracing the movement.

In the sensing device described above, the control unit may control the read unit such that the predetermined period becomes the second period shorter than the first period when reception of touch input starts and control the read unit such that the predetermined period becomes the first period when the determination unit determines that there is no touch continuously for a predetermined time or more.

According to such a configuration, the frequency at which the first detection signals for one screen are read can be reduced only when the object does not touch the screen continuously for the predetermined time or more. This is because when inputting a handwritten character with a finger or a touch pen, for example, the finger or the touch pen is once away from the screen when moving for a next stroke even though it is very short. In this case, when such a read period changes each time, the change in period frequently occurs and accordingly, the power consumption may increase, which will be described in the following embodiments.

In addition, the sensing device described above may further include a change unit that changes the threshold value when the control unit controls the read unit such that the predetermined period becomes the first period and when the control unit controls the read unit such that the predetermined period becomes the second period. In addition, the change unit may set a first threshold value corresponding to the first period as the threshold value when the control unit controls the read unit such that the predetermined period becomes the first period and set a second threshold value corresponding to the second period as the threshold value when the control unit controls the read unit such that the predetermined period becomes the second period.

This is because a signal level of the first detection signal changes with a change in period in which the first detection signals for one screen are read depending on the type of sensor and accordingly, it is difficult to accurately determine whether or not the object touches the screen if the threshold value is not changed, which will be described in the following embodiments.

In addition, in the sensing device described above, the determination unit may count the number of second detection signals, which satisfy a condition set by the threshold value, among all of the second detection signals and determine whether or not the object touches the screen on the basis of the count result. For example, if the count result is 1 or more, it may be determined that the object touches the screen. In addition, if the count result is a predetermined value or more or if the count result is a value in a predetermined range set by upper and lower limits, it may be determined that the object touches the screen. In the latter case, a possibility of incorrect determination can be reduced. In addition, for example, a second detection signal corresponding to the first detection signal with a signal level less than the threshold value or a second detection signal corresponding to the first detection signal with a signal level of the threshold value or more corresponds to the 'second detection signal satisfying the condition set by the threshold value'.

Furthermore, according to a fourth aspect of the invention, a sensing method of detecting a touch position of an object on a screen using a plurality of sensors that are arrayed on the screen and that generate first detection signals each having a level corresponding to a touch state of the object on the screen or a distance between the object and the screen includes: reading the first detection signals from the plurality of sensors at predetermined periods; comparing a level of each of the read first detection signals with a threshold value and generating a second detection signal that is binarized; determining whether or not the object touches the screen on the basis of each second detection signal; detecting the touch position of the object on the screen on the basis of each second detection signal; and controlling reading of the first detection signals such that the predetermined period becomes a first period when it is determined that there is no touch and controlling reading of the first detection signals such that the predetermined period becomes a second period shorter than the first period when it is determined that there is a touch. Also in the sensing method, the same effects as in the sensing devices according to the first to third aspects of the invention can be obtained.

In the liquid crystal display device disclosed in JP-A-2004-318819, the coordinate position is always detected at the same period. Accordingly, even if there is no touch input for a long time, imaging data is read from each image reading sensor 33 at the same period as the case where there is touch input. As a result, the excessive power consumption occurs. In view of the above situation, another advantage of some aspects of the invention is to reduce the power consumption.

According to a fifth aspect of the invention, a sensing device that detects a touch position of an object on a screen includes: a plurality of sensors that are arrayed on the screen and that generate first detection signals each having a level corresponding to an amount of incident light; a read unit that is operable in a normal mode, in which the first detection signals are read from the plurality of sensors at first periods, and a low consumption mode, in which the first detection signals are read from the plurality of sensors at second periods longer than the first period; a binarization unit that compares a level of each of the first detection signals read by the read unit with a threshold value and generates a second detection signal that is binarized; a sensing unit that senses that the object does not touch the screen on the basis of each second detection signal; a detection unit that detects the touch position of the object on the screen on the basis of each second detection signal; and a control unit that controls switching between the normal mode and the low consumption mode, controls the read unit to switch to the low consumption mode when the sensing unit senses that there is no touch continuously for a predetermined time in the normal mode, and controls the read unit to switch from the low consumption mode to the normal mode in a predetermined case.

According to such a configuration, when it is sensed that the object has not touched the screen continuously for a predetermined time, an operation mode of the read unit is switched from the normal mode to the low consumption mode such that the first detection signals for one screen are read at the second periods longer than that in the normal mode. Accordingly, when the object does not touch the screen continuously for the predetermined time or more, the frequency at which the first detection signals for one screen are read can be reduced compared with those in other cases. For example, assuming that the first period is 60 Hz and the second period is 10 Hz, the frequency at which the first detection signals for one screen are read when the object does not touch the screen continuously for the predetermined time or more can be reduced to ⅙ of those in other cases. As a result, since the process load required for reading of the first detection signals or generation of binary signals can be reduced, the power consumption can be reduced in proportion to the reduced load.

In addition, examples of the 'being arrayed on the screen' include a case where a touch panel including a plurality of sensors is bonded to a screen and a case where a plurality of sensors are built in a display panel as described in the following embodiments. In addition, the 'object' is a finger or a touch pen, for example. In addition, the 'predetermined case' refers to a case where it is sensed that the distance between the object and the screen has reached the predetermined distance or less in the low consumption mode, for example, in a configuration in which it can be sensed that the object has approached the screen to cause a distance between the object and the screen to reach a predetermined distance or less. Moreover, in a configuration in which it can be sensed that the object has touched the screen, the 'predetermined case' refers to a case where it can be sensed that the object has touched the screen in the low consumption mode.

Furthermore, according to a sixth aspect of the invention, a sensing device that detects a touch position of an object on a screen includes: a plurality of sensors that are arrayed on the screen and that generate first detection signals each having a level corresponding to an amount of incident light; a read unit that is operable in a normal mode, in which the first detection signals are read from the plurality of sensors at first periods, and a low consumption mode, in which the first detection signals are read from the plurality of sensors at second periods longer than the first period; a binarization unit that compares a level of each of the first detection signals read by the read unit with a threshold value and generates a second detection signal that is binarized; a sensing unit that senses that the object has approached the screen to cause a distance between the object and the screen to reach a predetermined distance or less on the basis of each second detection signal; a detection unit that detects the touch position of the object on the screen; and a control unit that controls switching between the normal mode and the low consumption mode, controls the read unit to switch to the normal mode when the sensing unit senses that the distance between the object and the screen has reached the predetermined distance or less in the low consumption mode, and controls the read unit to switch from the normal mode to the low consumption mode in a predetermined case.

According to such a configuration, the operation mode of the read unit is switched from the low consumption mode to the normal mode when it is sensed that the distance between the object and the screen has reached the predetermined distance or less. Therefore, the read unit operates in the low consumption mode to read the first detection signals for one screen at the second periods longer than that in the normal mode until the distance between the object and the screen reaches the predetermined distance or less. On the other hand, when the distance between the object and the screen reaches the predetermined distance or less, the read unit operates in the normal mode to read the first detection signals for one screen at the first periods shorter than that in the low consumption mode. Accordingly, the frequency at which the first detection signals for one screen are read can be reduced until the distance between the object and the screen reaches the predetermined distance or less. For example, assuming that the first period is 60 Hz and the second period is 10 Hz, the frequency at which the first detection signals for one screen are read can be reduced to ⅙ until the distance between the object and the screen reaches the predetermined distance or less. As a result, since the process load required for reading of the first detection signals or generation of binary signals can be reduced, the power consumption can be reduced in proportion to the reduced load.

In addition, since the frequency at which the first detection signal for one screen are read can be increased when the distance between the object and the screen reaches the predetermined distance or less, the temporal resolution related to touch determination or detection of a touch position can be improved. As a result, the touch determination or the detection of a touch position can be performed with high precision. In particular, by setting the timing for switching from the low consumption mode to the normal mode to a point of time when it is sensed that the distance between the object and the screen has reached the predetermined distance or less rather than a point of time when it is sensed that the object has touched the screen, the precision related to the touch determination or the detection of a touch position before the object actually touches the screen can be improved.

Moreover, the 'predetermined case' refers to a case where it is sensed that the object has not touched the screen continuously for a predetermined time in the normal mode, for example, in a configuration in which it can be sensed that the object does not touch the screen. Moreover, in a configuration in which it can be determined whether or not the object has approached the screen to cause the distance between the object and the screen to reach the predetermined distance or less, the 'predetermined case' refers to a case where a result of determination that the distance between the object and the screen does not reach the predetermined distance or less in the normal mode is obtained continuously for a predetermined time.

Furthermore, according to a seventh aspect of the invention, a sensing device that detects a touch position of an object on a screen includes: a plurality of sensors that are arrayed on the screen and that generate first detection signals each having a level corresponding to an amount of incident light; a read unit that is operable in a normal mode, in which the first detection signals are read from the plurality of sensors at first periods, and a low consumption mode, in which the first detection signals are read from the plurality of sensors at second periods longer than the first period; a binarization unit that uses a first threshold value set to determine whether or not the object has approached the screen to cause a distance between the object and the screen to reach a predetermined distance or less and a second threshold value set to determine whether the object does not touch the screen, compares each of the first detection signals read by the read unit with either the first threshold value or the second threshold value, and generates a second detection signal that is binarized; a sensing unit that senses that the object has approached the screen to cause the distance between the object and the screen to reach the predetermined distance or less on the basis of each second detection signal when the binarization unit generates each second detection signal using the first threshold value and that senses that the object does not touch the screen on the basis of each second detection signal when the binarization unit generates each second detection signal using the second threshold value; a detection unit that detects the touch position of the object on the screen on the basis of each second detection signal when the binarization unit generates each second detection signal using the second threshold value; and a control unit that controls switching between the normal mode and the low consumption mode and change between the first and second threshold values, controls the read unit to switch to the normal mode and controls the binarization unit to generate each second detection signal using the second threshold value when the sensing unit senses that the distance between the object and the screen has reached the predetermined distance or less in the low consumption mode, and controls the read unit to switch to the low consumption mode and controls the binarization unit to generate each second detection signal using the first threshold value when the sensing unit senses that there is no touch continuously for a predetermined time in the normal mode.

According to the configuration, when it is sensed that the object has not touched the screen continuously for a predetermined time, an operation mode of the read unit is switched from the normal mode to the low consumption mode such that the first detection signals for one screen are read at the second periods longer than that in the normal mode. On the other hand, when it is sensed that the distance between the object and the screen has reached the predetermined distance or less, an operation mode of the read unit is switched from the low consumption mode to the normal mode such that the first detection signals for one screen are read at the first periods shorter than that in the low consumption mode. Accordingly, since the sensing device operates in the low consumption mode until it is sensed that the distance between the object and the screen has reached the predetermined distance or less after sensing that the object has not touched the screen continuously for a predetermined time, the frequency at which the first detection signals for one screen are read can be decreased to be smaller than that in the normal mode. As a result, since the process load required for reading of the first detection signals or generation of binary signals can be reduced, the power consumption can be reduced in proportion to the reduced load.

Moreover, since the sensing device operates in the normal mode until it is sensed that the object has not touched the screen continuously for a predetermined time after sensing that the distance between the object and the screen has reached the predetermined distance or less, the frequency at which the first detection signals for one screen are read can be increased to be larger than that in the low consumption mode. As a result, since the temporal resolution related to the touch determination or detection of a touch position can be improved, the touch determination or the detection of a touch position can be performed with high precision. In particular, by setting the timing for switching from the low consumption mode to the normal mode to a point of time when it is sensed that the distance between the object and the screen has reached the predetermined distance or less rather than a point of time when it is sensed that the object has touched the screen, the precision related to the touch determination or the detection of a touch position before the object actually touches the screen can be improved.

In the sensing device described above, the plurality of sensors may be 'm×n' sensors arrayed on the screen corresponding to intersections between 'm' (integer of 2 or more) scanning lines and 'n' (integer of 2 or more) read lines, and the read unit may be operable in a normal mode, in which the first detection signals are read from the 'm×n' sensors at the first periods, and a low consumption mode, in which the first detection signals are read at the second periods from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed.

According to such a configuration, in the low consumption mode, the read unit reads the first detection signals from the 'M×N' sensors of all sensors ('m×n' sensors) arrayed on the screen at the second periods. Accordingly, in the low consumption mode, the frequency at which the first detection signals are read can be reduced and the number of sensors that read the first detection signals can be reduced compared with those in the normal mode. As a result, the power consumption can be further reduced.

The sensing device described above may further include: a backlight that includes a plurality of light sources capable of adjusting an amount of emitted light and that is provided on a back surface of the screen; and an adjustment unit that calculates an illuminance of ambient light on the basis of the plurality of first detection signals read by the read unit and increases the amount of emitted light of the light source, which corresponds to an area where the 'M×N' sensors are arrayed, to be larger than those of the other light sources when the calculated illuminance is less than a predetermined value in the low consumption mode.

As described in the following embodiments, when the surrounding area of the sensing device is dark, it is sensed that the object has approached close to the screen with the light of the backlight reflected by the object. For this reason, when the surrounding area of the sensing device is dark, it is difficult to sense the approach when the brightness of light emitted from the backlight is weak. Therefore, by adopting the above-described configuration, it can be more easily sensed that the object has approached close to the screen even when the surrounding area of the sensing device is dark. In addition, since light from the backlight is made strong in only an area of the screen where the sensors that read the first detection signals are arrayed in the low consumption mode, useless power consumption can be suppressed.

In the sensing device described above, the plurality of sensors may be arrayed on the screen corresponding to intersections between a plurality of scanning lines and a plurality of read lines. The read unit may include a selection unit, which sequentially selects the plurality of scanning lines in the normal mode and sequentially selects the plurality of scanning lines at the rate of one every 'L' (integer of 2 or more) scanning lines in the low consumption mode, and read the first detection signals through the plurality of read lines from the sensors corresponding to the scanning lines selected by the selection unit.

According to such a configuration, the selection unit sequentially selects the plurality of scanning lines at the rate of one every 'L' scanning lines in the low consumption mode. Accordingly, in the low consumption mode, the frequency at which the first detection signals for one screen are read can be reduced compared with that in the normal mode, and the number of sensors that read the first detection signals can be reduced to 1/L of that in the normal mode. As a result, the power consumption can be further reduced.

Furthermore, according to an eight aspect of the invention, a sensing method of detecting a touch position of an object on a screen using a plurality of sensors that are arrayed on the screen and that generate first detection signals each having a level corresponding to an amount of incident light includes: reading the first detection signals either in a normal mode, in which the first detection signals are read from the plurality of sensors at first periods, or in a low consumption mode, in which the first detection signals are read from the plurality of sensors at second periods longer than the first period; comparing a level of each of the read first detection signals with a threshold value and generating a second detection signal that is binarized; sensing that the object does not touch the screen on the basis of each second detection signal; detecting the touch position of the object on the screen on the basis of each second detection signal; and controlling switching between the normal mode and the low consumption mode, such that the reading of the first detection signals switches to the low consumption mode when it is sensed that the object does not touch the screen continuously for a predetermined time in the normal mode and the reading of the first detection signals switches from the low consumption mode to the normal mode in a predetermined case.

Furthermore, according to a ninth aspect of the invention, a sensing method of detecting a touch position of an object on a screen using a plurality of sensors that are arrayed on the screen and that generate first detection signals each having a level corresponding to an amount of incident light includes: reading the first detection signals either in a normal mode, in which the first detection signals are read from the plurality of sensors at first periods, or in a low consumption mode, in which the first detection signals are read from the plurality of sensors at second periods longer than the first period; comparing a level of each of the read first detection signals with a threshold value and generating a second detection signal that is binarized; sensing that the object has approached the screen to cause a distance between the object and the screen to reach a predetermined distance or less on the basis of each second detection signal; and controlling switching between the normal mode and the low consumption mode, such that the reading of the first detection signals switches to the normal mode when it is sensed that the distance between the object and the screen has reached the predetermined distance or less in the low consumption mode and the reading of the first detection signals switches from the normal mode to the low consumption mode in a predetermined case.

Also in the sensing methods, the same effects as in the sensing devices according to the fifth to seventh aspects of the invention can be obtained.

In the liquid crystal display device disclosed in JP-A-2004-318819, the plurality of image reading sensors 33 that read imaging data are fixed and the imaging data is read from the same plurality of image reading sensors 33 all the time. Accordingly, even if there is no touch input for a long time, imaging data is read from the same number of image reading sensors 33 as in the case where there is touch input. As a result, the excessive power consumption occurs. In view of the above situation, still another advantage of some aspects of the invention is to reduce the power consumption.

According to a tenth aspect of the invention, a sensing device that detects a touch position of an object on a screen includes: 'm×n' sensors that are arrayed on the screen corresponding to intersections between 'm' (integer of 2 or more) scanning lines and 'n' (integer of 2 or more) read lines and that generate first detection signals each having a level corresponding to an amount of incident light; a read unit that is operable in a normal read mode, in which the first detection signals are read from the 'm×n' sensors, and a partial read mode, in which the first detection signals are read from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed; a binarization unit that compares a level of each of the first detection signals read by the read unit with a threshold value and generates a second detection signal that is binarized; a sensing unit that senses that the object does not touch the screen on the basis of each second detection signal; a detection unit that detects the touch position of the object on the screen on the basis of each second detection signal; and a control unit that controls switching between the normal read mode and the partial read mode, controls the read unit to switch to the partial read mode when the sensing unit senses that there is no touch continuously for a predetermined time in the normal read mode, and controls the read unit to switch from the partial read mode to the normal read mode in a predetermined case.

According to such a configuration, the operation mode of the read unit is switched from the normal read mode to the partial read mode when it is sensed that the object has not touched the screen continuously for a predetermined time. In the partial read mode, the read unit reads the first detection signals from the 'M×N' sensors of all sensors ('m×n' sensors) arrayed on the screen. Accordingly, when the object does not touch the screen continuously for a predetermined time or more, the first detection signals are read from only some of the sensors arrayed on the screen. As a result, the number of sensors that read the first detection signals can be reduced. As a result, since the process load required for reading of the first detection signals or generation of binary signals can be reduced, the power consumption can be reduced in proportion to the reduced load.

In addition, examples of the 'being arrayed on the screen' include a case where a touch panel including a plurality of sensors is bonded to a screen and a case where a plurality of sensors are built in a display panel as described in the following embodiments. In addition, the 'object' is a finger or a touch pen, for example. In addition, the 'Predetermined case' refers to a case where it is sensed that the distance between the object and the screen has reached the predetermined distance or less in the partial read mode, for example, in a configuration in which it can be sensed that the object has approached the screen to cause the distance between the object and the screen to reach a predetermined distance or less. Moreover, in a configuration in which it can be sensed that the object has touched the screen, the 'Predetermined case' refers to a case where it can be sensed that the object has touched the screen in the partial read mode.

According to an eleventh aspect of the invention, a sensing device that detects a touch position of an object on a screen includes: 'm×n' sensors that are arrayed on the screen corresponding to intersections between 'm' (integer of 2 or more) scanning lines and 'n' (integer of 2 or more) read lines and that generate first detection signals each having a level corresponding to an amount of incident light; a read unit that is operable in a normal read mode, in which the first detection signals are read from the 'm×n' sensors, and a partial read mode, in which the first detection signals are read from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed; a binarization unit that compares a level of each of the first detection signals read by the read unit with a threshold value and generates a second detection signal that is binarized; a sensing unit that senses that the object has approached the screen to cause a distance between the object and the screen to reach a predetermined distance or less on the basis of each second detection signal; a detection unit that detects the touch position of the object on the screen; and a control unit that controls switching between the normal read mode and the partial read mode, controls the read unit to switch to the normal read mode when the sensing unit senses that the distance between the object and the screen has reached the predetermined distance or less in the partial read mode, and controls the read unit to switch from the normal read mode to the partial read mode in a predetermined case.

According to such a configuration, the operation mode of the read unit is switched from the partial read mode to the normal read mode when it is sensed that the distance between the object and the screen has reached the predetermined distance or less. Accordingly, the read unit operates in the partial read mode to read the first detection signals from the 'M×N' sensors of all sensors ('m×n' sensors) arrayed on the screen until the distance between the object and the screen reaches a predetermined distance or less. On the other hand, when the distance between the object and the screen reaches the predetermined distance or less, the read unit operates in the normal read mode to read the first detection signals from all sensors arrayed on the screen.

Accordingly, since the first detection signals are read from only some of the sensors arrayed on the screen until the distance between the object and the screen reaches the predetermined distance or less, the number of sensors that read the first detection signals can be reduced. As a result, since the process load required for reading of the first detection signals or generation of binary signals can be reduced, the power consumption can be reduced in proportion to the reduced load. In addition, when the distance between the object and the screen reaches the predetermined distance or less, the first detection signals are read from all of the sensors arrayed on the screen. As a result, touch determination or detection of a touch position can be performed on the entire screen.

Moreover, the 'predetermined case' refers to a case where it is sensed that the object has not touched the screen continuously for a predetermined time in the normal read mode, for example, in a configuration in which it can be sensed that the object does not touch the screen. Moreover, in a configuration in which it can be determined whether or not the object has approached the screen to cause the distance between the object and the screen to reach the predetermined distance or less, the 'predetermined case' refers to a case where a result of determination that the distance between the object and the screen does not reach the predetermined distance or less in the normal read mode is obtained continuously for a predetermined time.

Furthermore, according to a twelfth aspect of the invention, a sensing device that detects a touch position of an object on a screen includes: 'm×n' sensors that are arrayed on the screen corresponding to intersections between 'm' (integer of 2 or more) scanning lines and 'n' (integer of 2 or more) read lines and that generate first detection signals each having a level corresponding to an amount of incident light; a read unit that is operable in a normal read mode, in which the first detection signals are read from the 'm×n' sensors, and a partial read mode, in which the first detection signals are read from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed; a binarization unit that uses a first threshold value set to determine whether or not the object has approached the screen to cause a distance between the object and the screen to reach a predetermined distance or less and a second threshold value set to determine whether the object does not touch the screen, compares each of the first detection signals read by the read unit with either the first threshold value or the second threshold value, and generates a second detection signal that is binarized; a sensing unit that senses that the object has approached the screen to cause the distance between the object and the screen to reach the predetermined distance or less on the basis of each second detection signal when the binarization unit generates each second detection signal using the first threshold value and that senses that the object does not touch the screen on the basis of each second detection signal when the binarization unit generates each second detection signal using the second threshold value; a detection unit that detects the touch position of the object on the screen on the basis of each second detection signal when the binarization unit generates each second detection signal using the second threshold value; and a control unit that controls switching between the normal read mode and the partial read mode and change between the first and second threshold values, controls the read unit to switch to the normal read mode and controls the binarization unit to generate each second detection signal using the second threshold value when the sensing unit senses that the distance between the object and the screen has reached the predetermined distance or less in the partial read mode, and controls the read unit to switch to the partial read mode and controls the binarization unit to generate each second detection signal using the first threshold value when the sensing unit senses that there is no touch continuously for a predetermined time in the normal read mode.

According to such a configuration, when it is sensed that the object has not touched the screen continuously for a predetermined time, the operation mode of the read unit is switched from the normal read mode to the partial read mode to read the first detection signals from some of the sensors arrayed on the screen. On the other hand, when it is sensed that the distance between the object and the screen has reached the predetermined distance or less, the operation mode of the read unit is switched from the partial read mode to the normal read mode to read the first detection signals from all of the sensors arrayed on the screen.

Accordingly, since the first detection signals are read from some of the sensors arrayed on the screen until it is sensed that the distance between the object and the screen has reached the predetermined distance or less after sensing that the object has not touched the screen continuously for a predetermined time, the number of sensors that read the first detection signals can be reduced. As a result, since the process load required for reading of the first detection signals or generation of binary signals can be reduced, the power consumption can be reduced in proportion to the reduced load.

Moreover, since the first detection signals are read from all sensors arrayed on the screen until it is sensed that the object has not touched the screen continuously for a predetermined time after sensing that the distance between the object and the screen has reached the predetermined distance or less, touch determination or detection of a touch position can be performed on the entire screen.

In the sensing device described above, the read unit may include a selection unit, which sequentially selects the 'm' scanning lines in the normal read mode and sequentially selects the 'M' scanning lines at the rate of one every 'L' (integer of 2 or more and 'M' or less) scanning lines in the partial read mode, and read the first detection signals from the 'm×n' sensors in the normal read mode and read the first detection signals from the '(M×N)/L' sensors in the partial read mode.

According to such a configuration, the selection unit sequentially selects the 'm' scanning lines, which are objects to be selected, at the rate of one every 'L' scanning lines in the partial read mode. Therefore, since the number of sensors that read the first detection signals in the partial read mode can be reduced to 1/L, the power consumption can be further reduced.

The sensing device described above may further include: a backlight that includes a plurality of light sources capable of adjusting an amount of emitted light and that is provided on a back surface of the screen; and an adjustment unit that calculates an illuminance of ambient light on the basis of the plurality of first detection signals read by the read unit and increases the amount of emitted light of the light source, which corresponds to an area where the 'M×N' sensors are arrayed, to be larger than those of the other light sources when the calculated illuminance is less than a predetermined value in the partial read mode.

According to such a configuration, it can be more easily sensed that the object has approached close to the screen even when the surrounding area of the sensing device is dark. In addition, since light from the backlight is made strong in only an area of the screen where the sensors that read the first detection signals are arrayed in the partial read mode, useless power consumption can be suppressed.

Furthermore, according to a thirteenth aspect of the invention, a sensing method of detecting a touch position of an object on a screen using 'm×n' sensors that are arrayed on the screen corresponding to intersections between 'm' (integer of 2 or more) scanning lines and 'n' (integer of 2 or more) read lines and that generate first detection signals each having a level corresponding to an amount of incident light includes: reading the first detection signals either in a normal read mode, in which the first detection signals are read from the 'm×n' sensors, or in a partial read mode, in which the first detection signals are read from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed; comparing a level of each of the read first detection signals with a threshold value and generating a second detection signal that is binarized; sensing that the object does not touch the screen on the basis of each second detection signal; detecting the touch position of the object on the screen on the basis of each second detection signal; and controlling switching between the normal read mode and the partial read mode, such that the reading of the first detection signals switches to the partial read mode when it is sensed that there is no touch continuously for a predetermined time in the normal read mode and the reading of the first detection signals switches from the partial read mode to the normal read mode in a predetermined case.

Furthermore, according to a fourteenth aspect of the invention, a sensing method of detecting a touch position of an object on a screen using 'm×n' sensors that are arrayed on the screen corresponding to intersections between 'm' (integer of 2 or more) scanning lines and 'n' (integer of 2 or more) read lines and that generate first detection signals each having a level corresponding to an amount of incident light includes: reading the first detection signals either in a normal read mode, in which the first detection signals are read from the 'm×n' sensors, or in a partial read mode, in which the first detection signals are read from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed; comparing a level of each of the read first detection signals with a threshold value and generating a second detection signal that is binarized; sensing that the object has approached the screen to cause a distance between the object and the screen to reach a predetermined distance or less on the basis of each second detection signal; and controlling switching between the normal read mode and the partial read mode, such that the reading of the first detection signals switches to the normal read mode when it is sensed that the distance between the object and the screen has reached the predetermined distance or less in the partial read mode and the reading of the first detection signals switches from the normal read mode to the partial read mode in a predetermined case.

Also in the sensing methods, the same effects as in the sensing devices according to the tenth to twelfth aspects of the invention can be obtained.

Furthermore, according to a fifteenth aspect of the invention, a sensing device that detects a touch position of an object on a screen includes: a plurality of sensors that are arrayed on the screen corresponding to intersections between a plurality of scanning lines and a plurality of read lines and that generate first detection signals each having a level corresponding to an amount of incident light; a selection unit that is operable in a normal mode, in which the plurality of scanning lines are sequentially selected, and a thinning-out mode, in which the plurality of scanning lines are sequentially selected at the rate of one every 'K' (integer of 2 or more) scanning lines; a read unit that reads the first detection signals through the plurality of read lines from the sensors corresponding to the scanning lines selected by the selection unit; a binarization unit that compares a level of each of the first detection signals read by the read unit with a threshold value and generates a second detection signal that is binarized; a sensing unit that senses that the object does not touch the screen on the basis of each second detection signal; a detection unit that detects the touch position of the object on the screen on the basis of each second detection signal; and a control unit that controls switching between the normal mode and the thinning-out mode, controls the selection unit to switch to the thinning-out mode when the sensing unit senses that there is no touch continuously for a predetermined time in the normal mode, and controls the selection unit to switch from the thinning-out mode to the normal mode in a predetermined case.

According to such a configuration, when it is sensed that the object has not touched the display screen continuously for a predetermined time, an operation mode of the selection unit is switched from the normal mode to the thinning-out mode such that the scanning lines are sequentially selected at the rate of one every 'K' scanning lines. Accordingly, the number of sensors that read the first detection signals when the object does not touch the screen continuously for a predetermined time can be reduced to 1/K of that in the other cases (a case where there is touch input or a case where a predetermined time has not elapsed even though a state of no touch input continues). As a result, since the process load required for reading of the first detection signals or generation of binary signals can be reduced, the power consumption can be reduced in proportion to the reduced load.

In addition, examples of the 'being arrayed on the screen' include a case where a touch panel including a plurality of sensors is bonded to a screen and a case where a plurality of sensors are built in a display panel as described in the following embodiments. In addition, the 'object' is a finger or a touch pen, for example. In addition, the 'predetermined case' refers to a case where it is sensed that the distance between the object and the screen has reached the predetermined distance or less in the thinning-out mode, for example, in a configuration in which it can be sensed that the object has approached the screen to cause the distance between the object and the screen to reach a predetermined distance or less. Moreover, in a configuration in which it can be sensed that the object has touched the screen, the 'predetermined case' refers to a case where it can be sensed that the object has touched the screen in the thinning-out mode.

Furthermore, according to a sixteenth aspect of the invention, a sensing device that detects a touch position of an object on a screen includes: a plurality of sensors that are arrayed on the screen corresponding to intersections between a plurality of scanning lines and a plurality of read lines and that generate first detection signals each having a level corresponding to an amount of incident light; a selection unit that is operable in a normal mode, in which the plurality of scanning lines are sequentially selected, and a thinning-out mode, in which the plurality of scanning lines are sequentially selected at the rate of one every 'K' (integer of 2 or more) scanning lines; a read unit that reads the first detection signals through the plurality of read lines from the sensors corresponding to the scanning lines selected by the selection unit; a binarization unit that compares a level of each of the first detection signals read by the read unit with a threshold value and generates a second detection signal that is binarized; a sensing unit that senses that the object has approached the screen to cause a distance between the object and the screen to reach a predetermined distance or less on the basis of each second detection signal; a detection unit that detects the touch position of the object on the screen; and a control unit that controls switching between the normal mode and the thinning-out mode, controls the selection unit to switch to the normal mode when the sensing unit senses that the distance between the object and the screen has reached the predetermined distance or less in the thinning-out mode, and controls the selection unit to switch from the normal mode to the thinning-out mode in a predetermined case.

According to such a configuration, the operation mode of the read unit is switched from the thinning-out mode to the normal mode when it is sensed that the distance between the object and the screen has reached the predetermined distance or less. Accordingly, the selection unit operates in the thinning-out mode to sequentially select the scanning lines at the rate of one every 'K' scanning lines until the distance between the object and the screen reaches the predetermined distance or less. On the other hand, when the distance between the object and the screen reaches the predetermined distance or less, the selection unit operates in the normal mode to select all scanning lines one by one in a sequential manner. Accordingly, the number of sensors that read the first detection signals can be reduced to 1/K until the distance between the object and the screen reaches the predetermined distance or less. As a result, since the process load required for reading of the first detection signals or generation of binary signals can be reduced, the power consumption can be reduced in proportion to the reduced load.

In addition, when the distance between the object and the screen reaches the predetermined distance or less, the first detection signals are read from all of the sensors arrayed on the screen. As a result, touch determination or detection of a touch position can be performed with high precision. In particular, by setting the timing for switching from the thinning-out mode to the normal mode to a point of time when it is sensed that the distance between the object and the screen has reached the predetermined distance or less rather than a point of time when it is sensed that the object has touched the screen, the precision related to the touch determination or the detection of a touch position before the object actually touches the screen can be improved.

Moreover, the 'predetermined case' refers to a case where it is sensed that the object has not touched the screen continuously for a predetermined time in the normal mode, for example, in a configuration in which it can be sensed that the object does not touch the screen. Moreover, in a configuration in which it can be determined whether or not the object has approached the screen to cause the distance between the object and the screen to reach the predetermined distance or less, the 'predetermined case' refers to a case where a result of determination that the distance between the object and the screen does not reach the predetermined distance or less in the normal mode is obtained continuously for a predetermined time.

Furthermore, according to a seventeenth aspect of the invention, a sensing device that detects a touch position of an object on a screen includes: a plurality of sensors that are arrayed on the screen corresponding to intersections between a plurality of scanning lines and a plurality of read lines and that generate first detection signals each having a level corresponding to an amount of incident light; a selection unit that is operable in a normal mode, in which the plurality of scanning lines are sequentially selected, and a thinning-out mode, in which the plurality of scanning lines are sequentially selected at the rate of one every 'K' (integer of 2 or more) scanning lines; a read unit that reads the first detection signals through the plurality of read lines from the sensors corresponding to the scanning lines selected by the selection unit; a binarization unit that uses a first threshold value set to determine whether or not the object has approached the screen to cause a distance between the object and the screen to reach a predetermined distance or less and a second threshold value set to determine whether the object does not touch the screen, compares each of the first detection signals read by the read unit with either the first threshold value or the second threshold value, and generates a second detection signal that is binarized; a sensing unit that senses that the object has approached the screen to cause the distance between the object and the screen to reach the predetermined distance or less on the basis of each second detection signal when the binarization unit generates each second detection signal using the first threshold value and that senses that the object does not touch the screen on the basis of each second detection signal when the binarization unit generates each second detection signal using the second threshold value; a detection unit that detects the touch position of the object on the screen on the basis of each second detection signal when the binarization unit generates each second detection signal using the second threshold value; and a control unit that controls switching between the normal mode and the thinning-out mode and change between the first and second threshold values, controls the selection unit to switch to the normal mode and controls the binarization unit to generate each second detection signal using the second threshold value when the sensing unit senses that the distance between the object and the screen has reached the predetermined distance or less in the thinning-out mode, and controls the selection unit to switch to the thinning-out mode and controls the binarization unit to generate each second detection signal using the first threshold value when the sensing unit senses that there is no touch continuously for a predetermined time in the normal mode.

According to such a configuration, when it is sensed that the object has not touched the display screen continuously for a predetermined time, an operation mode of the selection unit is switched from the normal mode to the thinning-out mode such that the scanning lines are sequentially selected at the rate of one every 'K' scanning lines. On the other hand, when it is sensed that the distance between the object and the screen has reached the predetermined distance or less, the operation mode of the selection unit is switched from the thinning-out mode to the normal mode such that all scanning lines are selected one by one in a sequential manner. Accordingly, the number of sensors that read the first detection signals can be reduced to 1/K until it is sensed that the distance between the object and the screen has reached the predetermined distance or less after sensing that the object has not touched the screen continuously for a predetermined time. As a result, since the process load required for reading of the first detection signals or generation of binary signals can be reduced, the power consumption can be reduced in proportion to the reduced load.

Moreover, since the first detection signals are read from all sensors arrayed on the screen until it is sensed that the object has not touched the screen continuously for a predetermined time after sensing that the distance between the object and the screen has reached the predetermined distance or less, the touch determination or the detection of a touch position can be performed with high precision. In particular, by setting the timing for switching from the thinning-out mode to the normal mode to a point of time when it is sensed that the distance between the object and the screen has reached the predetermined distance or less rather than a point of time when it is sensed that the object has touched the screen, the precision related to the touch determination or the detection of a touch position before the object actually touches the screen can be improved.

Furthermore, according to an eighteenth aspect of the invention, a sensing method of detecting a touch position of an object on a screen using a plurality of sensors that are arrayed on the screen corresponding to intersections between a plurality of scanning lines and a plurality of read lines and that generate first detection signals each having a level corresponding to an amount of incident light includes: selecting the scanning lines either in a normal mode, in which the plurality of scanning lines are sequentially selected, or in a thinning-out mode, in which the plurality of scanning lines are sequentially selected at the rate of one every 'K' (integer of 2 or more) scanning lines; reading the first detection signals through the plurality of read lines from the sensors corresponding to the selected scanning lines; comparing a level of each of the read first detection signals with a threshold value and generating a second detection signal that is binarized; sensing that the object does not touch the screen on the basis of each second detection signal; detecting the touch position of the object on the screen on the basis of each second detection signal; and controlling switching between the normal mode and the thinning-out mode, such that the selection of the scanning lines switches to the thinning-out mode when it is sensed that the object does not touch the screen continuously for a predetermined time in the normal mode and the selection of the scanning lines switches from the thinning-out mode to the normal mode in a predetermined case.

Furthermore, according to a nineteenth aspect of the invention, a sensing method of detecting a touch position of an object on a screen using a plurality of sensors that are arrayed on the screen corresponding to intersections between a plurality of scanning lines and a plurality of read lines and that generate first detection signals each having a level corresponding to an amount of incident light includes: selecting the scanning lines either in a normal mode, in which the plurality of scanning lines are sequentially selected, or in a thinning-out mode, in which the plurality of scanning lines are sequentially selected at the rate of one every 'K' (integer of 2 or more) scanning lines; reading the first detection signals through the plurality of read lines from the sensors corresponding to the selected scanning lines; comparing a level of each of the read first detection signals with a threshold value and generating a second detection signal that is binarized; sensing that the object has approached the screen to cause a distance between the object and the screen to reach a predetermined distance or less on the basis of each second detection signal; and controlling switching between the normal mode and the thinning-out mode, such that the selection of the scanning lines switches to the normal mode when it is sensed that the distance between the object and the screen has reached the predetermined distance or less in the thinning-out mode and the selection of the scanning lines switches from the normal mode to the thinning-out mode in a predetermined case.

Also in the sensing methods, the same effects as in the sensing devices according to the fifteenth to seventeenth aspects of the invention can be obtained.

In addition, in the sensing devices according to the fifth to seventh, tenth to twelfth, and fifteenth to seventeenth aspects of the invention, the sensing unit may be configured to count the number of second detection signals, which satisfy a condition set by the threshold value, among all of the second detection signals and sense that the object does not touch the screen on the basis of the count result. For example, if the count result is less than a predetermined value, it may be sensed that the object does not touch the screen. In addition, if the count result is not a value in a predetermined value set by upper and lower limits, it may be determined that the object does not touch the screen. In the latter case, a possibility of incorrect determination can be reduced. In addition, for example, a second detection signal corresponding to the first detection signal with a signal level less than the threshold value or a second detection signal corresponding to the first detection signal with a signal level of the threshold value or more corresponds to the 'second detection signal satisfying the condition set by the threshold value'.

In addition, in the sensing devices according to the fifth to seventh, tenth to twelfth, and fifteenth to seventeenth aspects of the invention, the sensing unit may be configured to count the number of second detection signals, which satisfy a condition set by the threshold value, among all of the second detection signals and sense that the distance between the object and the screen has reached the predetermined distance or less on the basis of the count result. For example, if the count result is 1 or more, it may be determined that the distance between the object and the screen has reached the predetermined distance or less. In addition, if the count result is a predetermined value or more or if the count result is a value in a predetermined range set by upper and lower limits, it may be sensed that the distance between the object and the screen has reached the predetermined distance or less. In the latter case, a possibility of incorrect determination can be reduced. In addition, for example, a second detection signal corresponding to the first detection signal with a signal level less than the threshold value or a second detection signal corresponding to the first detection signal with a signal level of the threshold value or more corresponds to the 'second detection signal satisfying the condition set by the threshold value'.

Furthermore, according to a twentieth aspect of the invention, a display device includes: the sensing device described above; and a display unit that displays an image. An example of the display device includes a display device using a liquid crystal element or an OLED (organic light emitting diode) element. In addition, the display device described above may further include a display control unit that generates an image showing the locus of the position detected by the detection unit and displays the image on the display unit.

Furthermore, according to a twenty-first aspect of the invention, an electronic apparatus includes the display device described above. Examples of the electronic apparatus include a personal computer, a mobile phone, and a personal digital assistant.

BRIEF DESCRIPTION OF THE DRAWINGS

The invention will be described with reference to the accompanying drawings, wherein like numbers reference like elements.

FIGS. 3A and 3B are flow charts illustrating the flows of mode switching processes 1 and 2 in the embodiment A1.

FIGS. 4A and 43 are views illustrating the outline of the mode switching processes 1 and 2 in the embodiment A1.

FIGS. 7A and 73 are views illustrating the outline of the mode switching processes 3 and 4 in the embodiment B1.

FIGS. 10A and 10B are flow charts illustrating the flows of mode switching processes 5 and 6 in the embodiment B2.

FIGS. 13A and 13B are flow charts illustrating the flows of mode switching processes 9 and 10 in the embodiment C1.

FIGS. 14A and 14B are flow charts illustrating the flows of mode switching processes 11 and 12 in the embodiment D1.

DESCRIPTION OF EXEMPLARY EMBODIMENTS

Hereinafter, a plurality of embodiments of the invention will be described with reference to the accompanying drawings.

In addition, in each of the following embodiments, a case where a sensing device according to the embodiment of the invention is applied to a transmissive liquid crystal display device will be described.

Embodiment A1

Figure 1:
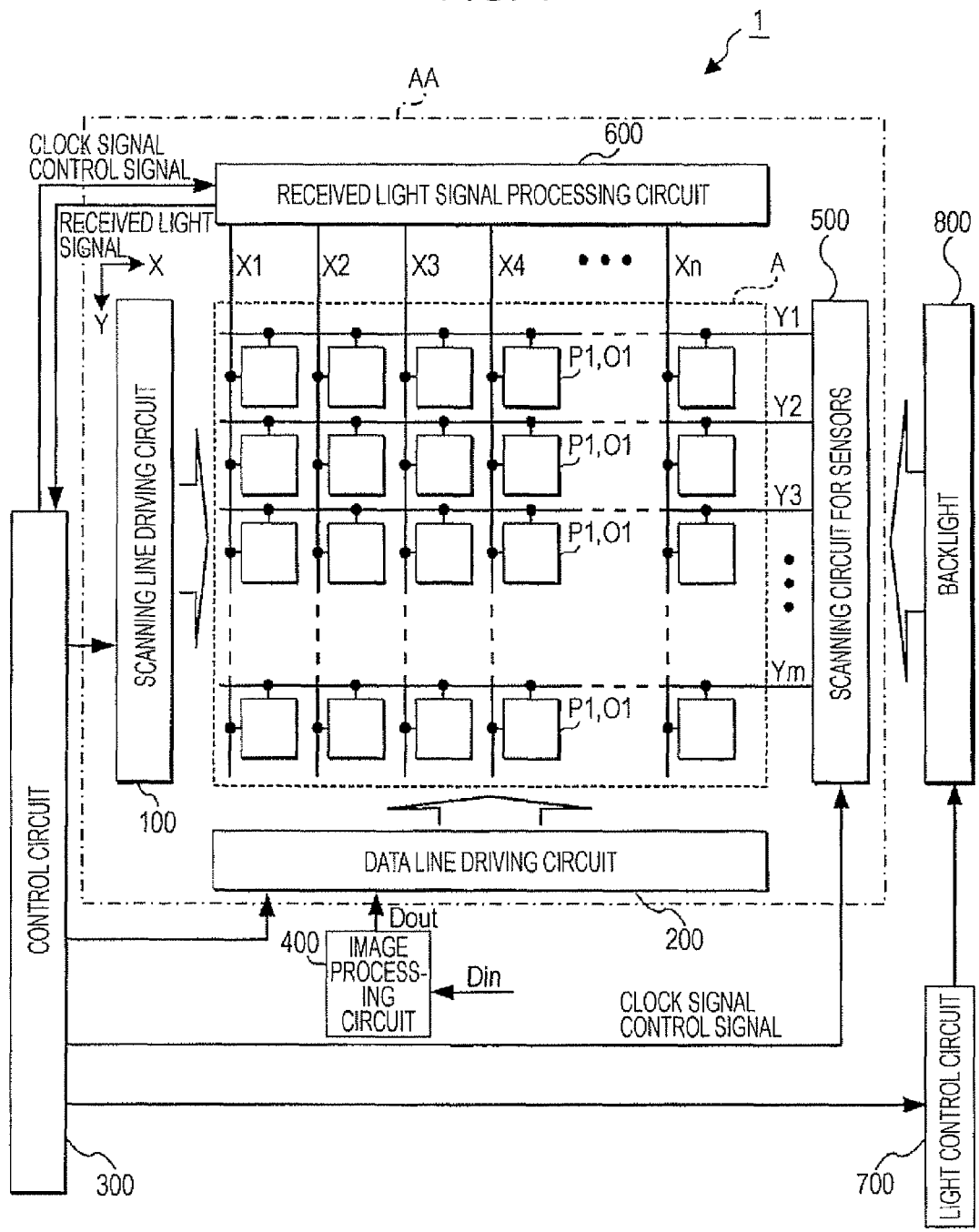
FIG. 1 is a block diagram illustrating the configuration of a liquid crystal display device according to an embodiment A1.

FIG. 1 is a block diagram illustrating the configuration of a liquid crystal display device 1 according to the embodiment A1.

As shown in FIG. 1, the liquid crystal display device 1 includes a liquid crystal panel AA, a control circuit 300, an image processing circuit 400, a light control circuit 700, and a backlight 800. The liquid crystal panel AA is obtained by bonding an element substrate, in which a thin film transistor as a switching element is formed, and a counter substrate together in a state where electrode formed surfaces of the substrates face each other and a predetermined gap is maintained between the substrates. Liquid crystal is interposed in the gap. In addition, the liquid crystal panel AA includes an image display area A, a scanning line driving circuit 100, a data line driving circuit 200, a scanning circuit 500 for sensors, and a received light signal processing circuit 600 which are provided on the element substrate. In the image display area A, 'm (row)×n (column)' pixel circuits P1 are formed in a matrix, and each pixel circuit P1 is electrically connected to the scanning line driving circuit 100 and the data line driving circuit 200.

The control circuit 300 supplies a clock signal or various kinds of control signals to the scanning line driving circuit 100 and the data line driving circuit 200. The image processing circuit 400 generates output image data Dout by performing image processing on input image data Din and then outputs the output image data Dout to the data line driving circuit 200. The scanning line driving circuit 100 selects the pixel circuits P1 arrayed in a matrix sequentially in the unit of a row. In addition, the data line driving circuit 200 supplies a data signal to each of the pixel circuits P1 on one row ('n' pixel circuits P1) sequentially selected by the scanning line driving circuit 100. The backlight 800 is provided on a back surface of the liquid crystal panel AA, and the light control circuit 700 makes the backlight 800 emit light with a brightness corresponding to the illuminance (brightness around the liquid crystal display device 1) of ambient light under control of the control circuit 300. Light from the backlight 800 is emitted through the liquid crystal panel AA (image display area A). Since the plurality of pixel circuits P1 are arrayed in a matrix in the image display area A, a transmittance is controlled for every pixel circuit P1 according to a voltage level of the data signal supplied from the data line driving circuit 200. This makes gray-scale display based on light modulation possible. As a result, an image is displayed on the image display area A.

In addition, the liquid crystal display device 1 has a touch input functions and a photodetection circuit O1 is provided in the image display area A for every pixel circuit P1. More specifically, in the image display area A, 'm' scanning lines extending in an X direction and 'n' read lines extending in a Y direction are formed, and the 'm (row)×n (column)' photodetection circuits O1 are disposed corresponding to intersections between the scanning lines and the read lines. Each photodetection circuit O1 has an optical sensor and outputs a received light signal with a signal level corresponding to the light amount of incident light. The control circuit 300 supplies a clock signal or a scanning control signal to the scanning circuit 500 for sensors. In addition, the control circuit 300 supplies a clock signal or a control signal for received light signal processing to the received light signal processing circuit 600. The scanning circuit 500 for sensors sequentially selects the photodetection circuits O1 arrayed in a matrix using scanning signal Y1, Y2, Y3, . . . , Ym. The received light signal processing circuit 600 reads received light signals X1, X2, X3, X4, . . . , Xn from the photodetection circuits O1 on one row ('n' photodetection circuits O1), which are sequentially selected by the scanning circuit 500 for sensors, through the 'n' read lines and then supplies the signals to the control circuit 300.

Here, for example, when the surrounding area of the liquid crystal display device 1 is bright like a case where the liquid crystal display device 1 is under the natural light in the daytime, a portion touched by a finger or a touch pen becomes a shadow in the image display area A (display screen). Accordingly, the amount of received light in this portion is reduced compared with that in other portions. That is, when a finger or a touch pen approaches the display screen to some extent, a faint shadow is made on the display screen. As the finger or the touch pen further approaches the display screen, the shadow darkens gradually. In this case, the received light amount of the photodetection circuit O1 (optical sensor), which is located in a portion where the shadow was made on the display screen, gradually decreases as the shadow darkens. In contrast, when the surrounding area of the liquid crystal display device 1 is dark like a case where the liquid crystal display device 1 is under the dark environment at night, light from the backlight 800 is reflected by the finger or the touch pen. Accordingly, the amount of received light in the portion touched by the finger or the touch pen on the display screen increases compared with that in the other portions. That is, when a finger or a touch pen approaches the display screen to some extent, the light from the backlight 800 is reflected by the finger or the touch pen, and a portion upon which the reflected light hits may be generated on the display screen. The intensity of the reflected light in this portion increases gradually as the finger or the touch pen further approaches the display screen. In this case, the received light amount of the photodetection circuit O1 in the portion upon which the reflected light hits on the display screen increases as the reflected light becomes strong with the approach of the finger or the touch pen.

Accordingly, the control circuit 300 can determine whether or not the finger or the touch pen touches the display screen, that is, whether or not there is a touch on the basis of a received light signal for one screen read from the 'm×n' photodetection circuits O1 provided in the image display area A.

Specifically, first, the control circuit 300 compares a signal level of each of the read received light signals for one screen ('m×n' received light signals) with a threshold value and converts the read received light signals into binary signals (binarization processing). In addition, the threshold value used in this binarization processing is used to determine whether or not the signal level of each received light signal has reached a level of the received light amount when the finger or the touch pen touches the display screen. For example, by acquiring a plurality of sample data on the received light amount (signal level of a received light signal) of the photodetection circuit O1 which is located in a portion actually touched by the finger or the touch pen on the display screen, the threshold value can be set from the acquired sample data. That is, in the binarization processing described above, the control circuit 300 determines whether or not a signal level of each received light signal has reached a level of the received light amount when a finger or a touch pen touches the display screen and outputs a binary signal with different signal values in a case where the signal level has reached the level of the received light amount and a case where the signal level has not reached the level of the received light amount.

In addition, since the number of received light signals for one screen is 'm×n', 'm×n' binary signals are also generated corresponding to the 'm×n' received light signals. Moreover, in practice, it is necessary to use different threshold values in a case where the surrounding area of the liquid crystal display device 1 is bright and a case where the surrounding area of the liquid crystal display device 1 is dark. That is, a threshold value T1 used when the surrounding area of the liquid crystal display device 1 is bright and a threshold value T2 used when the surrounding area of the liquid crystal display device 1 is dark are needed.

For example, a case where the surrounding area of the liquid crystal display device 1 is bright and a portion touched by a finger or a touch pen on the display screen becomes a shadow is considered. It is assumed that the signal level of each received light signal has a value in a range of '0' (dark) to '100' (bright) and the threshold value T1 is set to '10'. In this case, the control circuit 300 converts a received light signal with a signal level less than '10' into a binary signal '1' and converts a received light signal with a signal level of '10' or more into a binary signal '0'. Next, a case where the surrounding area of the liquid crystal display device 1 is dark and a portion touched by a finger or a touch pen on the display screen becomes bright by reflected light is considered. Similar to the case where the surrounding area of the liquid crystal display device 1 is bright, it is assumed that the signal level of each received light signal has a value in a range of '0' (dark) to '100' (bright) and the threshold value T2 is set to '65'. In this case, the control circuit 300 converts a received light signal with a signal level of '65' or more into a binary signal '1' and converts a received light signal with a signal level less than '65' into a binary signal '0'.

Figure 2:
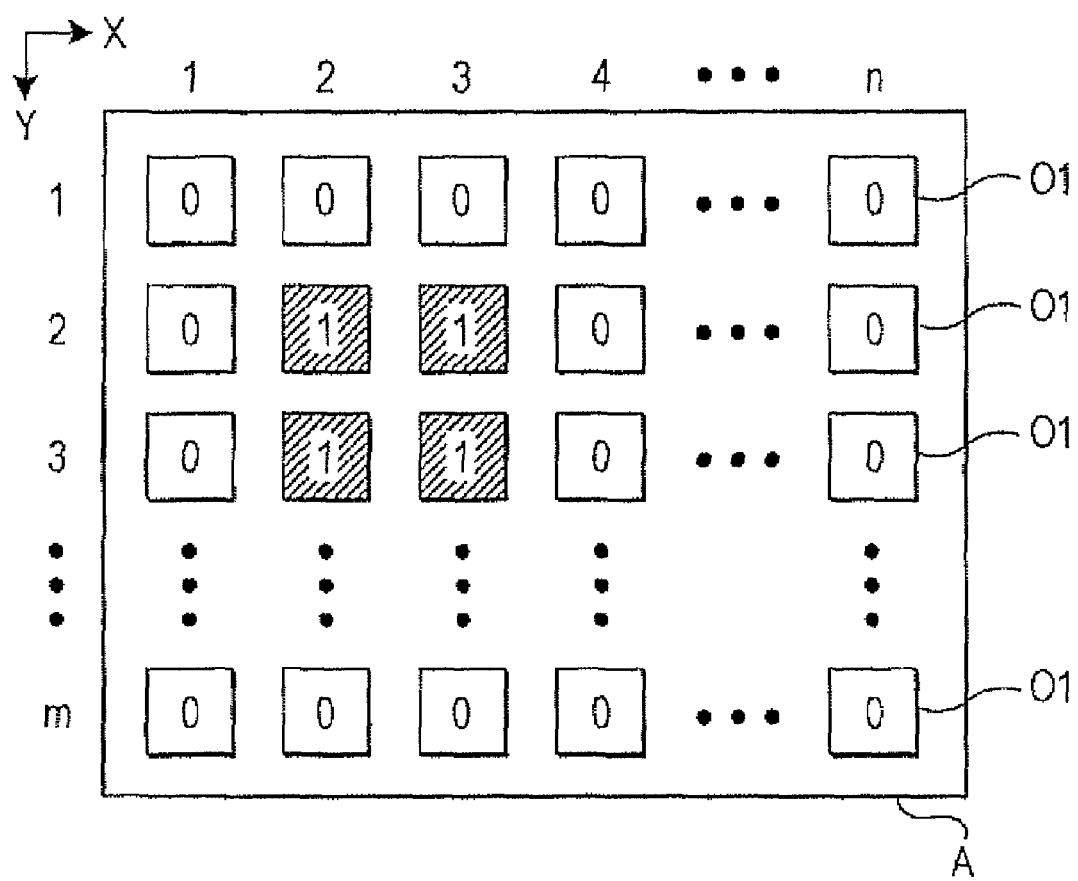
FIG. 2 is a view illustrating binary signals for one screen.

FIG. 2 is a view illustrating binary signals for one screen obtained by binarization processing. In an example shown in FIG. 2, values of the binary signals are set to '1' for the four photodetection circuits O1 at the arrangement positions (X, Y) of (2, 2), (2, 3), (3, 2), and (3, 3) in the image display area A. As described above, a portion in which a value of a binary signal is set to '1' is a portion of shadow, in which a signal level of a received light signal is less than the threshold value T1 of '10', when the surrounding area of the liquid crystal display device 1 is bright and is a portion with strong reflected light, in which a signal level of a received light signal is equal to or larger than the threshold value T2 of '65', when the surrounding area of the liquid crystal display device 1 is dark. That is, the portion in which a value of a binary signal becomes '1' is a portion touched by the finger or the touch pen on the display screen. Accordingly, the control circuit 300 can determine that there is a touch when a binary signal with a signal value of '1' is included in binary signals for one screen ('m×n' binary signals) and determine that there is no touch when the binary signal with a signal value of '1' is not included.

In addition, when it is determined that there is a touch, the control circuit 300 detects the arrangement position (X, Y) of the photodetection circuit O1, in which a value of a binary signal becomes '1', as a touch position of the finger or the touch pen. For example, in the example shown in FIG. 2, the arrangement positions (2, 2), (2, 3), (3, 2), and (3, 3) are detected as touch positions.

In addition, for example, dirt may adhere on the display screen to become a small shadow. In addition, the whole palm may touch the display screen without intending to perform touch input. In order for those described above to be erroneously detected as touch using a finger or a touch pen, the control circuit 300 may count the number of binary signals with signal values of '1' among the binary signals for one screen and determine whether or not there is a touch on the basis of the count value. For example, the control circuit 300 may determine that there is a touch when the count value is a predetermined value or more and determine that there is no touch when the count value is less than the predetermined value. Moreover, upper and lower limits of the number of binary signals whose signal values become '1' when a finger or a touch pen touches the display screen are set from the touch area of the finger or the touch pen and the arrangement density of the photodetection circuits O1, for example, and the upper and lower limits are stored in a memory. Then, the control circuit 300 may determine that there is a touch when the count value is a value within a range set by the upper and lower limits stored in the memory and determine that there is no touch when the count value is not a value within the range. In addition, for a plurality of binary signals whose signal values become '1', it may be considered whether or not the photodetection circuits O1 corresponding to the binary signals are adjacent to each other. In addition, it may be possible to array values of binary signals for one screen according to the arrangement of the corresponding photodetection circuits O1, to create a binary image in which a portion of '1' is set to be black and a portion of '0' is set to be white, and to consider whether the shape of the black portion of the binary image is an elliptical shape or a circular shape (shape of a touch surface when the finger or the touch pen touches the display screen).

In addition, the size of a shadow made on the display screen by touch of the finger or the touch pen when the surrounding area of the liquid crystal display device 1 is bright is different from the size of a portion, upon which reflected light hits, generated on the display screen by touch of the finger or the touch pen when the surrounding area of the liquid crystal display device 1 is dark. Accordingly, in the case where the surrounding area of the liquid crystal display device 1 is bright and the case where the surrounding area of the liquid crystal display device 1 is dark, values of the upper and lower limits compared with the count value are different.

Here, the liquid crystal display device 1 according to the present embodiment performs, every 60 Hz or 120 Hz, one cycle processing related to a touch input function of [1] to [3], which is [1] received light signals are read from all photodetection circuits O1 provided in the image display area A, [2] it is determined whether or not there is a touch on the basis of the read received light signals for one screen, and [3] the touch position is detected when it is determined that there is a touch. The liquid crystal display device 1 according to the present embodiment has a normal mode and a fast mode as operation modes related to the touch input function. The liquid crystal display device 1 according to the present embodiment performs the one cycle processing every 60 Hz in the normal mode and performs the one cycle processing every 120 Hz in the fast mode.

Accordingly, the control circuit 300 controls the scanning circuit 500 for sensors and the received light signal processing circuit 600 to read received light signals for one screen at the rate of 60 times per second in the normal mode and to read received light signals for one screen at the rate of 120 times per second in the fast mode. That is, the control circuit 300 changes the timing for sequentially selecting 'm' scanning lines in the scanning circuit 500 for sensors and the timing for reading received light signals by using 'n' read lines in the received light signal processing circuit 600 according to the operation mode. For example, in the fast mode, the control circuit 300 reads the received light signals for one screen in a period of the half of that in the normal mode.

In addition, the one cycle processing related to the touch input function includes processing for determining whether or not there is a touch and processing for detecting the touch position as described above. Accordingly, the actual time taken to read the received light signals for one screen is shorter than a time corresponding to one period in which the one cycle processing is performed. For example, the actual time taken to read the received light signals for one screen is a predetermined time shorter than 16.6 ms in the normal mode and is a predetermined time shorter than 8.3 ms in the fast mode.

In addition, the control circuit 300 calculates the illuminance of ambient light on the basis of a plurality of received light signals. Then, the control circuit 300 determines that the surrounding area of the liquid crystal display device 1 is bright when the calculated illuminance is equal to or larger than a predetermined value and determines the surrounding area of the liquid crystal display device 1 is dark when the calculated illuminance is less than the predetermined value. For example, the illuminance of ambient light is calculated by calculating an average value of signal levels of the received light signals for one screen. In addition, the illuminance of ambient light may also be calculated by using received light signals read from a predetermined number of photodetection circuits O1 located at four corners of the image display area A or using received light signals read from a predetermined number of photodetection circuits O1 located in the middle of the image display area A, for example, without using all received light signals for one screen. In addition, the control circuit 300 outputs to the light control circuit 700 data indicating the calculated illuminance of ambient light. Then, the light control circuit 700 makes the backlight 800 emit light with the brightness corresponding to the illuminance of ambient light.

In addition, the control circuit 300 may generate an image showing the locus of the detected touch position and display the image in the image display area A as a handwritten image, such as a character or a picture, drawn by the finger or the touch pen. In this case, the data of the handwritten image generated by the control circuit 300 is supplied as the input image data Din to the image processing circuit 400.

FIGS. 3A and 3B are flow charts illustrating the flows of mode switching processes 1 and 2 in the embodiment A1. The mode switching process 1 shown in FIG. 3A is executed when the operation mode is a normal mode. Moreover, in the liquid crystal display device 1, for example, when a user instructs the touch input function to be turned on, the operation mode is changed to the normal mode after starting reception of the touch input. In the case of the liquid crystal display device 1 that performs all operations basically by touch input using a finger or a touch pen, a power switch is pressed to complete initial processing and then reception of the touch input is started to make the operation mode change to the normal mode. As described above, in the normal mode, one cycle processing related to the touch input function is performed every 60 Hz.

First, the control circuit 300 determines whether there is a touch, that is, whether or not a finger or a touch pen touches the display screen on the basis of received light signals for one screen ('m×n' received light signals) that have been newly read (step S101).

Specifically, first, the control circuit 300 compares a signal level of each of the received light signals for one screen with a threshold value (specifically, a threshold value $T1_{60}$ or $T2_{60}$ which will be described later in detail) and converts each of the received light signals into a binary signal as described above. In addition, although the threshold value used herein is basically set in step S203 of the mode switching process 2 which will be described later, the threshold value may be suitably changed between the threshold values $T1_{60}$ and $T2_{60}$ on the basis of a measurement result of ambient light when the surrounding area of the liquid crystal display device 1 has changed from a bright state to a dark state or from a dark state to a bright state on the contrary. That is, the threshold value $T1_{60}$ is used when the surrounding area of the liquid crystal display device 1 is bright, and the threshold value $T2_{60}$ is used when the surrounding area of the liquid crystal display device 1 is dark. Then, the control circuit 300 counts the number of binary signals with signal values of '1', for example, among the generated binary signals far one screen ('m×n' binary signal). When the count value is a value within a range set by the upper and lower limits stored in the memory, the control circuit 300 determines that there is a touch (step S101: YES). On the other hand, when the count value is not a value within the range, the control circuit 300 determines that there is no touch (step S101: NO). Moreover, as described above, values of the upper and lower limits compared with the count value are different in the case where the surrounding area of the liquid crystal display device 1 is bright and the case where the surrounding area of the liquid crystal display device 1 is dark.

When it is determined that there is no touch in step S101, the mode switching process 1 is ended. In this case, the operation mode is still the normal mode. On the other hand, when it is determined that there is a touch in step S01, the control circuit 300 determines whether or not a state, in which a result of determination that there is a touch is continuously obtained, continues for a predetermined time (for example, 0.2 second) (step S102). In addition, since the one cycle processing related to the touch input function is performed every 60 Hz in the normal mode, the determination result of step S101 is obtained every 60 Hz. Accordingly, the control circuit 300 may count the number of times of results of determination that there is a touch, which are continuously obtained, and determine whether or not the count value has reached the number of times equivalent to the predetermined time described above. In addition, the predetermined time may also be set to an arbitrary time, such as 10 seconds, 1 minute, or 5 minutes, without being limited to 0.2 second.

When it is determined that the state does not continue for the predetermined time or more in step S102, the mode switching process 1 is ended. Also in this case, the operation mode is still the normal mode. On the other hand, when it is determined that the state continues for the predetermined time or more in step S102, the control circuit 300 switches the operation mode from the normal mode to the fast mode (step S103).

In addition, when switching the operation mode to the fast mode, a control signal that instructs the change (change to 120 Hz) of a period is transmitted from the control circuit 300 to the scanning circuit 500 for sensors and the received light signal processing circuit 600. When the control signal is received, the scanning circuit 500 for sensors changes the timing for sequentially selecting 'm' scanning lines so that the received light signals for one screen can be read at the rate of 120 times per second. Similarly, also in the received light signal processing circuit 600, the timing for reading the received light signals using 'n' read lines is changed so that the received light signals for one screen can be read at the rate of 120 times per second when the control signal is received. Accordingly, a period in which the one cycle processing related to the touch input function is performed changes from 60 Hz to 120 Hz.

Then, the control circuit 300 changes the threshold value used in binarization processing after switching the operation mode to the fast mode (step S104). When the operation mode switches from the normal mode (60 Hz) to the fast mode (120 Hz), a read period of each received light signal becomes short. The photodetection circuit O1 outputs a received light signal having a signal level corresponding to the received light amount, but the amount of electric charges accumulated in a capacitor provided in the photodetection circuit O1 is halved when a read period of a received light signal changes to a half period, for example. As a result, a signal level of the received light signal that is output also decreases by the reduced amount of electric charges. For this reason, in the fast mode, the control circuit 300 needs to lower the threshold value used in the binarization processing compared with that in the normal mode.

For example, assuming that a threshold value used when the surrounding area of the liquid crystal display device 1 is bright and an operation mode is a normal mode (60 Hz) is a threshold value $T1_{60}$, a threshold value used when the surrounding area of the liquid crystal display device 1 is bright and an operation mode is a fast mode (120 Hz) is a threshold value $T1_{120}$, a threshold value used when the surrounding area of the liquid crystal display device 1 is dark and an operation mode is a normal mode (60 Hz) is a threshold value $T2_{60}$, and a threshold value used when the surrounding area of the liquid crystal display device 1 is dark and an operation mode is a fast mode (120 Hz) is a threshold value $T2_{120}$, these threshold values $T1_{60}$, $T1_{120}$, $T2_{60}$, and $T2_{120}$ are stored in a memory (not shown) within the liquid crystal display device 1 in a state of being matched with information on the operation mode (or a period) or the ambient brightness. The control circuit 300 determines the brightness around the liquid crystal display device 1 on the basis of a measurement result of ambient light. When the surrounding area of the liquid crystal display device 1 is bright, the control circuit 300 reads the threshold value $T1_{120}$ from the memory and sets the threshold value $T1_{120}$ as a threshold value to be used in the binarization processing. In addition, when the surrounding area of the liquid crystal display device 1 is dark, the control circuit 300 reads the threshold value $T2_{120}$ from the memory and sets the threshold value $T2_{120}$ as a threshold value to be used in the binarization processing. That is, by the processing shown in step S104, the threshold value used in the binarization processing is changed from the threshold value $T1_{60}$ to the threshold value $T1_{120}$ when the surrounding area of the liquid crystal display device 1 is bright. In addition, when the surrounding area of the liquid crystal display device 1 is dark, the threshold value used in the binarization processing is changed from the threshold value $T2_{60}$ to the threshold value $T2_{120}$.

In addition, the threshold value may not be changed in step S104 depending on a method of measuring the received light amount in the photodetection circuit O1 or the type of a sensor which senses that a finger or a touch pen touches the display screen. In such a case, the mode switching process 1 is ended without performing processing shown in step S104, after performing the processing shown in step S103.

Moreover, although a time for which a finger or a touch pen continuously touches the display screen is counted and the operation mode is switched from the normal mode to the fast mode when the count time reaches the predetermined time or more (step S102: YES) in the mode switching process 1 shown in FIG. 3A, the operation mode may be immediately switched to the fast mode regardless of the touch time when it is determined that the finger or the touch pen touches the display screen (step S101: YES).

In this case, when the touch input ends in a short time, for example, like touching a button displayed on a screen with a finger or a touch pen, the operation mode immediately returns to the normal mode (60 Hz) even if the operation mode immediately switches to the fast mode (120 Hz) in response to touch of the finger or the touch pen onto the display screen regardless of the touch time. As a result, the power consumption increases by the complicated switching of the operation mode. In addition, although high traceability can be obtained by raising the temporal resolution related to detection of a touch position by switching to the fast mode, such high traceability is required in a case where a finger or a touch pen continuously touches the display screen for a predetermined time or more, such as a case where a handwritten character or picture is input. Therefore, in the case of a configuration in which the operation mode switches to the fast mode in consideration of the touch time, the power consumption can be further reduced compared with a case where the operation mode switches to the fast mode as soon as the finger or the touch pen touches the display screen regardless of the touch time.

On the other hand, the mode switching process 2 shown in FIG. 3B is executed when the operation mode is a fast mode. As described above, in the fast mode, one cycle processing related to the touch input function is performed every 120 Hz. First, the control circuit 300 determines whether there is a touch on the basis of received light signals for one screen ('m×n' received light signals) that have been newly read (step S201). Basically, in step S201, it is determined whether or not there is a touch using the same method as step S101 of the mode switching process 1 described above, step S201 is different from step S101 in that a threshold value used in binarization processing is set to $T1_{120}$ or $T2_{120}$ instead of $T1_{60}$ or $T2_{60}$.

That is, first, the control circuit 300 compares a signal level of each received light signal for one screen with the threshold value $T1_{120}$ or the threshold value $T2_{120}$ and converts the received light signal into a binary signal. Although the threshold value used herein is basically set in step S104 of the mode switching process 1 described above, the threshold value may be suitably changed between the threshold value $T1_{120}$ and the threshold value $T2_{120}$ on the basis of a measurement result of ambient light when the surrounding area of the liquid crystal display device 1 has changed from a bright state to a dark state or from a dark state to a bright state on the contrary. That is, the threshold value $T1_{120}$ is used when the surrounding area of the liquid crystal display device 1 is bright, and the threshold value $T2_{120}$ is used when the surrounding area of the liquid crystal display device 1 is dark. Then, the control circuit 300 counts the number of binary signals with signal values of '1', for example, among the generated binary signals for one screen ('m×n' binary signals). When the count value is a value within a range set by the upper and lower limits stored in a memory, the control circuit 300 determines that there is a touch (step S201: NO). On the other hand, when the count value is not a value within the range, the control circuit 300 determines that there is no touch (step S201: YES). Moreover, as described above, values of the upper and lower limits compared with the count value are different in the case where the surrounding area of the liquid crystal display device 1 is bright and the case where the surrounding area of the liquid crystal display device 1 is dark.

When it is determined that there is a touch in step S201, the mode switching process 2 is ended. In this case, the operation mode is still the fast mode. On the other hand, when it is determined that there is no touch in step S201, the control circuit 300 switches the operation mode from the fast mode to the normal mode (step S202).

In addition, when switching the operation mode to the normal mode, a control signal that instructs the change (change to 60 Hz) of a period is transmitted from the control circuit 300 to the scanning circuit 500 for sensors and the received light signal processing circuit 600. When the control signal is received, the scanning circuit 500 for sensors changes the timing for sequentially selecting 'm' scanning lines so that the received light signals for one screen can be read at the rate of 60 times per second. Similarly, also in the received light signal processing circuit 600, the timing for reading the received light signals using 'n' read lines is changed so that the received light signals for one screen can be read at the rate of 60 times per second when the control signal is received. Accordingly, a period in which the one cycle processing related to the touch input function is performed changes from 120 Hz to 60 Hz.

Then, the control circuit 300 changes the threshold value used in binarization processing after switching the operation mode to the normal mode (step S203). Since the threshold values $T1_{60}$, $T1_{120}$, $T2_{60}$, and $T2_{120}$ are stored in the memory within the liquid crystal display device 1 as described above, the control circuit 300 determines the brightness around the liquid crystal display device 1 on the basis of a measurement result of ambient light. When the surrounding area of the liquid crystal display device 1 is bright, the control circuit 300 reads the threshold value $T1_{60}$ from the memory and sets the threshold value $T1_{60}$ as a threshold value to be used in the binarization processing. In addition, when the surrounding area of the liquid crystal display device 1 is dark, the control circuit 300 reads the threshold value $T2_{60}$ from the memory and sets the threshold value $T2_{60}$ as a threshold value to be used in the binarization processing. That is, by the processing shown in step S203, the threshold value used in the binarization processing is changed from the threshold value $T1_{120}$ to the threshold value $T1_{60}$ when the surrounding area of the liquid crystal display device 1 is bright. In addition, when the surrounding area of the liquid crystal display device 1 is dark, the threshold value used in the binarization processing is changed from the threshold value $T2_{120}$ to the threshold value $T2_{60}$.

In addition, the threshold value may not be changed in step S203 depending on a method of measuring the received light amount in the photodetection circuit O1 or the type of a sensor which senses that a finger or a touch pen touches the display screen. In such a case, the mode switching process 2 is ended without performing processing shown in step S203, after performing the processing shown in step S202.

In the mode switching process 2 shown in FIG. 3B, the operation mode immediately switches from the fast mode to the normal mode regardless of duration time when it is determined that there is no touch (step S201: YES). However, the operation mode may be immediately switched to the normal mode when a state of no-touch continues for a predetermined time or more as a configuration in which it is determined whether or not there is a touch in step S201 and then it is determined whether or not a state, in which a result of determination that there is no touch is continuously obtained, continues for a predetermined time (for example, 0.2 second). Since the determination result of step S201 is obtained every 120 Hz, the control circuit 300 may count the number of times of results of determination that there is no touch, which are continuously obtained, and determine whether or not the count value has reached the number of times equivalent to the predetermined time described above.

For example, in case of inputting a handwritten character with a finger or a touch pen, the finger or the touch pen is once away from the display screen when moving for a next stroke even though it is very short. If the operation mode is switched in such a case, switching of the operation mode becomes complicated, which increases the power consumption. Therefore, in the case of a configuration in which the operation mode switches to the normal mode in consideration of the time for which the state of no-touch continues, the power consumption can be further reduced compared with a case where the operation mode switches to the normal mode immediately when the finger or the touch pen is away from the display screen regardless of the duration time. In addition, the predetermined time may also be set to an arbitrary time, such as 10 seconds, 5 minutes, or 10 minutes, without being limited to 0.2 second.

In addition, when the control circuit 300 has detected a touch position by the one cycle processing related to the touch input function, the control circuit 300 updates the display of a handwritten image on the basis of the detected touch position.

Figure 4A:
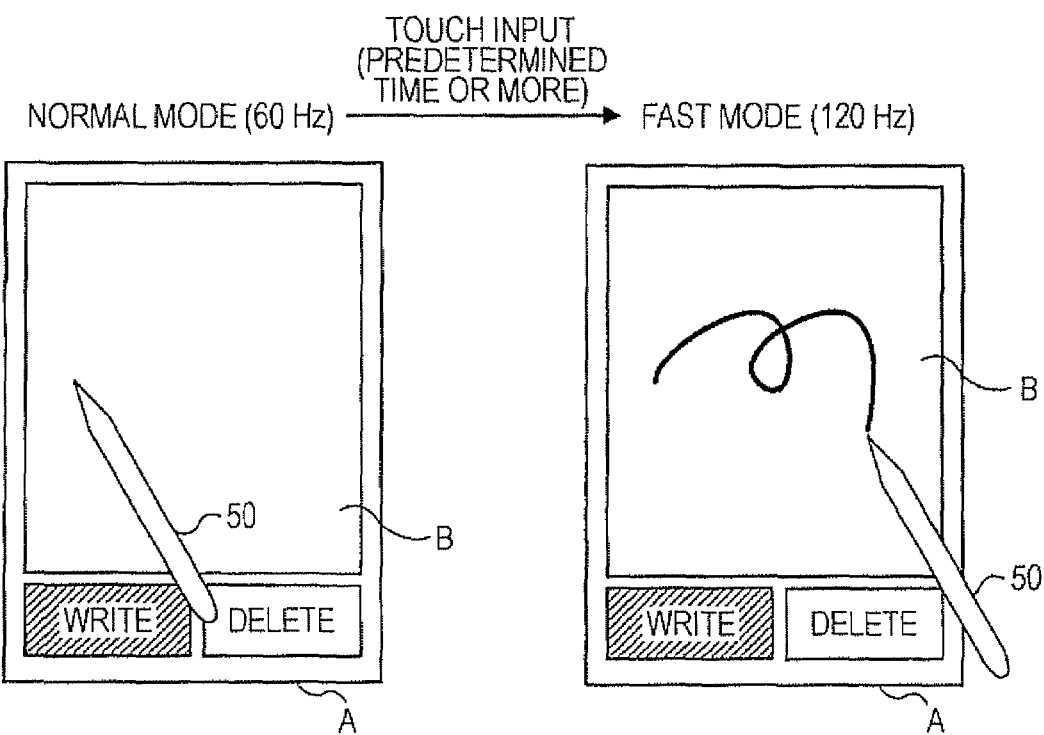
Figure 4B:
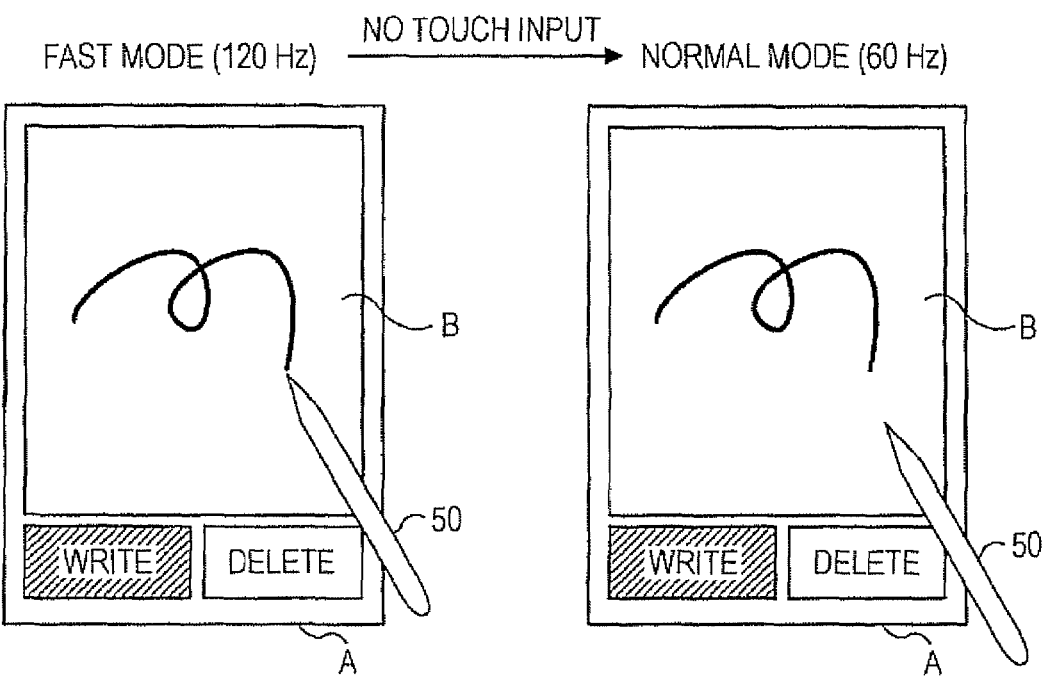

FIGS. 4A and 4B are views illustrating the outline of the mode switching processes 1 and 2.

As shown in FIGS. 4A and 4B, a 'write' button and 'delete' button are displayed in a lower side of the image display area A (display screen). When a finger or a touch pen 50 touches a portion of the 'write' button, it becomes possible to input a handwritten image, such as a character or a picture, in a handwriting input area B provided above the portion. As shown on the left side of FIG. 4A, when neither the finger nor the touch pen 50 touches the handwriting input area B, the operation mode is a normal mode. In this case, one cycle processing related to the touch input function is performed every 60 Hz. In addition, as shown on the right side of FIG. 4A, when a state where the finger or the touch pen 50 touches the handwriting input area B continues for a predetermined time or more, the operation mode switches to the fast mode. In this case, the one cycle processing related to the touch input function is performed every 120 Hz. In addition, as shown in FIG. 4B, when the finger or the touch pen 50 is away from the display screen after switching to the fast mode, the operation mode switches to the normal mode.

As described above, according to the present embodiment, the liquid crystal display device 1 senses whether or not the finger or the touch pen 50 touches the display screen and then operates in the normal mode to read received light signals for one screen every 60 Hz when there is no touch or when the touch time is less than a predetermined time even if the finger or the touch pen 50 touches the display screen. On the other hand, when the finger or the touch pen 50 continuously touches the screen for a predetermined time or more, the liquid crystal display device 1 operates in the fast mode to read the received light signals for one screen every 120 Hz.

Accordingly, in the case where the finger or the touch pen 50 does not touch the screen or the case where the touch time is less than the predetermined time even if the finger or the touch pen 50 touches the screen, the frequency at which the received light signals for one screen are read can be reduced to the half of that in the case where the finger or the touch pen 50 continuously touches the screen for the predetermined time or more. As a result, since the process load required for reading of received light signals or binarization processing can be reduced to the half, the power consumption of the liquid crystal display device 1 can be reduced. On the other hand, in the case where the finger or the touch pen 50 continuously touches the screen for the predetermined time or more, the frequency at which the received light signals for one screen are read can be increased to twice that in the case where the finger or the touch pen 50 does not touch the screen or the case where the touch time is less than the predetermined time even if the finger or the touch pen 50 touches the screen. As a result, since the temporal resolution related to detection of a touch position is raised, it becomes possible to sufficient trace the movement of the finger or the touch pen 50 even if the finger or the touch pen 50 moves at high speed.

Thus, according to the present embodiment, a period in which received light signals for one screen are read may be changed, and the received light signals for one screen are read at short periods only when the finger or the touch pen 50 continuously touches the screen for the predetermined time or more. Therefore, the power consumption can be reduced, and the touch input can be smoothly performed while tracing the movement of the finger or the touch pen 50 even if the finger or the touch pen 50 moves at high speed.

Furthermore, according to the present embodiment, the power consumption can be further reduced since the one cycle processing can be performed every 120 Hz only in a period in which the touch input is actually performed, compared with not only the case where the one cycle processing is performed with the same period all the time but also the case where the one cycle processing is performed every 120 Hz only in a period in which the screen for handwriting input shown in FIGS. 4A and 43 is displayed and the one cycle processing is performed every 60 Hz at other periods, for example.

In addition, the period in which the one cycle processing related to the touch input function is performed may be set to 30 Hz in the normal mode and to 100 Hz in the fast mode. In short, it is preferable that a period in the fast mode be set shorter than that in the normal mode.

Embodiment B1

Next, an embodiment B1 will be described.

In addition, since the hardware configuration of a liquid crystal display according to the present embodiment is almost similar to that of the liquid crystal display device 1 according to the embodiment A1, the same reference numerals as in the embodiment A1 are used. In addition, an explanation on the same parts as in the embodiment A1 will be omitted.

The liquid crystal display device 1 according to the present embodiment can determine whether or not there is a touch on the basis of received light signals for one screen and determine whether or not the finger or the touch pen 50 approaches close to the display screen (whether or not there is approach). In addition, the distance allowing it to be determined whether or not there is approach is a distance within which reflected light or shadow of a finger or the touch pen 50 can be sensed from the received light amount of each photodetection circuit O1.

Specifically, first, the control circuit 300 compares a signal level of each of read received light signals for one screen with a threshold value and converts the read received light signals into binary signals (binarization processing). Largely two threshold values are used in the binarization processing. One is a threshold value T for touch determination. The threshold value T is used to determine whether or not the signal level of each received light signal has reached a level of the received light amount when the finger or the touch pen 50 touches the display screen. The other one is a threshold value S for approach determination. The threshold value S is used to determine whether or not the signal level of each received light signal has reached a level of the received light amount when the finger or the touch pen 50 approaches close to the screen. For example, by acquiring a plurality of sample data on the received light amount (signal level of a received light signal) of the photodetection circuit O1 which is located in a portion actually touched by the finger or the touch pen 50 on the display screen, a value of the threshold value T for touch determination can be set from the acquired sample data. Similarly, by acquiring a plurality of sample data on the received light amount of the photodetection circuit O1 which is located in a portion actually touched by the finger or the touch pen 50 on the display screen, the threshold value S for approach determination can also be set from the acquired sample data.

That is, in case of using the threshold value T for touch determination in the binarization processing described above, the control circuit 300 determines whether or not a signal level of each received light signal has reached a level of the received light amount when the finger or the touch pen 50 touches the display screen and outputs a binary signal with different signal values in a case where the signal level has reached the level of the received light amount and a case where the signal level has not reached the level of the received light amount. On the other hand, in case of using the threshold value S for approach determination in the binarization processing described above, the control circuit 300 determines whether or not the signal level of each received light signal has reached a level of the received light amount when the finger or the touch pen 50 approaches close to the display screen and outputs a binary signal with different signal values in a case where the signal level has reached the level of the received light amount and a case where the signal level has not reached the level of the received light amount. In addition, since the number of received light signals for one screen is 'm×n', 'm×n' binary signals are also generated corresponding to the 'm×n' received light signals.

Moreover, in practice, it is necessary to use different threshold values in a case where the surrounding area of the liquid crystal display device 1 is bright and a case where the surrounding area of the liquid crystal display device 1 is dark. That is, a threshold value T1 used when the surrounding area of the liquid crystal display device 1 is bright and a threshold value T2 used when the surrounding area of the liquid crystal display device 1 is dark are needed as the threshold value T for touch determination. In addition, a threshold value S1 used when the surrounding area of the liquid crystal display device 1 is bright and a threshold value S2 used when the surrounding area of the liquid crystal display device 1 is dark are similarly needed as the threshold value S for approach determination. The threshold values T1 and T2 for these touch determination and the threshold values S1 and S2 for approach determination are stored in a memory (not shown) provided in the liquid crystal display device 1.

Figures 5A, 5B:
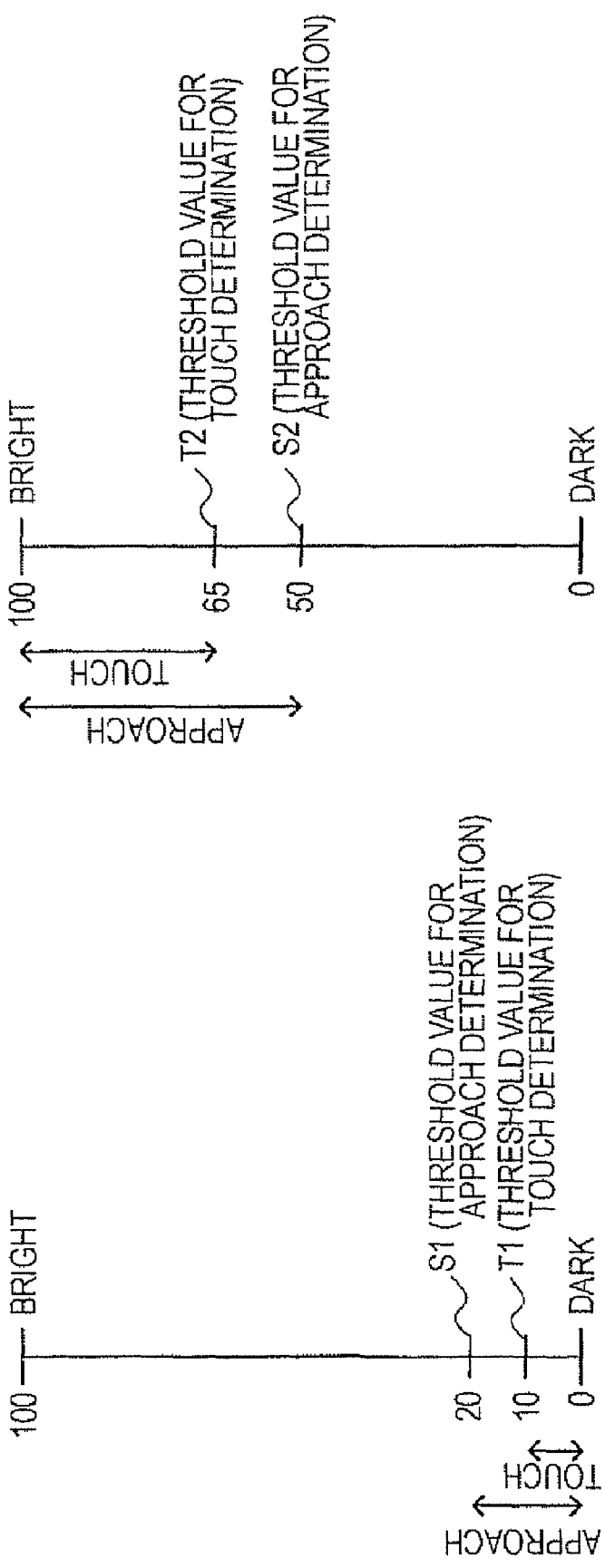
FIGS. 5A and 5B are views illustrating threshold values T1 and T2 for touch determination and threshold values S1 and S2 for approach determination.

For example, a case where the surrounding area of the liquid crystal display device 1 is bright and a portion touched by a finger or the touch pen 50 on the display screen becomes a shadow is considered. As shown in FIG. 5A, it is assumed that the signal level of each received light signal has a value in a range of '0' (dark) to '100' (bright), and the threshold value T1 for touch determination is set to '10' and the threshold value S1 for approach determination is set to '20'. In this case, the control circuit 300 converts a received light signal with a signal level less than '10' into a binary signal '1' and converts a received light signal with a signal level of '10' or more into a binary signal '0' if the threshold value T1 for touch determination is used in the binarization processing. In addition, the control circuit 300 converts a received light signal with a signal level less than '20' into a binary signal '1' and converts a received light signal with a signal level of '20' or more into a binary signal '0' if the threshold value S1 for approach determination is used in the binarization processing.

Next, a case where the surrounding area of the liquid crystal display device 1 is dark and a portion touched by a finger or the touch pen 50 on the display screen becomes bright by reflected light is considered. As shown in FIG. 5B, it is assumed that the signal level of each received light signal has a value in a range of '0' (dark) to '100' (bright), and the threshold value T2 for touch determination is set to '65' and the threshold value S2 for approach determination is set to '50', similar to the case where the surrounding area of the liquid crystal display device 1 is bright. In this case, the control circuit 300 converts a received light signal with a signal level of '65' or more into a binary signal '1' and converts a received light signal with a signal level less than '65' into a binary signal '0' if the threshold value T2 for touch determination is used in the binarization processing. In addition, the control circuit 300 converts a received light signal with a signal level 1501 or more into a binary signal '1' and converts a received light signal with a signal level less than '50' into a binary signal '0' if the threshold value S2 for approach determination is used in the binarization processing.

For example, as shown in FIG. 2, in the case when a value of a binary signal is '1' for the four photodetection circuits O1 at the arrangement positions (X, Y) of (2, 2), (2, 3), (3, 2), and (3, 3) in the image display area A, a portion in which the value of the binary signal becomes '1' is a touched portion in which a signal level of a received light signal is less than '10' if the threshold value T1 for touch determination is used in the binarization processing and a portion of shadow in which a signal level of a received light signal is less than '20' if the threshold value S1 for approach determination is used in the binarization processing. In addition, the portion in which the value of the binary signal becomes '1' is a touched portion in which a signal level of a received light signal is '65' or more if the threshold value T2 for touch determination is used in the binarization processing and a portion with strong reflected light in which a signal level of a received light signal is '50' or more if the threshold value S2 for approach determination is used in the binarization processing.

Accordingly, in case where the threshold value T (T1 or T2) for touch determination is used in the binarization processing, the control circuit 300 can determine that there is a touch when a binary signal with a signal value of '1' is included in binary signals for one screen and determine that there is no touch when the binary signal with a signal value of '1' is not included. In addition, in case where the threshold value S (S1 or S2) for approach determination is used in the binarization processing, the control circuit 300 can determine that there is approach when a binary signal with a signal value of '1' is included in binary signals for one screen and determine that there is no approach when the binary signal with a signal value of '1' is not included. Thus, the control circuit 300 can perform two kinds of determinations of touch determination and approach determination by changing the threshold value used in the binarization processing.

In addition, when it is determined that there is a touch, the control circuit 300 detects the arrangement position (X,Y) of the photodetection circuit O1, in which a value of a binary signal becomes '1', as a touch position of a finger or the touch pen 50.

Moreover, similar to the case of the touch determination described in the embodiment A1, the approach determination may also be made on the basis of a count value obtained by counting the number of binary signals whose signal values become '1'. For example, the control circuit 300 may determine that there is approach when the count value is a predetermined value or more and determine that there is no approach when the count value is less than the predetermined value. Moreover, upper and lower limits of the number of binary signals whose signal values become '1' when a finger or the touch pen 50 approaches the display screen are set from the area of a shadow or a portion, upon which reflected light hits, made when the finger or the touch pen 50 approaches the display screen and the arrangement density of the photodetection circuits O1, for example, and the upper and lower limits are stored in a memory. Then, the control circuit 300 may determine that there is approach when the count value is a value within a range set by the upper and lower limits stored in the memory and determine that there is no approach when the count value is not a value within the range. In addition, for a plurality of binary signals whose signal values become '1', it may be considered whether or not the photodetection circuits O1 corresponding to the binary signals are adjacent to each other. In addition, it may be possible to array values of binary signals for one screen according to the arrangement of the corresponding photodetection circuits O1, to create a binary image in which a portion of '1' is set to be black and a portion of '0' is set to be white, and to consider whether or not the shape of the black portion of the binary image is similar to the shape of a shadow or a portion, upon which reflected light hits, made when the finger or the touch pen 50 approaches the display screen.

Furthermore, the number of binary signals whose signal values become '1' in the case of touch determination is different from that in the case of approach determination (for example, a shadow made at the time of approach is larger than a shadow (touch area) made at the time of touch). Accordingly, values of the upper and lower limits compared with the count value are different in cases of touch determination and approach determination. In addition, the size of a shadow made on the display screen by approach or touch of the finger or the touch pen 50 when the surrounding area of the liquid crystal display device 1 is bright is different from the size of a portion, upon which reflected light hits, generated on the display screen by approach or touch of the finger or the touch pen 50 when the surrounding area of the liquid crystal display device 1 is dark. Accordingly, also in the case where the surrounding area of the liquid crystal display device 1 is bright and the case where the surrounding area of the liquid crystal display device 1 is dark, values of the upper and lower limits compared with the count value are different.

Furthermore, the liquid crystal display device 1 according to the present embodiment performs, every 60 Hz or 10 Hz, one cycle processing related to the touch input function of [1] to [3], which is [1] received light signals are read from all photodetection circuits O1 provided in the image display area A, [2] it is determined whether or not there is a touch or approach on the basis of the read received light signals for one screen, and [3] the touch position is detected when it is determined that there is a touch. The liquid crystal display device 1 according to the present embodiment has a normal mode and a low consumption mode as operation modes related to the touch input function, and performs the one cycle processing every 60 Hz in the normal mode and performs the one cycle processing every 10 Hz in the low consumption mode.

Accordingly, the control circuit 300 controls the scanning circuit 500 for sensors and the received light signal processing circuit 600 to read received light signals for one screen at the rate of 60 times per second in the normal mode and to read received light signals for one screen at the rate of 10 times per second in the low consumption mode. That is, the control circuit 300 changes the timing for sequentially selecting 'm' scanning lines in the scanning circuit 500 for sensors and the timing for reading received light signals by using 'n' read lines in the received light signal processing circuit 600 according to the operation mode. For example, in the normal mode, the control circuit 300 reads the received light signals for one screen in a period of ⅙ of that in the low consumption mode.

In addition, the one cycle processing related to the touch input function includes processing for determining whether or not there is a touch or approach and processing for detecting the touch position as described above. Accordingly, the actual time taken to read the received light signals for one screen is shorter than a time corresponding to one period in which the one cycle processing is performed. For example, the actual time taken to read the received light signals for one screen is a predetermined time shorter than 16.6 ms in the normal mode and is a predetermined time shorter than 100 ms in the low consumption mode.

Figure 6A:
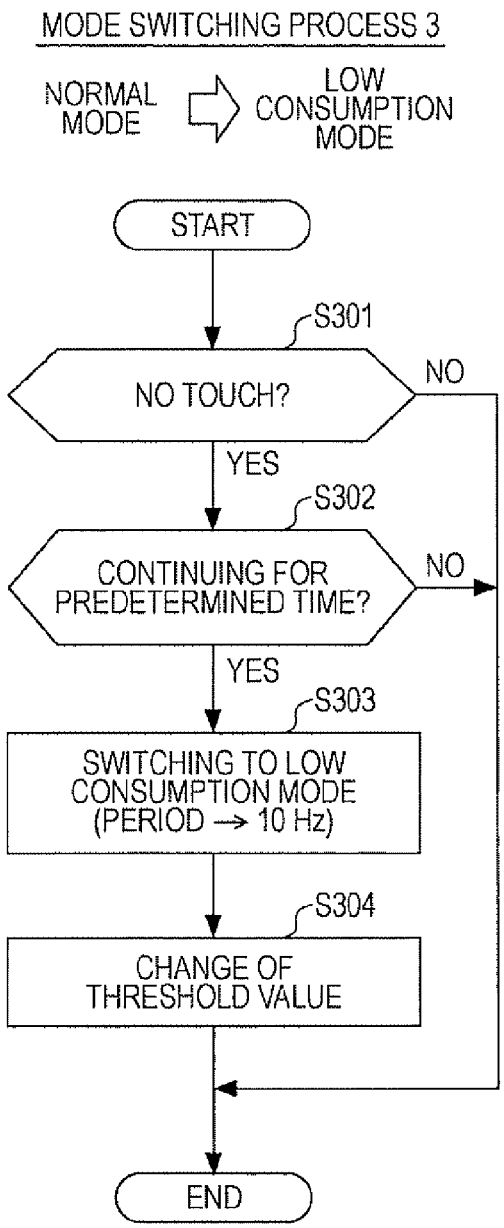
FIGS. 6A and 6B are flow charts illustrating the flows of mode switching processes 3 and 4 in an embodiment 31.
Figure 6B:
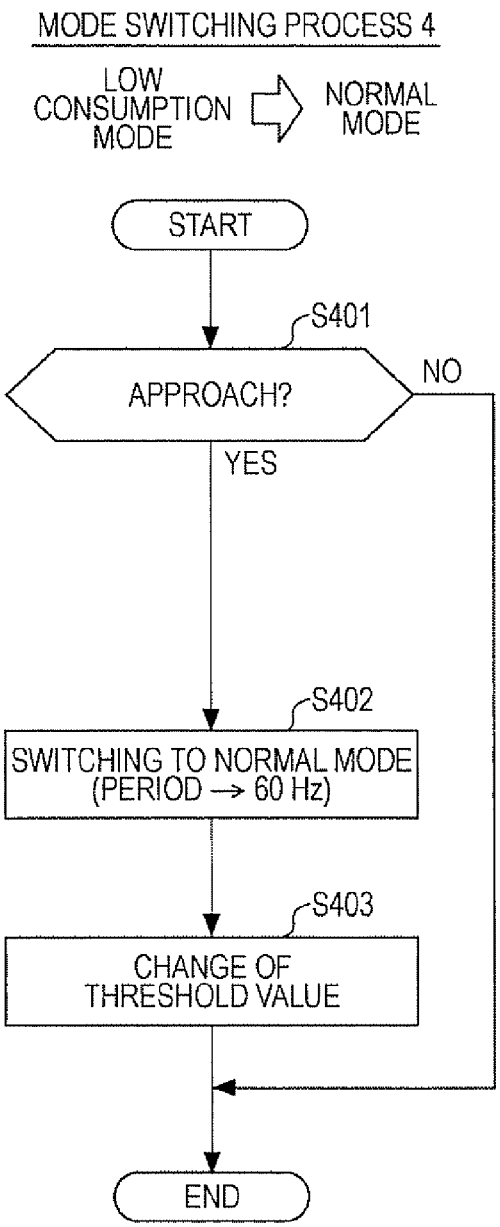

FIGS. 6A and 6B are flow charts illustrating the flows of mode switching processes 3 and 4 in the embodiment B1. The mode switching process 3 shown in FIG. 3A is executed when the operation mode is a normal mode. Moreover, in the liquid crystal display device 1, for example, when a user instructs the touch input function to be turned on, the operation mode is changed to the normal mode after starting reception of the touch input. In the case of the liquid crystal display device 1 that performs all operations basically by touch input using a finger or the touch pen 50, a power switch is pressed to complete initial processing and then reception of the touch input is started to make the operation mode change to the normal mode. As described above, in the normal mode, one cycle processing related to the touch input function is performed every 60 Hz.

First, the control circuit 300 determines whether there is a touch, that is, whether or not a finger or the touch pen 50 touches the display screen on the basis of received light signals for one screen ('m×n' received light signals) that have been newly read (step S301)+

Specifically, first, the control circuit 300 compares a signal level of each of the received light signals for one screen with the threshold value T (specifically, the threshold value T1 or T2) and converts each of the received light signals into a binary signal as described above. In addition, although the threshold value T used herein is basically set in step S403 of the mode switching process 4 which will be described later, the threshold value T may be suitably changed between the threshold values T7 and T2 on the basis of a measurement result of ambient light when the surrounding area of the liquid crystal display device 1 has changed from a bright state to a dark state or from a dark state to a bright state on the contrary. That is, the threshold value T1 is used when the surrounding area of the liquid crystal display device 1 is bright, and the threshold value T2 is used when the surrounding area of the liquid crystal display device 1 is dark. Then, the control circuit 300 counts the number of binary signals with signal values of '1', for example, among the generated binary signals for one screen ('m×n' binary signals). When the count value is a value within a range set by the upper and lower limits stored in a memory, the control circuit 300 determines that there is a touch (step S301: NO). On the other hand, when the count value is not a value within the range, the control circuit 300 determines that there is no touch (step S301; YES). Moreover, as described above, values of the upper and lower limits compared with the count value are different in the case where the surrounding area of the liquid crystal display device 1 is bright and the case where the surrounding area of the liquid crystal display device 1 is dark or in the case of touch determination and the case of approach determination.

When it is determined that there is a touch in step S301, the mode switching process 3 is ended. In this case, the operation mode is still the normal mode. In addition, when it is determined that there is a touch as described above, the control circuit 300 detects the touch position after ending the mode switching process 3. When detecting the touch position, the binary signals for one screen generated in determining whether or not there is a touch in step S301 are used. In addition, when the touch position has been detected, the control circuit 300 updates the display of a handwritten image on the basis of the detected touch position as needed.

On the other hand, when it is determined that there is no touch in step S301, the control circuit 300 determines whether or not a state, in which a result of determination that there is no touch is continuously obtained, continues for a predetermined time (for example, 5 minutes) (step S302). In addition, since the one cycle processing related to the touch input function is performed every 60 Hz in the normal mode, the determination result of step S301 is obtained every 60 Hz. Accordingly, the control circuit 300 may count the number of times of results of determination that there is no touch, which are continuously obtained, and determine whether or not the count value has reached the number of times equivalent to the predetermined time described above. In addition, the predetermined time may be set to an arbitrary time, such as 60 seconds or 30 minutes.

When it is determined that the state does not continue for the predetermined time in step S302, the mode switching process 3 is ended. Also in this case, the operation mode is still the normal mode. On the other hand, when it is determined that the state continues for the predetermined time in step S302, the control circuit 300 switches the operation mode from the normal mode to the low consumption mode (step S303).

In addition, when switching the operation mode to the low consumption mode, a control signal that instructs switching of the operation mode (switching to the low consumption mode) is transmitted from the control circuit 300 to the scanning circuit 500 for sensors and the received light signal processing circuit 600. When the control signal is received, the scanning circuit 500 for sensors changes the timing for sequentially selecting 'm' scanning lines so that the received light signals for one screen can be read at the rate of 10 times per second. Similarly, also in the received light signal processing circuit 600, the timing for reading the received light signals using 'n' read lines is changed so that the received light signals for one screen can be read at the rate of 10 times per second when the control signal is received. Accordingly, a period in which the one cycle processing related to the touch input function is performed changes from 60 Hz to 10 Hz.

Here, a case where it is sensed that the finger or the touch pen 50 has not touched the display screen continuously for the predetermined time, that is, a case where the touch input does not continue for the predetermined time is basically a case where the finger or the touch pen 50 is positioned relatively apart from the display screen. Accordingly, when the finger or the touch pen 50 is positioned relatively apart from the display screen as described above, it is preferable that the operation mode be switched from the low consumption mode to the normal mode when the finger or the touch pen 50 approaches close to the display screen later. Then, the control circuit 300 changes the threshold value used in binarization processing from the threshold value T for touch determination to the threshold value S for approach determination after switching the operation mode to the low consumption mode (step S304).

Since the threshold values T1 and T2 for touch determination and the threshold values S1 and S2 for approach determination are stored in the memory within the liquid crystal display device 1 as described above, the control circuit 300 determines the brightness around the liquid crystal display device 1 on the basis of a measurement result of ambient light. When the surrounding area of the liquid crystal display device 1 is bright, the control circuit 300 reads the threshold value S1 for approach determination from the memory and sets the threshold value S1 as a threshold value to be used in the binarization processing. In addition, when the surrounding area of the liquid crystal display device 1 is dark, the control circuit 300 reads the threshold value S2 for approach determination from the memory and sets the threshold value S2 as a threshold value to be used in the binarization processing. That is, by the processing shown in step S304, the threshold value used in the binarization processing is changed from the threshold value T1 for touch determination of '0' to the threshold value S1 for approach determination of '20' when the surrounding area of the liquid crystal display device 1 is bright. In addition, when the surrounding area of the liquid crystal display device 1 is dark, the threshold value used in the binarization processing is changed from the threshold value T2 for touch determination of '65' to the threshold value S2 for approach determination of '50'.

On the other hand, the mode switching process 4 shown in FIG. 6B is executed when the operation mode is the low consumption mode. As described above, in the low consumption mode, one cycle processing related to the touch input function is performed every 10 Hz. First, the control circuit 300 determines whether there is approach, that is, whether or not a finger or the touch pen 50 approaches close to the display screen on the basis of received light signals for one screen ('m×n' received light signals) that have been newly read (step S401).

Specifically, first, the control circuit 300 compares a signal level of each of the received light signals for one screen with the threshold value S for approach determination (specifically, the threshold value S1 or S2) and converts each of the received light signals into a binary signal as described above. In addition, although the threshold value S used herein is basically set in step S304 of the mode switching process 3 described above, the threshold value S may be suitably changed between the threshold values S1 and S2 on the basis of a measurement result of ambient light when the surrounding area of the liquid crystal display device 1 has changed from a bright state to a dark state or from a dark state to a bright state on the contrary. That is, the threshold value S1 is used when the surrounding area of the liquid crystal display device 1 is bright, and the threshold value S2 is used when the surrounding area of the liquid crystal display device 1 is dark. Then, the control circuit 300 counts the number of binary signals with signal values of '1', for example, among the generated binary signals for one screen ('m×n' binary signals). When the count value is a value within a range set by the upper and lower limits stored in a memory, the control circuit 300 determines that there is approach (step S401: YES). On the other hand, when the count value is not a value within the range, the control circuit 300 determines that there is no approach (step S401: NO). Moreover, as described above, values of the upper and lower limits compared with the count value are different in the case where the surrounding area of the liquid crystal display device 1 is bright and the case where the surrounding area of the liquid crystal display device 1 is dark or in the case of touch determination and the case of approach determination.

When it is determined that there is no approach in step S401, the mode switching process 4 is ended. In this case, the operation mode is still the low consumption mode. On the other hand, when it is determined that there is approach in step S401, the control circuit 300 switches the operation mode from the low consumption mode to the normal mode (step S402).

In addition, when switching the operation mode to the normal mode, a control signal that instructs switching of the operation mode (switching to the normal mode) is transmitted from the control circuit 300 to the scanning circuit 500 for sensors and the received light signal processing circuit 600. When the control signal is received, the scanning circuit 500 for sensors changes the timing for sequentially selecting 'm' scanning lines so that the received light signals for one screen can be read at the rate of 60 times per second. Similarly, also in the received light signal processing circuit 600, the timing for reading the received light signals using 'n' read lines is changed so that the received light signals for one screen can be read at the rate of 60 times per second when the control signal is received. Accordingly, a period in which the one cycle processing related to the touch input function is performed changes from 10 Hz to 60 Hz.

Here, a case where it is sensed that the finger or the touch pen 50 has approached close to the display screen as described above is a case where a user is just trying to perform touch input. Accordingly, since a possibility that the finger or the touch pen 50 will touch the display screen is very high, it is necessary to prepare for the touch determination or detection of a touch position. Then, the control circuit 300 changes the threshold value used in binarization processing from the threshold value S for approach determination to the threshold value T for touch determination after switching the operation mode to the normal mode (step S403).

Since the threshold values T1 and T2 for touch determination and the threshold values S1 and S2 for approach determination are stored in the memory within the liquid crystal display device 1 as described above, the control circuit 300 determines the brightness around the liquid crystal display device 1 on the basis of a measurement result of ambient light. When the surrounding area of the liquid crystal display device 1 is bright, the control circuit 300 reads the threshold value T1 for touch determination from the memory and sets the threshold value T1 as a threshold value to be used in the binarization processing. In addition, when the surrounding area of the liquid crystal display device 1 is dark, the control circuit 300 reads the threshold value T2 for touch determination from the memory and sets the threshold value T2 as a threshold value to be used in the binarization processing. That is, by the processing shown in step S403, the threshold value used in the binarization processing is changed from the threshold value S1 for approach determination of '20' to the threshold value T1 for touch determination of '10' when the surrounding area of the liquid crystal display device 1 is bright. In addition, when the surrounding area of the liquid crystal display device 1 is dark, the threshold value used in the binarization processing is changed from the threshold value S2 for approach determination of '50' to the threshold value T2 for touch determination of '65'.

Figure 7A:
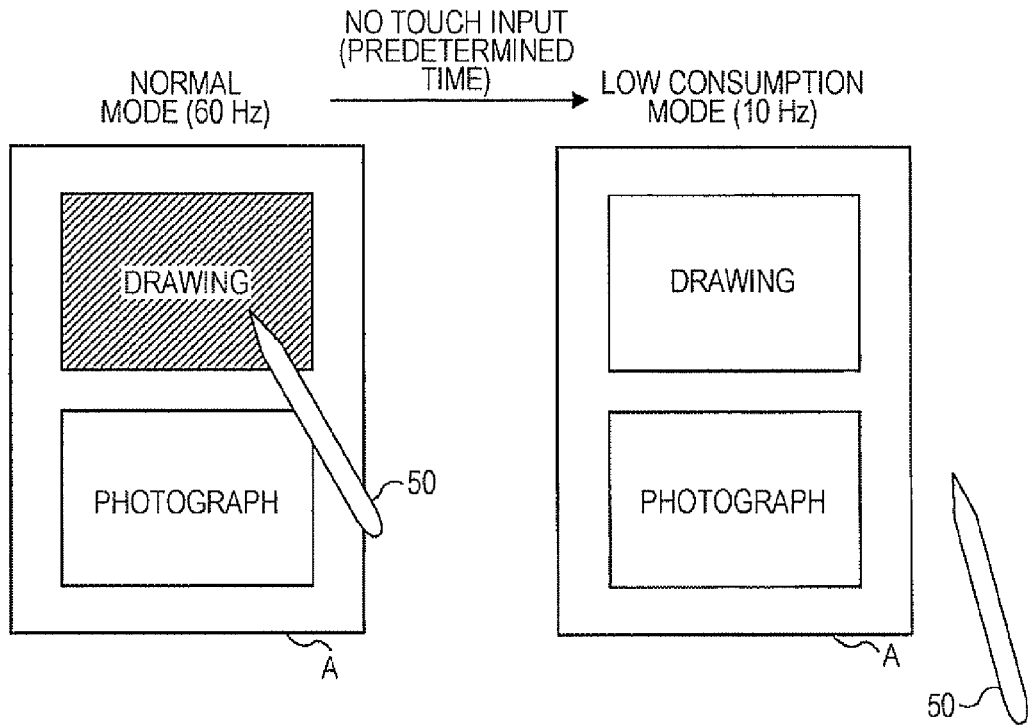
Figure 7B:
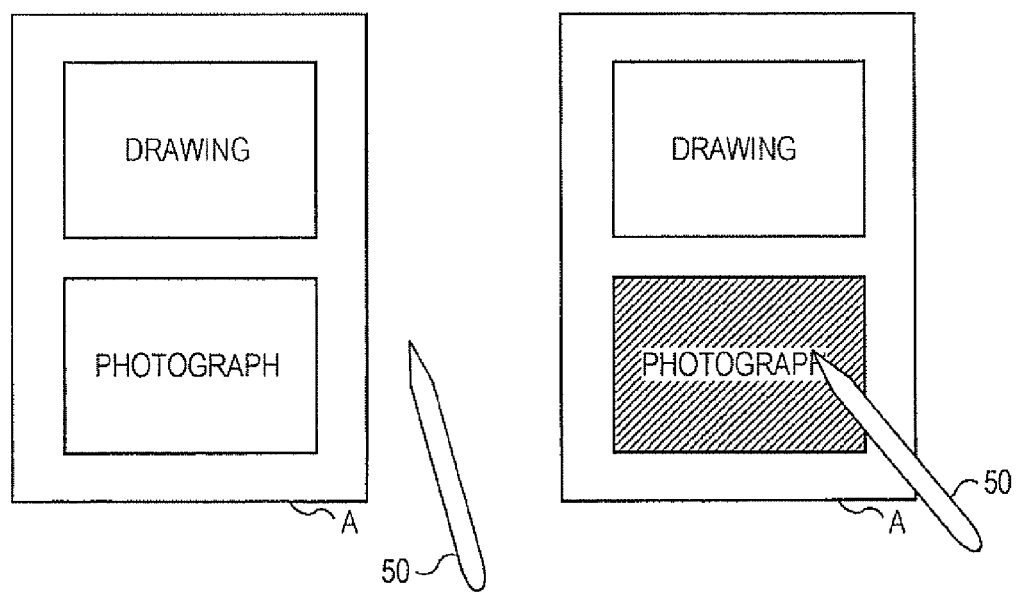

FIGS. 7A and 7B are views illustrating the outline of the mode switching processes 3 and 4.

As shown in FIGS. 7A and 7B, a 'drawing' button and a 'photograph' button are displayed in the image display area A (display screen). For example, when a portion of the 'drawing' button is touched by a finger or the touch pen 50, a handwritten picture may be input by touch input. In addition, when a portion of the 'photograph' button is touched by the finger or the touch pen 50, slide display of a plurality of photographic images stored in the memory may be made on the display screen. As shown on the left side of FIG. 7A, when either the finger or the touch pen 50 touches the display screen, the operation mode is a normal mode. In this case, one cycle processing related to the touch input function is performed every 60 Hz. In addition, as shown on the right side of FIG. 7A, when a state where the finger or the touch pen 50 does not touch the display screen continues for a predetermined time, the operation mode switches to the low consumption mode. In this case, one cycle processing related to the touch input function is performed every 10 Hz. In addition, as shown in FIG. 7B, when it is sensed that the finger or the touch pen 50 has approached close to the display screen after switching to the low consumption mode, the operation mode switches to the normal mode.

As described above, according to the present embodiment, when the liquid crystal display device 1 senses that the finger or the touch pen 50 has not touched the display screen continuously for a predetermined time, the liquid crystal display device 1 switches the operation mode from the normal mode to the low consumption mode and reads received light signals for one screen every 10 Hz. In addition, when the liquid crystal display device 1 senses that the finger or the touch pen 50 has approached close to the display screen, the liquid crystal display device 1 switches the operation mode from the low consumption mode to the normal mode and reads received light signals for one screen every 60 Hz. Accordingly, since the liquid crystal display device 1 operates in the low consumption mode until it is sensed that the finger or the touch pen 50 has approached close to the display screen after sensing that the finger or the touch pen 50 has not touched the display screen continuously for a predetermined time, the frequency at which the received light signals for one screen are read can be reduced to ⅙ of that in the normal mode. As a result, since the process load required for reading of received light signals or binarization processing can be reduced, the power consumption of the liquid crystal display device 1 can be reduced.

Moreover, since the liquid crystal display device 1 operates in the normal mode until it is sensed that the finger or the touch pen 50 has not touched the display screen continuously for a predetermined time after sensing that the finger or the touch pen 50 has approached close to the display screen, the frequency at which the received light signals for one screen are read can be increased to be larger than that in the low consumption mode. As a result, since the temporal resolution related to the touch determination or detection of a touch position can be improved, the touch determination or the detection of a touch position can be performed with high precision. In particular, by setting the timing for switching from the low consumption mode to the normal mode to a point of time when approach is sensed rather than a point of time when a touch is sensed, the precision related to the touch determination or the detection of a touch position before the finger or the touch pen 50 actually touches the screen can be improved.

In addition, the period in which the one cycle processing related to the touch input function is performed may be set to 120 Hz in the normal mode and to 60 Hz in the low consumption mode. In short, it is preferable that a period in the normal mode be set shorter than that in the low consumption mode.

Embodiment B2

In the embodiment B1, the case where the received light signals for one screen are read every 60 Hz in the normal mode and every 10 Hz in the low consumption mode has been described. In the present embodiment, a case where received light signals are read from only some photodetection circuits O1 provided in the image display area A in the low consumption mode will be described.

The liquid crystal display device 1 according to the present embodiment has a normal mode and a low consumption mode, similar to the case of the embodiment B1. In the normal mode, the scanning circuit 500 for sensors and the received light signal processing circuit 600 read received light signals every 60 Hz from all photodetection circuits O1 provided in the image display area A. On the other hand, in the low consumption mode, the scanning circuit 500 for sensors and the received light signal processing circuit 600 read the received light signals every 10 Hz from some of the photodetection circuits O1 provided in the image display area A.

Accordingly, the number of received light signals read every 60 Hz is 'm×n' in the normal mode, but the number of received light signals read every 10 Hz is less than 'm×n' in the low consumption mode. For example, when an area where a received light signal is read in the low consumption mode is set in the lower half of the image display area A, '(m×n)/2' received light signals are read every 10 Hz in the low consumption mode. Thus, since the 'm×n' received light signals are read every 60 Hz in the normal mode, 'm×n' binary signals are also generated every 60 Hz corresponding to the 'm×n' received light signals. On the other hand, in the low consumption mode, for example, when an area where a received light signal is read is set in the lower half of the image display area A, '(m×n)/2' received light signals are read every 10 Hz. Accordingly, '(m×n)/2' binary signals are also generated corresponding to the '(m×n)/2' received light signals.

Figure 8:
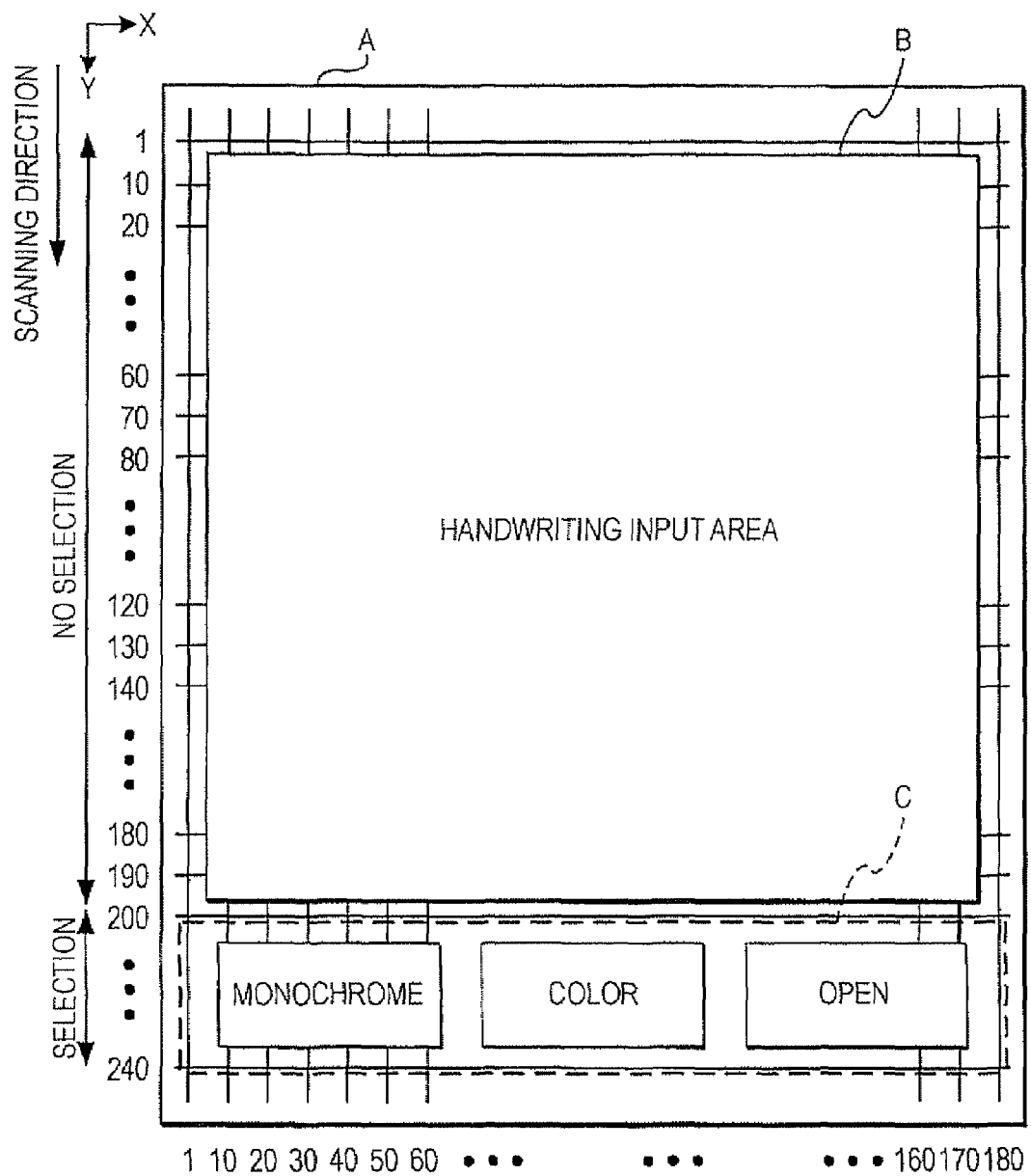
FIGS. 8 and 9 are views illustrating a normal mode and a low consumption mode in an embodiment B2 and a normal read mode and a partial read mode in an embodiment C1.

FIG. 8 is a view illustrating a normal mode and a low consumption mode in the embodiment B2. In addition, a screen display columns shown in FIG. 8 are an edit screen of image editing software for creating a handwritten picture by touch input using a finger or the touch pen 50. A handwriting input area B is provided at an upper side of a display screen. A handwritten picture can be input in the handwriting input area B with the finger or the touch pen 50. In addition, an operation button display area C shown by a dotted line in FIG. 8 is provided below the handwriting input area B. In a stage immediately after starting the image editing software, three operation buttons of 'monochrome', 'color', and 'open' are displayed in the operation button display area C, as shown in FIG. 8. When the image editing software starts, a user first touches a portion of one of the operation buttons displayed in the operation button display area C to select whether to start inputting a picture in the monochrome mode, to start inputting a picture in the color mode, or to read a handwritten image stored beforehand and to start editing. When such a selection operation is performed in the operation button display area C, it becomes possible to draw a picture in the handwriting input area B.

In addition, if there is no touch input for 5 minutes, for example, while the image editing software is being executed, display of the handwriting input area B is stopped to reduce the power consumption in the liquid crystal display device 1. As a result, the entire portion of the handwriting input area B becomes black (or white). In this case, for example, three operation buttons of 'restart of editing', 'save', and 'end' are displayed in the operation button display area C, instead of the above-described three operation buttons. The user touches the 'restart of editing' button in order to restart input of a handwritten image. In addition, the user touches the 'save' button in order to save the input handwritten image. In addition, the user touches the 'end' button in order to end the image editing software without saving the input handwritten image. Thus, once display of the handwriting input area B is stopped, the user should touch a portion of the operation button display area C in order to perform a certain operation later. Accordingly, the touch determination or the approach determination may be performed on only the portion of the operation button display area C while display of the handwriting input area B is stopped. Thus, in the liquid crystal display device 1 according to the present embodiment, the operation mode is set to the normal mode when display of the handwriting input area B is not stopped, and the operation mode is set to the low consumption mode when display of the handwriting input area B is stopped.

Moreover, in the example shown in FIG. 8, 240 scanning lines and 180 read lines are provided in the image display area A (display screen). In the normal mode, the scanning circuit 500 for sensors selects 240 scanning lines one by one in a sequential manner. That is, the scanning circuit 500 for sensors sequentially selects all scanning lines one by one in order of scanning line 1, scanning line 2, scanning line 3, . . . , scanning line 238, scanning line 239, and scanning line 240. On the other hand, in the low consumption mode, the scanning circuit 500 for sensors selects only a total of 40 scanning lines of the scanning lines 201 to 240 corresponding to a portion of the operation button display area C one by one in a sequential manner, That is, the scanning circuit 500 for sensors sequentially selects the scanning line 201, the scanning line 202, the scanning line 203, . . . , the scanning line 238, the scanning line 239, and the scanning line 240 but does not select 200 scanning lines of scanning lines 1 to 200. Moreover, in the example shown in FIG. 8, the received light signal processing circuit 600 reads received light signals using all of 180 read lines in both the normal mode and the low consumption mode.

As a result, in the normal mode in the example shown in FIG. 8, received light signals are read every 60 Hz from a total of 43200 photodetection circuits O1 (that is, all photodetection circuits O1 provided in the image display area A) corresponding to 240 scanning lines and 180 read lines. On the other hand, in the low consumption mode, received light signals are read every 10 Hz from only a total of 7200 photodetection circuits O1 (that is, the photodetection circuits O1 arrayed in the operation button display area C) corresponding to 40 scanning lines of the scanning lines 201 to 240 and 180 read lines. Accordingly, in the low consumption mode, the number of photodetection circuits O1 that read the received light signals is ⅙ of that in the normal mode.

Figure 9:
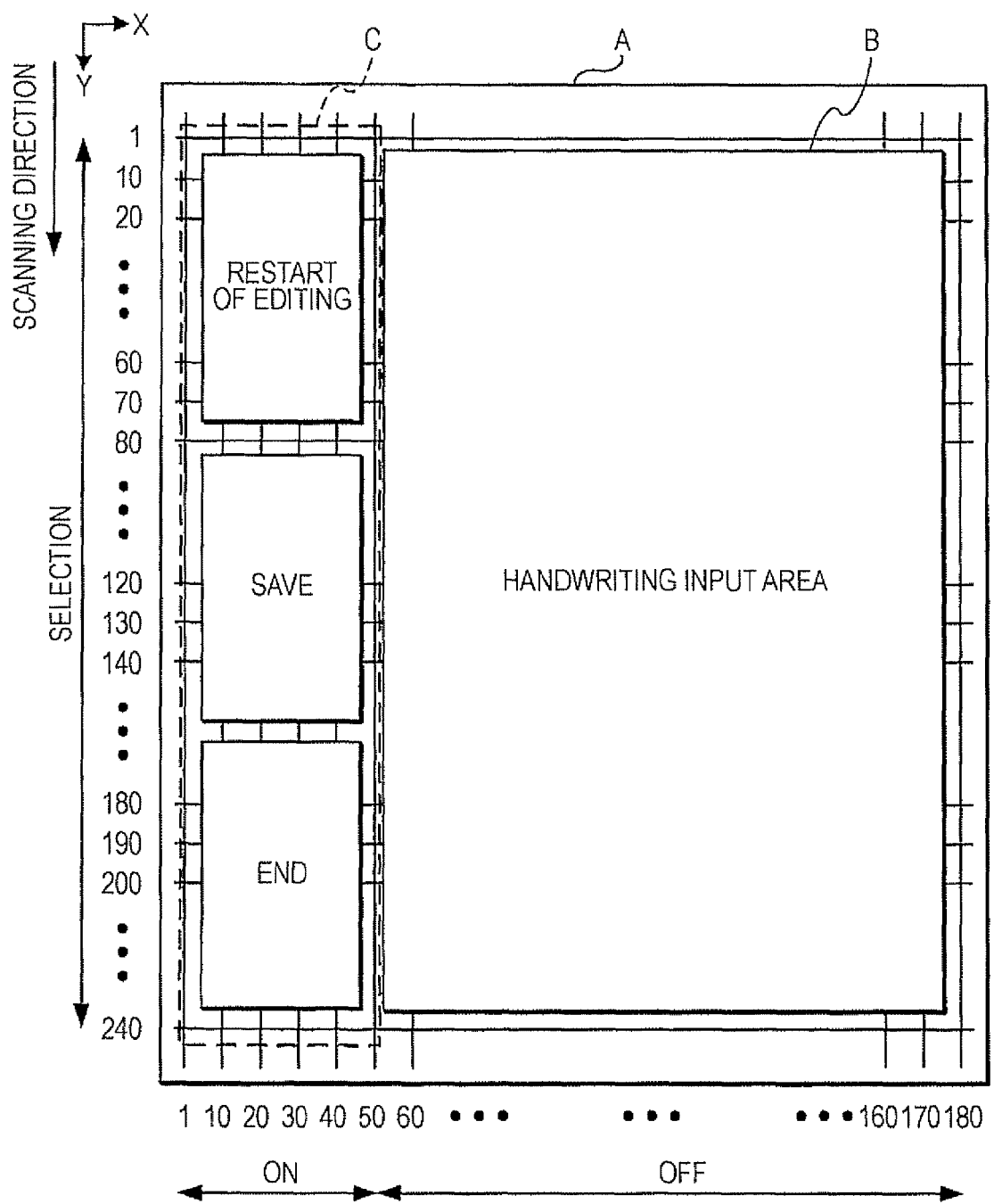

In addition, FIG. 9 is a view illustrating the arrangement of the handwriting input area B and the operation button display area C shown in FIG. 8, which has changed from the up and down arrangement to the left and right arrangement. Also in the example shown in FIG. 9, in the normal mode, the received light signals are read every 60 Hz from all photodetection circuits O1 provided in the image display area A. On the other hand, in the low consumption mode, the received light signals are read every 10 Hz from only the photodetection circuits O1 arrayed in the operation button display area C. That is, in the low consumption mode in the example shown in FIG. 9, the scanning circuit 500 for sensors sequentially selects all 240 scanning lines one by one like the normal mode, but the received light signal processing circuit 600 reads the received light signals using only a total of 50 read lines of read lines 1 to 50, which correspond to a portion of the operation button display area C, among 180 read lines. As a result, in the low consumption mode in the example shown in FIG. 9, the received light signals are read every 10 Hz from a total of 12000 photodetection circuits O1 corresponding to 240 scanning lines and 50 read lines. Accordingly, in the low consumption mode, the number of photodetection circuits O1 that read the received light signals is 1/3.6 of that in the normal mode.

Moreover, in addition to the examples shown in FIGS. 8 and 9, for example, in the low consumption mode, the received light signals may be read every 10 Hz from only a total of 5400 photodetection circuits O1 corresponding to 60 scanning lines of the scanning lines 1 to 60 and 90 read lines of the read lines 1 to 90. In this case, in the low consumption mode, the scanning circuit 500 for sensors selects only 60 scanning lines of the scanning lines 1 to 60 one by one in a sequential manner, and the received light signal processing circuit 600 reads the received light signals using only a total of 90 read lines of the read lines 1 to 90.

Thus, the scanning circuit 500 for sensors selects all scanning lines one by one in a sequential manner in the normal mode, but selects only a plurality of scanning lines (for example, the scanning lines 201 to 240 in the example shown in FIG. 8) corresponding to the portion of the operation button display area C one by one in a sequential manner in the low consumption mode. Furthermore, the received light signal processing circuit 600 reads the received light signals using all read lines in the normal mode, but reads the received light signals using only a plurality of read lines (for example, the read lines 1 to 50 in the example shown in FIG. 9) corresponding to the portion of the operation button display area C in the low consumption mode.

FIGS. 10A and 10B are flow charts illustrating the flows of mode switching processes 5 and 6 in the embodiment B2. The mode switching process 5 shown in FIG. 10A is executed when the operation mode is a normal mode. Moreover, in the liquid crystal display device 1, for example, when a user starts the image editing software described above, the operation mode is changed to the normal mode after starting reception of the touch input. Moreover, as described above, in the normal mode, one cycle processing related to the touch input function is performed every 60 Hz, and the received light signals are read from all photodetection circuits O1 provided in the image display area A.

In addition, since steps S501, S502, and S504 of the flow chart of the mode switching process 5 shown in FIG. 10A are basically the same processes as steps S301, S302, and S304 of the mode switching process 3 (refer to FIG. 6A) described in the embodiment B1, a simple explanation thereof will be made herein.

First, the control circuit 300 determines whether there is a touch on the basis of received light signals for one screen ('m×n' received light signals) that have been newly read (step S501). Then, when it is determined that there is no touch in step S501, the control circuit 300 determines whether or not a state, in which a result of determination that there is no touch is continuously obtained, continues for a predetermined time (for example, 5 minutes) (step S502). Then, when it is determined that the state continues for the predetermined time in step S502, the control circuit 300 switches the operation mode from the normal mode to the low consumption mode (step S503).

In addition, when switching the operation mode to the low consumption mode, a control signal that instructs switching of the operation mode (switching to the low consumption mode) is transmitted from the control circuit 300 to the scanning circuit 500 for sensors and the received light signal processing circuit 600. The scanning circuit 500 for sensors and the received light signal processing circuit 600 change the operation mode to the low consumption mode when the control signal is received. For example, in the example shown in FIG. 8, only 40 scanning lines of the scanning lines 201 to 240 are selected in the low consumption mode. Accordingly, the scanning circuit 500 for sensors changes the timing for selecting each scanning line such that a period in which the 40 scanning lines are selected is set to 10 Hz and selects 40 scanning lines of the scanning lines 201 to 240 one by one in a sequential manner according to the changed timing. In addition, the received light signal processing circuit 600 changes the timing for reading received light signals using 180 read lines according to the timing at which the scanning circuit 500 for sensors selects the scanning lines and reads the received light signals according to the changed timing.

Moreover, in the example shown in FIG. 9, all 240 scanning lines are selected in the low consumption mode. Accordingly, the scanning circuit 500 for sensors changes the timing for selecting each scanning line such that a period in which the 240 scanning lines are selected is set to 10 Hz and selects 240 scanning lines one by one in a sequential manner according to the changed timing. In addition, the received light signal processing circuit 600 changes the timing for reading received light signals using only 50 read lines of the read lines 1 to 50 among total 180 read lines according to the timing at which the scanning circuit 500 for sensors selects the scanning lines and reads the received light signals using only the 50 read lines according to the changed timing.

Thus, when the operation mode is switched from the normal mode to the low consumption mode, the scanning circuit 500 for sensors and the received light signal processing circuit 600 read the received light signals every 10 Hz from only the photodetection circuits O1 arrayed in the operation button display area C. Then, the control circuit 300 changes a threshold value used in binarization processing from the threshold value T for touch determination to the threshold value S for approach determination after switching the operation mode from the normal mode to the low consumption mode (step S504).

On the other hand, the mode switching process 6 shown in FIG. 10B is executed when the operation mode is the low consumption mode. As described above, in the low consumption mode, one cycle processing related to the touch input function is performed every 10 Hz, and the received light signals are read from only the photodetection circuits O1 arrayed in the operation button display area C. In addition, since steps S601 and S603 of the flow chart of the mode switching process 6 shown in FIG. 10B are basically the same processes as steps S401 and S403 of the mode switching process 4 (refer to FIG. 6B) described in the embodiment B1, a simple explanation thereof will be made herein.

First, the control circuit 300 determines whether there is approach, that is, whether or not a finger or the touch pen 50 approaches close to the operation button display area C on the basis of a received light signal read from each photodetection circuit O1 in the operation button display area C (step S601). Specifically, first, the control circuit 300 compares a signal level of each read received light signal with the threshold value S for approach determination (specifically, the threshold value S1 or S2) and converts the received light signal into a binary signal. Then, the control circuit 300 counts the number of binary signals with signal values of '1', for example, among the generated binary signals. When the count value is a value within a range set by the upper and lower limits stored in a memory, the control circuit 300 determines that there is approach (step S601: YES). On the other hand, when the count value is not a value within the range, the control circuit 300 determines that there is no approach (step S601: NO).

When it is determined that there is no approach in step S601, the mode switching process 6 is ended. On the other hand, when it is determined that there is approach in step S601, the control circuit 300 switches the operation mode from the low consumption mode to the normal mode (step S602). In addition, when switching the operation mode to the normal mode, a control signal that instructs switching of the operation mode (switching to the normal mode) is transmitted from the control circuit 300 to the scanning circuit 500 for sensors and the received light signal processing circuit 600.

The scanning circuit 500 for sensors and the received light signal processing circuit 600 change the operation mode to the normal mode when the control signal is received. For example, in both the examples shown in FIGS. 8 and 9, all 240 scanning lines and all 180 read lines are used in the normal mode. Accordingly, the scanning circuit 500 for sensors changes the timing for selecting each scanning line such that a period in which the 240 scanning lines are selected is set to 60 Hz and selects 240 scanning lines one by one in a sequential manner according to the changed timing. In addition, the received light signal processing circuit 600 changes the timing for reading received light signals using 180 read lines according to the timing at which the scanning circuit 500 for sensors selects the scanning lines and reads the received light signals according to the changed timing.

Thus, when the operation mode is switched from the low consumption mode to the normal mode, the scanning circuit 500 for sensors and the received light signal processing circuit 600 read the received light signals every 60 Hz from all photodetection circuits O1 provided in the image display area A. Then, the control circuit 300 changes a threshold value used in binarization processing from the threshold value S for approach determination to the threshold value T for touch determination after switching the operation mode from the low consumption mode to the normal mode (step S603).

As described above, according to the present embodiment, in the low consumption mode, the liquid crystal display device 1 reads the received light signals from only the photodetection circuits O1 arrayed in the operation button display area C. Accordingly, in the low consumption mode, the frequency at which received light signals for one screen are read can be reduced to ⅙ (60 Hz→10 Hz) of that in the normal mode, and the number of photodetection circuits O1 that read the received light signals can be reduced to ⅙ of that in the normal mode in the example shown in FIG. 8 and to 1/3.6 of that in the normal mode in the example shown in FIG. 9. As a result, the power consumption can be further reduced.

In addition, the number M of scanning lines selected in the low consumption mode is preferably an integer of 2 or more and m or less. Similarly, the number N of read lines used in the low consumption mode is preferably an integer of 2 or more and n or less.

Embodiment B3

In the embodiment B1, the case where the received light signals for one screen are read every 60 Hz in the normal mode and every 10 Hz in the low consumption mode has been described. In the present embodiment, a case of selecting scanning lines at the rate of one every 10 scanning lines in the low consumption mode will be described.

The liquid crystal display device 1 according to the present embodiment has a normal mode and a low consumption mode, similar to the case of the embodiment B1. The scanning circuit 500 for sensors selects all scanning lines ('m' scanning lines) provided in the image display area A one by one in a sequential manner in the normal mode and sequentially selects the scanning lines at the rate of one every 10 scanning lines in the low consumption mode. Accordingly, in the normal mode, received light signals are read every 60 Hz from all photodetection circuits O1 ('m×n' photodetection circuits O1) provided in the image display area A. On the other hand, in the low consumption mode, the received light signals are read every 10 Hz from only the '(m×n)/10' photodetection circuits O1.

Thus, in the normal mode, since the number of received light signals for one screen is 'm×n', the number of binary signals for one screen generated in binarization processing is also 'm×n'. On the other hand, in the low consumption mode, since the number of received light signals for one screen is '(m×n)/10', the number of binary signals for one screen generated in binarization processing is also '(m×n)/10'. Moreover, in the low consumption mode, the number of binary signals for one screen becomes 1/10 of that in the normal mode since the scanning lines are thinned out. Accordingly, values of upper and lower limits compared with a count value in determining whether or not there is a touch and whether or not there is approach are also different in a case where the operation mode is a normal mode and a case where the operation mode is a low consumption mode.

Figure 11:
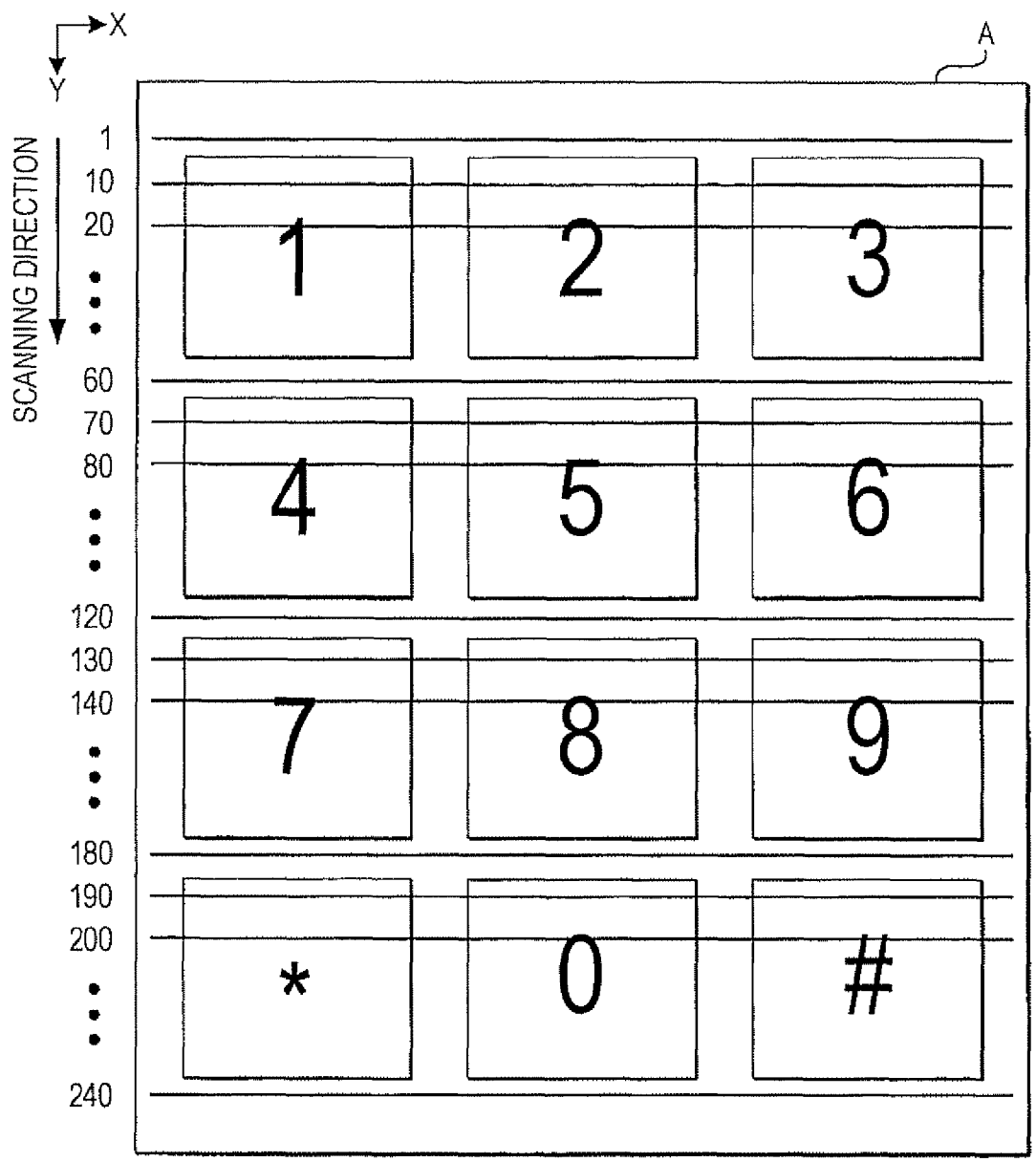
FIG. 11 is a view illustrating a normal mode and a low consumption mode in an embodiment B3 and a normal mode and a thinning-out mode in an embodiment D1.

FIG. 11 is a view illustrating a normal mode and a low consumption mode in the embodiment B3. Moreover, on the display screen (image display area A) in FIG. 11, a total of 12 display buttons of '1', '2', '3', . . . , '*', '0', and '#' are disposed in a matrix of 'four rows×three columns'. In addition, a total of 240 scanning lines of scanning lines 1 to 240 are provided in the image display area A. In the normal mode, the scanning circuit 500 for sensors sequentially selects all scanning lines one by one in order of scanning line 1, scanning line 2, scanning line 3, . . . , scanning line 238, scanning line 239, and scanning line 240. In addition, in the normal mode, a period in which 240 scanning lines are selected is set to 60 Hz.

On the other hand, in the low consumption mode, the scanning circuit 500 for sensors sequentially selects 240 scanning lines at the rate of one every 10 scanning lines. That is, in the low consumption mode, the scanning circuit 500 for sensors selects the scanning line 10, the scanning line 20, the scanning line 30, . . . , the scanning line 220, the scanning line 230, and the scanning line 240 one by one in a sequential manner, for example. Accordingly, only 24 scanning lines of the 240 scanning lines are selected, and the remaining 216 scanning lines are thinned out without being selected. In addition, in the low consumption mode, a period in which 24 scanning lines are selected is set to 10 Hz.

Figure 12A:
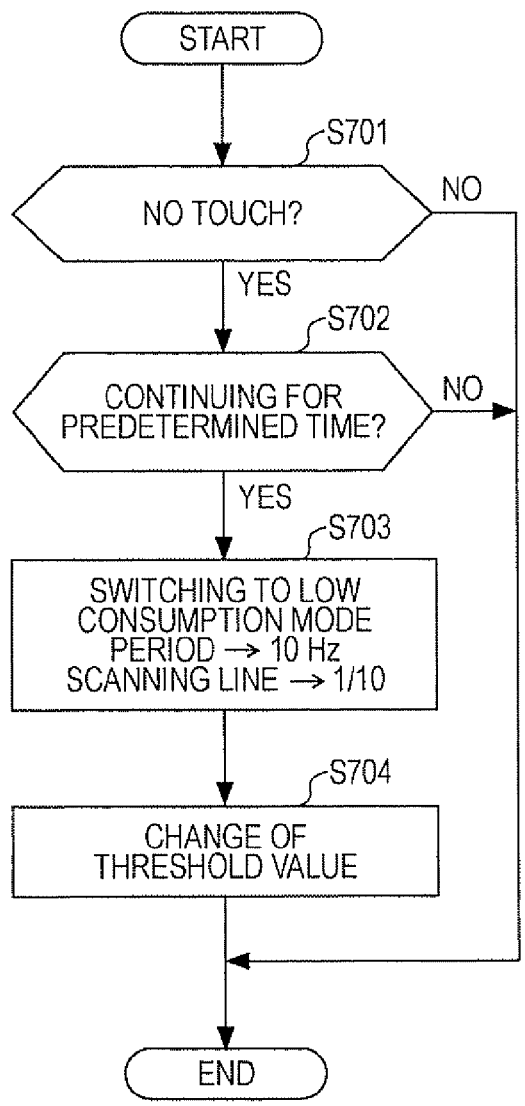
FIGS. 12A and 12B are flow charts illustrating the flows of mode switching processes 7 and 8 in the embodiment 33.
Figure 12B:
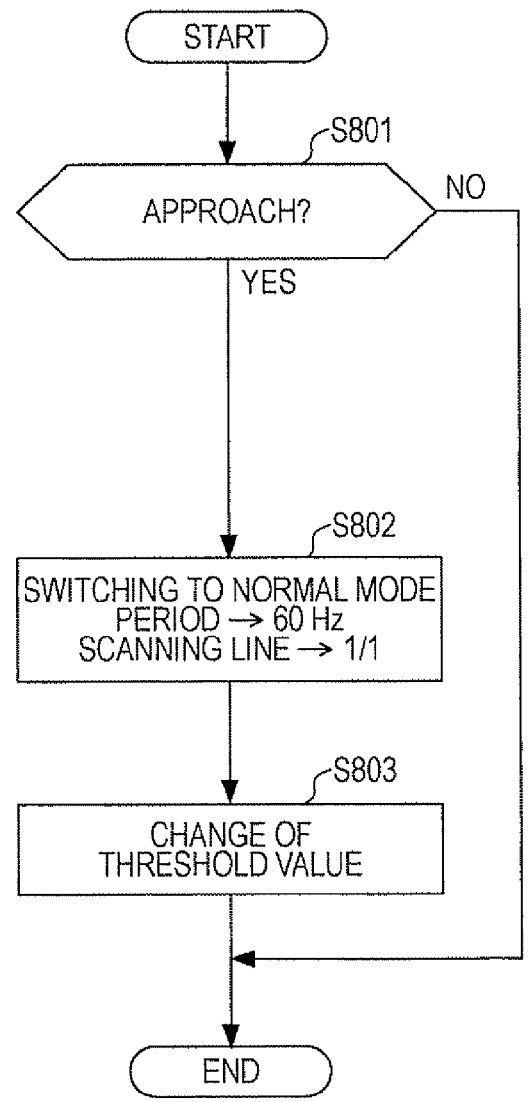

FIGS. 12A and 12B are flow charts illustrating the flows of mode switching processes 7 and 8 in the embodiment B3. The mode switching process 7 shown in FIG. 12A is executed when the operation mode is a normal mode. Moreover, as described above, in the normal mode, one cycle processing related to the touch input function is performed every 60 Hz, and the received light signals are read from all photodetection circuits O1 provided in the image display area A. In addition, since steps S701, S702, and S704 of the flow chart of the mode switching process 7 shown in FIG. 12A are basically the same processes as steps S301, S302, and S304 of the mode switching process 3 (refer to FIG. 6A) described in the embodiment B1, a simple explanation thereof will be made herein.

First, the control circuit 300 determines whether there is a touch on the basis of received light signals for one screen ('m×n' received light signals) that have been newly read (step S701). Then, when it is determined that there is no touch in step S701, the control circuit 300 determines whether or not a state, in which a result of determination that there is no touch is continuously obtained, continues for a predetermined time (for example, 5 minutes) (step S702). Then, when it is determined that the state continues for the predetermined time in step S702, the control circuit 300 switches the operation mode from the normal mode to the low consumption mode (step S703).

In addition, when switching the operation mode to the low consumption mode, a control signal that instructs switching of the operation mode (switching to the low consumption mode) is transmitted from the control circuit 300 to the scanning circuit 500 for sensors and the received light signal processing circuit 600. The scanning circuit 500 for sensors and the received light signal processing circuit 600 change the operation mode to the low consumption mode when the control signal is received. For example, in the example shown in FIG. 11, only 24 scanning lines, which are 1/10 in the normal mode, are selected in the low consumption mode. Accordingly, the scanning circuit 500 for sensors changes the timing for selecting each scanning line such that a period in which the 24 scanning lines are selected is set to 10 Hz and sequentially selects the scanning lines at the rate of one every 10 scanning lines according to the changed timing. In addition, the received light signal processing circuit 600 changes the timing for reading received light signals using all read lines ('n' read lines) according to the timing at which the scanning circuit 500 for sensors selects the scanning lines and reads the received light signals according to the changed timing.

Thus, when the operation mode is switched from the normal mode to the low consumption mode, the scanning circuit 500 for sensors and the received light signal processing circuit 600 read the received light signals, every 10 Hz, from the '(m×n)/10' photodetection circuits O1 as received light signals for one screen. Then, the control circuit 300 changes a threshold value used in binarization processing from the threshold value T for touch determination to the threshold value S for approach determination after switching the operation mode from the normal mode to the low consumption mode (step S704).

On the other hand, the mode switching process 8 shown in FIG. 12B is executed when the operation mode is the low consumption mode. As described above, in the low consumption mode, one cycle processing related to the touch input function is performed every 10 Hz, and the received light signals are read from the '(m×n)/10' photodetection circuits O1 as received light signals for one screen. In addition, since steps S801 and S803 of the flow chart of the mode switching process 8 shown in FIG. 12B are basically the same processes as steps S401 and S403 of the mode switching process 4 (refer to FIG. 6B) described in the embodiment B1, a simple explanation thereof will be made herein.

First, the control circuit 300 determines whether there is approach, that is, whether or not a finger or the touch pen 50 approaches close to the display screen on the basis of received light signals for one screen ('(m×n)/10' received light signals) that have been newly read (step S801). Specifically, first, the control circuit 300 compares a signal level of each of the received light signals for one screen with the threshold value S for approach determination (specifically, the threshold value S1 or S2) and converts each of the received light signals into a binary signal. Then, the control circuit 300 counts the number of binary signals with signal values of '1', for example, among the generated binary signals for one screen ('(m×n)/10' binary signals). When the count value is a value within a range set by the upper and lower limits stored in a memory, the control circuit 300 determines that there is approach (step S801: YES). On the other hand, when the count value is not a value within the range, the control circuit 300 determines that there is no approach (step S801: NO). Moreover, values of the upper and lower limits compared with the count value are different in a case where the operation mode is a normal mode and a case where the operation mode is a low consumption mode as well as the case of touch determination and the case of approach determination or the case where the surrounding area of the liquid crystal display device 1 is bright and the case where the surrounding area of the liquid crystal display device 1 is dark.

When it is determined that there is no approach in step S801, the mode switching process 8 is ended. On the other hand, when it is determined that there is approach in step S801, the control circuit 300 switches the operation mode from the low consumption mode to the normal mode (step S802). In addition, when switching the operation mode to the normal mode, a control signal that instructs switching of the operation mode (switching to the normal mode) is transmitted from the control circuit 300 to the scanning circuit 500 for sensors and the received light signal processing circuit 600.

The scanning circuit 500 for sensors and the received light signal processing circuit 600 change the operation mode to the normal mode when the control signal is received. For example, in the example shown in FIG. 11, all 240 scanning lines are selected in the normal mode. Accordingly, the scanning circuit 500 for sensors changes the timing for selecting each scanning line such that a period in which the 240 scanning lines are selected is set to 60 Hz and selects 240 scanning lines one by one in a sequential manner according to the changed timing. In addition, the received light signal processing circuit 600 changes the timing for reading received light signals using all read lines ('n' read lines) according to the timing at which the scanning circuit 500 for sensors selects the scanning lines and reads the received light signals according to the changed timing.

Thus, when the operation mode is switched from the low consumption mode to the normal mode, the scanning circuit 500 for sensors and the received light signal processing circuit 600 read the received light signals every 60 Hz from all photodetection circuits O1 provided in the image display area A. Then, the control circuit 300 changes a threshold value used in binarization processing from the threshold value S for approach determination to the threshold value T for touch determination after switching the operation mode from the low consumption mode to the normal mode (step S803).

As described above, according to the present embodiment, the liquid crystal display device 1 sequentially selects the scanning lines at the rate of one every 10 scanning lines in the low consumption mode. Accordingly, in the low consumption mode, the frequency at which received light signals for one screen are read can be reduced to ⅙ (60 Hz→10 Hz) of that in the normal mode, and the number of photodetection circuits O1 that read the received light signals can be reduced to 1/10 of that in the normal mode. As a result, the power consumption can be further reduced.

In addition, the scanning circuit 500 for sensors may be configured to sequentially select the scanning lines at the rate of one every 2 scanning lines or one every 15 scanning lines in the low consumption mode. Thus, the scanning circuit 500 for sensors may sequentially select the scanning lines at the rate of one every 'L' (integer of 2 or more and 'm' or less) scanning lines in the low consumption mode.

Embodiment C1

Next, an embodiment C1 will be described.

In addition, since the hardware configuration of a liquid crystal display according to the present embodiment is almost similar to that of the liquid crystal display device 1 according to the embodiment B1, the same reference numerals as in the embodiment B1 are used. In addition, an explanation on the same parts as in the embodiment B3 will be omitted.

In the embodiment B3, the case where the normal mode (60 Hz) and the low consumption mode (10 Hz) are prepared and the period, in which the received light signals for one screen are read, is changed has been described. On the other hand, in the present embodiment, a case where a normal read mode and a partial read mode are prepared instead of the normal mode and the low consumption mode and the number of photodetection circuits O1 that read received light signals is changed will be described.

The liquid crystal display device 1 according to the present embodiment has a normal read mode and a partial read mode as a read mode of received light signals. In the normal read mode, the scanning circuit 500 for sensors and the received light signal processing circuit 600 read received light signals, at predetermined periods (for example, 60 Hz), from all photodetection circuits O1 ('m×n' photodetection circuits O1) provided in the image display area A. On the other hand, in the partial read mode, the scanning circuit 500 for sensors and the received light signal processing circuit 600 read the received light signals, at predetermined periods (for example, 60 Hz), from some of the photodetection circuits O1 provided in the image display area A.

Accordingly, the number of received light signals read every 60 Hz is 'm×n' in the normal read mode, but the number of received light signals read every 60 Hz is less than 'm×n' in the partial read mode. For example, when an area where a received light signal is read in the partial read mode is set in the lower half of the image display area A, '(m×n)/2' received light signals are read every 60 Hz in the partial read mode. Thus, since the 'm×n' received light signals are read every 60 Hz in the normal read mode, 'm×n' binary signals are also generated every 60 Hz corresponding to the 'm×n' received light signals. On the other hand, in the partial read mode, for example, when an area where a received light signal is read is set in the lower half of the image display area A, '(m×n)/2' received light signals are read every 60 Hz. Accordingly, '(m×n)/2' binary signals are also generated corresponding to the '(m×n)/2' received light signals.

Next, the normal read mode and the partial read mode in the present embodiment will be described using FIGS. 8 and 9. As already described in the embodiment B2, in a stage immediately after starting the image editing software, three operation buttons of 'monochrome', 'color', and 'open' are displayed in the operation button display area C of the screen display columns shown in FIG. 8. When the image editing software starts, a user first touches a portion of one of the operation buttons displayed in the operation button display area C to select whether to start inputting a picture in the monochrome mode, to start inputting a picture in the color mode, or to read a handwritten image stored beforehand and to start editing. When such a selection operation is performed in the operation button display area C, it becomes possible to draw a picture in the handwriting input area B.

In addition, if there is no touch input for 5 minutes, for example, while the image editing software is being executed, display of the handwriting input area B is stopped to reduce the power consumption in the liquid crystal display device 1. As a result, the entire portion of the handwriting input area B becomes black (or white). In this case, for example, three operation buttons of 'restart of editing', 'save', and 'end' are displayed in the operation button display area C, instead of the above-described three operation buttons. The user touches the 'restart of editing' button in order to restart input of a handwritten image. In addition, the user touches the 'save' button in order to save the input handwritten image. In addition, the user touches the 'end' button in order to end the image editing software without saving the input handwritten image. Thus, once display of the handwriting input area B is stopped, the user should touch a portion of the operation button display area C in order to perform a certain operation later. Accordingly, the touch determination or the approach determination may be performed on only the portion of the operation button display area C while display of the handwriting input area B is stopped. Accordingly, in the liquid crystal display device 1 according to the present embodiment, a read mode of received light signals is set to the normal read mode when display of the handwriting input area B is not stopped, and the read mode of received light signals is set to the partial read mode when display of the handwriting input area B is stopped.

Moreover, in the example shown in FIG. 8, 240 scanning lines and 180 read lines are provided in the image display area A (display screen). In the normal read mode, the scanning circuit 500 for sensors selects 240 scanning lines one by one in a sequential manner. That is, the scanning circuit 500 for sensors sequentially selects the scanning lines one by one in order of scanning line 1, scanning line 2, scanning line 3, . . . , scanning line 238, scanning line 239, and scanning line 240. On the other hand, in the partial read mode, the scanning circuit 500 for sensors selects only a total of 40 scanning lines of the scanning lines 201 to 240 corresponding to a portion of the operation button display area C one by one in a sequential manner. That is, the scanning circuit 500 for sensors selects only 40 scanning lines in order of the scanning line 201, the scanning line 202, the scanning line 203, . . . , the scanning line 238, the scanning line 239, and the scanning line 240 but does not select 200 scanning lines of the scanning lines 1 to 200. Moreover, in the example shown in FIG. 8, the received light signal processing circuit 600 reads received light signals using all of 180 read lines in both the normal read mode and the partial read mode.

As a result, in the normal read mode in the example shown in FIG. 8, the received light signals are read from a total of 43200 photodetection circuits O1 (that is, all photodetection circuits O1 provided in the image display area A) corresponding to 240 scanning lines and 180 read lines. On the other hand, in the partial read mode, the received light signals are read from only a total of 7200 photodetection circuits O1 (that is, the photodetection circuits O1 arrayed in the operation button display area C) corresponding to 40 scanning lines of the scanning lines 201 to 240 and 180 read lines. Accordingly, in the partial read mode, the number of photodetection circuits O1 that read the received light signals is 1/6 of that in the normal read mode.

Also in the example shown in FIG. 9, in the normal read mode, the received light signals are read from all photodetection circuits O1 provided in the image display area A. On the other hand, in the partial read mode, the received light signals are read from only the photodetection circuits O1 arrayed in the operation button display area C. That is, in the partial read mode in the example shown in FIG. 9, the scanning circuit 500 for sensors sequentially selects all 240 scanning lines one by one like the normal read mode, but the received light signal processing circuit 600 reads the received light signals using only a total of 50 read lines of the read lines 1 to 50, which correspond to a portion of the operation button display area C, among the 180 read lines. As a result, in the partial read mode in the example shown in FIG. 9, the received light signals are read from a total of 12000 photodetection circuits O1 corresponding to 240 scanning lines and 50 read lines. Accordingly, in the partial read mode, the number of photodetection circuits O1 that read the received light signals is 1/3.6 of that in the normal read mode.

Moreover, in addition to the examples shown in FIGS. 8 and 9, for example, in the partial read mode, the received light signals may be read from only a total of 5400 photodetection circuits O1 corresponding to 60 scanning lines of the scanning lines 1 to 60 and 90 read lines of the read lines 1 to 90. In this case, in the partial read mode, the scanning circuit 500 for sensors selects only 60 scanning lines of the scanning lines 1 to 60 one by one in a sequential manner, and the received light signal processing circuit 600 reads the received light signals using only a total of 90 read lines of the read lines 1 to 90.

Thus, the scanning circuit 500 for sensors and the received light signal processing circuit 600 operate differently in the normal read mode and the partial read mode. The scanning circuit 500 for sensors selects all scanning lines one by one in a sequential manner in the normal read mode, but selects only a plurality of scanning lines (for example, the scanning lines 201 to 240 in the example shown in FIG. 8) corresponding to the portion of the operation button display area C one by one in a sequential manner in the partial read mode. Furthermore, the received light signal processing circuit 600 reads the received light signals using all read lines in the normal read mode, but reads the received light signals using only a plurality of read lines (for example, the read lines 1 to 50 in the example shown in FIG. 9) corresponding to the portion of the operation button display area C in the partial read mode. For this reason, the control circuit 300 outputs a control signal, which instructs switching of a read mode, to the scanning circuit 500 for sensors and the received light signal processing circuit 600 to thereby control operations of both the circuits 500 and 600.

In addition, the liquid crystal display device 1 according to the present embodiment performs, at predetermined periods (for example, 120 Hz or 60 Hz), one cycle processing related to the touch input function of reading received light signals from all photodetection circuits O1 provided in the image display area A or from the photodetection circuits O1 arrayed in the operation button display area C, determining whether or not there is a touch or whether or not there is approach on the basis of the read received light signals, and detecting the touch position when it is determined that there is a touch. Furthermore, in the present embodiment, it is assumed that the one cycle processing is performed every 60 Hz.

FIGS. 13A and 13B are flow charts illustrating the flows of mode switching processes 9 and 10 in the embodiment C1. The mode switching process 9 shown in FIG. 13A is executed when the read mode of received light signals is a normal read mode. Moreover, in the liquid crystal display device 1, for example, when a user starts the image editing software described above, the read mode of received light signals is changed to the normal read mode after starting reception of the touch input. Moreover, as described above, in the normal read mode, received light signals are read from all photodetection circuits O1 provided in the image display area A.

First, the control circuit 300 determines whether there is a touch, that is, whether or not a finger or a touch pen touches the display screen on the basis of received light signals for one screen ('m×n' received light signals) that have been newly read (step S901).

Specifically, first, the control circuit 300 compares a signal level of each of the received light signals for one screen with the threshold value T (specifically, the threshold value T1 or T2) and converts each of the received light signals into a binary signal. In addition, although the threshold value T used herein is basically set in step S1003 of the mode switching process 10 which will be described later, the threshold value T may be suitably changed between the threshold values T1 and T2 on the basis of a measurement result of ambient light when the surrounding area of the liquid crystal display device 1 has changed from a bright state to a dark state or from a dark state to a bright state on the contrary. That is, the threshold value T1 is used when the surrounding area of the liquid crystal display device 1 is bright, and the threshold value T2 is used when the surrounding area of the liquid crystal display device 1 is dark. Then, the control circuit 300 counts the number of binary signals with signal values of '1', for example, among the generated binary signals for one screen ('m×n' binary signals). When the count value is a value within a range set by the upper and lower limits stored in a memory, the control circuit 300 determines that there is a touch (step S901: NO). On the other hand, when the count value is not a value within the range, the control circuit 300 determines that there is no touch (step S901: YES). Moreover, as described above, values of the upper and lower limits compared with the count value are different in the case where the surrounding area of the liquid crystal display device 1 is bright and the case where the surrounding area of the liquid crystal display device 1 is dark or in the case of touch determination and the case of approach determination.

When it is determined that there is a touch in step S901, the mode switching process 9 is ended. In this case, the read mode of received light signals is still the normal read mode. In addition, when it is determined that there is a touch as described above, the control circuit 300 detects the touch position after ending the mode switching process 9. When detecting the touch position, the binary signals for one screen generated in determining whether or not there is a touch in step S901 are used. In addition, when the touch position has been detected, the control circuit 300 updates the display of a handwritten image on the basis of the touch position if the detected touch position is within the handwriting input area B.

On the other hand, when it is determined that there is no touch in step S901, the control circuit 300 determines whether or not a state, in which a result of determination that there is no touch is continuously obtained, continues for a predetermined time (for example, 5 minutes) (step S902). In addition, since the one cycle processing related to the touch input function is performed every 60 Hz, the determination result of step S901 is obtained every 60 Hz. Accordingly, the control circuit 300 may count the number of times of results of determination that there is no touch, which are continuously obtained, and determine whether or not the count value has reached the number of times equivalent to the predetermined time described above. In addition, the predetermined time may be set to an arbitrary time, such as 60 seconds or 30 minutes.

When it is determined that the state does not continue for the predetermined time in step S902, the mode switching process 9 is ended. In this case, the read mode of received light signals is still the normal read mode. On the other hand, when it is determined that the state continues for the predetermined time in step S902, the control circuit 300 switches the read mode of received light signals from the normal read mode to the partial read mode (step S903). In addition, when switching the read mode to the partial read mode, a control signal that instructs switching of a read mode (switching to the partial read mode) is transmitted from the control circuit 300 to the scanning circuit 500 for sensors and the received light signal processing circuit 600.

The scanning circuit 500 for sensors and the received light signal processing circuit 600 change the read mode to the partial read mode when the control signal is received. For example, in the example shown in FIG. 8, when the read mode switches to the partial read mode, the scanning circuit 500 for sensors selects only 40 scanning lines of the scanning lines 201 to 240 one by one in a sequential manner. Moreover, in the example shown in FIG. 9, when the read mode switches to the partial read mode, the received light signal processing circuit 600 reads received light signals using only 50 read lines of the read lines 1 to 50. Thus, when the read mode of received light signals switches from the normal read mode to the partial read mode, the photodetection circuits O1 that read received light signals are changed from all photodetection circuits O1 provided in the image display area A to only the photodetection circuits O1 arrayed in the operation button display area C.

In addition, the case where it has been sensed continuously for a predetermined time that a finger or the touch pen 50 does not touch the display screen is a case where display of the handwriting input area B is about to stop during execution of the image editing software. Then, the control circuit 300 changes a threshold value used in binarization processing from the threshold value T for touch determination to the threshold value S for approach determination after switching the read mode of received light signals to the partial read mode (step S904). Since the threshold values T1 and T2 for touch determination and the threshold values S1 and S2 for approach determination are stored in the memory within the liquid crystal display device 1 as described above, the control circuit 300 determines the brightness around the liquid crystal display device 1 on the basis of a measurement result of ambient light. When the surrounding area of the liquid crystal display device 1 is bright, the control circuit 300 reads the threshold value S1 for approach determination from the memory and sets the threshold value S1 as a threshold value to be used in the binarization processing. In addition, when the surrounding area of the liquid crystal display device 1 is dark, the control circuit 300 reads the threshold value S2 for approach determination from the memory and sets the threshold value S2 as a threshold value to be used in the binarization processing.

On the other hand, the mode switching process 10 shown in FIG. 13B is executed when the operation mode is the partial read mode. As described above, in the partial read mode, the received light signals are read from only the photodetection circuits O1 arrayed in the operation button display area C. First, the control circuit 300 determines whether there is approach, that is, whether or not a finger or the touch pen 50 approaches close to the operation button display area C on the basis of a received light signal read from each photodetection circuit O1 in the operation button display area C (step S1001).

Specifically, first, the control circuit 300 compares a signal level of each read received light signal with the threshold value S for approach determination (specifically, the threshold value S1 or S2) and converts the received light signal into a binary signal. In addition, although the threshold value S used herein is basically set in step S904 of the mode switching process 9 described above, the threshold value S may be suitably changed between the threshold values S1 and S2 on the basis of a measurement result of ambient light when the surrounding area of the liquid crystal display device 1 has changed from a bright state to a dark state or from a dark state to a bright state on the contrary. That is, the threshold value S1 is used when the surrounding area of the liquid crystal display device 1 is bright, and the threshold value S2 is used when the surrounding area of the liquid crystal display device 1 is dark. Then, the control circuit 300 counts the number of binary signals with signal values of '1', for example, among the generated binary signals. When the count value is a value within a range set by the upper and lower limits stored in a memory, the control circuit 300 determines that there is approach (step S1001: YES). On the other hand, when the count value is not a value within the range, the control circuit 300 determines that there is no approach (step S1001: NO). Moreover, as described above, values of the upper and lower limits compared with the count value are different in the case where the surrounding area of the liquid crystal display device 1 is bright and the case where the surrounding area of the liquid crystal display device 1 is dark.

When it is determined that there is no approach in step S1001, the mode switching process 10 is ended. In this case, the read mode of received light signals is still the partial read mode. On the other hand, when it is determined that there is approach in step S1001, the control circuit 300 switches the read mode of received light signals from the partial read mode to the normal read mode (step S1002). In addition, when switching the read mode to the normal read mode, a control signal that instructs switching of a read mode (switching to the normal read mode) is transmitted from the control circuit 300 to the scanning circuit 500 for sensors and the received light signal processing circuit 600.

The scanning circuit 500 for sensors and the received light signal processing circuit 600 change the read mode to the normal read mode when the control signal is received. As a result, the scanning circuit 500 for sensors selects all scanning lines one by one in a sequential manner, and the received light signal processing circuit 600 reads the received light signals using all read lines. Accordingly, when the read mode of received light signals is switched from the partial read mode to the normal read mode, received light signals are read from all photodetection circuits O1 provided in the image display area A.

In addition, the case where it is sensed that the finger or the touch pen 50 has approached close to the display screen (operation button display area C) as described above is a case where the user is willing to touch the portion of the operation button display area C to perform a certain operation after stooping the display of the portion of handwriting input area B during execution of the image editing software. Then, the control circuit 300 changes a threshold value used in binarization processing from the threshold value S for approach determination to the threshold value T for touch determination after switching the read mode of received light signals to the normal read mode (step S1003).

Since the threshold values T1 and T2 for touch determination and the threshold values S1 and S2 for approach determination are stored in the memory within the liquid crystal display device 1 as described above, the control circuit 300 determines the brightness around the liquid crystal display device 1 on the basis of a measurement result of ambient light. When the surrounding area of the liquid crystal display device 1 is bright, the control circuit 300 reads the threshold value T1 for touch determination from the memory and sets the threshold value T1 as a threshold value to be used in the binarization processing. In addition, when the surrounding area of the liquid crystal display device 1 is dark, the control circuit 300 reads the threshold value T2 for touch determination from the memory and sets the threshold value T2 as a threshold value to be used in the binarization processing.

As described above, according to the present embodiment, when the liquid crystal display device 1 senses that the finger or the touch pen 50 has not touched the display screen continuously for a predetermined time, the liquid crystal display device 1 switches the read mode of received light signals from the normal read mode to the partial read mode and reads received light signals from the photodetection circuits O1 arrayed in the operation button display area C. In addition, when the liquid crystal display device 1 senses that the finger or the touch pen 50 has approached close to the display screen (operation button display area C), the liquid crystal display device 1 switches the read mode of received light signals from the partial read mode to the normal read mode and reads received light signals from all photodetection circuits O1 provided on the display screen. Accordingly, since the received light signals are read from only the photodetection circuits O1 arrayed in the operation button display area C until it is sensed that the finger or the touch pen 50 has approached close to the display screen (operation button display area C) after sensing that the finger or the touch pen 50 has not touched the display screen continuously for a predetermined time, the number of photodetection circuits O1 that read the received light signals can be reduced. As a result, since the process load required for reading of received light signals or binarization processing can be reduced, the power consumption of the liquid crystal display device 1 can be reduced.

In addition, the received light signals are read from all photodetection circuits O1 provided on the display screen until it is sensed that the finger or the touch pen 50 has not touched the display screen continuously for a predetermined time after sensing that the finger or the touch pen 50 has approached close to the display screen (operation button display area C). Accordingly, the touch determination or detection of a touch position can be performed on the whole display screen.

In addition, the number N of scanning lines selected in the partial read mode is preferably an integer of 2 or more and m or less. Similarly, the number N of read lines used in the partial read mode is preferably an integer of 2 or more and n or less.

Embodiment C2

In the embodiment C1 described above, the scanning circuit 500 for sensors may be configured to sequentially select 'M' ($2 \leq M \leq m$) scanning lines, which are objects to be selected, at the rate of one every 'L' ($2 \leq L \leq M$) scanning lines when the read mode of received light signals is the partial read mode.

For example, in the example shown in FIG. 8, the scanning circuit 500 for sensors sequentially selects 40 scanning lines of scanning lines 201 to 240 at the rate of one every 2 scanning lines in the partial read mode. In this case, the scanning circuit 500 for sensors selects the scanning lines one by one in order of scanning line 201, scanning line 203, scanning line 205, ..., scanning line 235, scanning line 237, and scanning line 239, for example. Accordingly, only 20 scanning lines of the 40 scanning lines, which are objects to be selected, are selected and the remaining 20 scanning lines are thinned out without being selected. Moreover, in the example shown in FIG. 9, the scanning circuit 500 for sensors sequentially selects 240 scanning lines of scanning lines 1 to 240 at the rate of one every 10 scanning lines in the partial read mode. In this case, the scanning circuit 500 for sensors sequentially selects the scanning line 10, the scanning line 20, the scanning line 30, ..., the scanning line 220, the scanning line 230, and the scanning line 240, for example. Accordingly, only 24 scanning lines of the 240 scanning lines, which are objects to be selected, are selected and the remaining 216 scanning lines are thinned out without being selected.

According to the above-described configuration, the number of photodetection circuits O1 that read received light signals in the partial read mode can be reduced to 1/L compared with the case of the embodiment C1. As a result, the power consumption can be further reduced.

Embodiment D1

Next, an embodiment D1 will be described.

In addition, since the hardware configuration of a liquid crystal display according to the present embodiment is almost similar to that of the liquid crystal display device 1 according to the embodiment B1, the same reference numerals as in the embodiment B1 are used. In addition, an explanation on the same parts as in the embodiment B1 will be omitted.

In the embodiment B1, the case where the normal mode (60 Hz) and the low consumption mode (10 Hz) are prepared and the period, in which the received light signals for one screen are read, is changed has been described. On the other hand, in the present embodiment, a case where a normal mode and a thinning-out mode are prepared instead of the normal mode and the low consumption mode and the number of photodetection circuits O1 that read received light signals is changed will be described.

In the present embodiment, the scanning circuit 500 for sensors has a normal mode, in which 'm' scanning lines are sequentially selected one by one, and a thinning-out mode, in which 'm' scanning lines are sequentially selected at the rate of one every 10 scanning lines, and operates in one of the modes in response to an instruction from the control circuit 300. In addition, whenever a scanning line is selected by the scanning circuit 500 for sensors, the received light signal processing circuit 600 reads received light signals X1, X2, X3, X4, ..., Xn from the 'n' photodetection circuits O1, which are connected to the select scanning line, through 'n' read lines and then supplies the signals to the control circuit 300.

The control circuit 300 controls the scanning circuit 500 for sensors and the received light signal processing circuit 600 to read the received light signals for one screen at predetermined periods (for example, 60 Hz). In addition, when the scanning circuit 500 for sensors is in the normal mode, the number of received light signals for one screen is 'm×n'. Accordingly, 'm×n' binary signals are also generated corresponding to the 'm×n' received light signals. In addition, when the scanning circuit 500 for sensors is in the thinning-out mode, the number of received light signals for one screen is '(m×n)/10'. Accordingly, '(m×n)/10' binary signals are also generated corresponding to the '(m×n)/10' received light signals.

Next, the normal mode and the thinning-out mode in the present embodiment will be described using FIG. 11. As also described above in the embodiment B3, on the display screen (image display area A) in FIG. 11, a total of 12 display buttons are disposed in a matrix of 'four rows×three columns'. In addition, a total of 240 scanning lines of scanning lines 1 to 240 are provided in the image display area A. In the normal mode, the scanning circuit 500 for sensors selects 240 scanning lines one by one in a sequential manner. That is, the scanning circuit 500 for sensors sequentially selects all scanning lines one by one in order of scanning line 1, scanning line 2, scanning line 3, . . . , scanning line 238, scanning line 239, and scanning line 240. On the other hand, in the thinning-out mode, the scanning circuit 500 for sensors sequentially selects 240 scanning lines at the rate of one every 10 scanning lines. That is, the scanning circuit 500 for sensors selects the scanning line 10, the scanning line 20, the scanning line 30, . . . , the scanning line 220, the scanning line 230, and the scanning line 240 one by one in a sequential manner, for example. Accordingly, in the thinning-out mode, only 24 scanning lines of the 240 scanning lines are selected, and the remaining 216 scanning lines are thinned out without being selected. Thus, the scanning circuit 500 for sensors can operate in the normal mode and the thinning-out mode.

In addition, when the scanning circuit 500 for sensors receives a control signal, which instructs switching of an operation mode, from the control circuit 300, the scanning circuit 500 for sensors switches to the operation mode instructed by the control signal.

In addition, the liquid crystal display device 1 according to the present embodiment performs, at predetermined periods (for example, 120 Hz or 60 Hz), one cycle processing related to the touch input function of reading received light signals for one screen, determining whether or not there is a touch or whether or not there is approach on the basis of the read received light signals for one screen, and detecting the touch position when it is determined that there is a touch. Furthermore, in the present embodiment, it is assumed that the one cycle processing is performed every 60 Hz.

FIGS. 14A and 14B are flow charts illustrating the flows of mode switching processes 11 and 12 in the present embodiment. The mode switching process 11 shown in FIG. 14A is executed when the scanning circuit 500 for sensors is made to operate in the normal mode. Moreover, in the liquid crystal display device 1, for example, when a user instructs the touch input function to be turned on, the scanning circuit 500 for sensors is made to operate in the normal mode after starting reception of the touch input. In the case of the liquid crystal display device 1 that performs all operations basically by touch input using a finger or the touch pen 50, when a power switch is pressed to complete initial processing, reception of the touch input is started to make the scanning circuit 500 for sensors operate in the normal mode.

As described above, in the normal mode, the scanning lines are selected one by one in a sequential manner, and the received light signals are read from all photodetection circuits O1 provided in the image display area A. First, the control circuit 300 determines whether there is a touch, that is, whether or not a finger or the touch pen 50 touches the display screen on the basis of received light signals for one screen ('m×n' received light signals) that have been newly read (step S1101).

Specifically, first, the control circuit 300 compares a signal level of each of the received light signals for one screen with the threshold value T (specifically, the threshold value T1 or T2) and converts each of the received light signals into a binary signal. In addition, although the threshold value T used herein is basically set in step S1203 of the mode switching process 12 which will be described later, the threshold value T may be suitably changed between the threshold values T1 and T2 on the basis of a measurement result of ambient light when the surrounding area of the liquid crystal display device 1 has changed from a bright state to a dark state or from a dark state to a bright state on the contrary. That is, the threshold value T1 is used when the surrounding area of the liquid crystal display device 1 is bright, and the threshold value T2 is used when the surrounding area of the liquid crystal display device 1 is dark. Then, the control circuit 300 counts the number of binary signals with signal values of '1', for example, among the generated binary signals for one screen ('m×n' binary signals). When the count value is a value within a range set by the upper and lower limits stored in a memory, the control circuit 300 determines that there is a touch (step S1101: NO). On the other hand, when the count value is not a value within the range, the control circuit 300 determines that there is no touch (step S1101: YES).

Moreover, as described above, values of the upper and lower limits compared with the count value are different in the case where the surrounding area of the liquid crystal display device 1 is bright and the case where the surrounding area of the liquid crystal display device 1 is dark or in the case of touch determination and the case of approach determination. Moreover, when the scanning circuit 500 for sensors in the thinning-out mode, the number of binary signals for one screen becomes 1/10 of that in the normal mode since the scanning lines are thinned out. Accordingly, values of upper and lower limits compared with a count value are also different in a case where an operation mode of the scanning circuit 500 for sensors is the normal mode and a case where an operation mode of the scanning circuit 500 for sensors is the thinning-out mode.

When it is determined that there is a touch in step S1101, the mode switching process 11 is ended. In this case, the scanning circuit 500 for sensors continues operating in the normal mode. In addition, when it is determined that there is a touch as described above, the control circuit 300 detects the touch position after ending the mode switching process 11. When detecting the touch position, the binary signals for one screen generated in determining whether or not there is a touch in step S1101 are used.

On the other hand, when it is determined that there is no touch in step S1101, the control circuit 300 determines whether or not a state, in which a result of determination that there is no touch is continuously obtained, continues for a predetermined time (for example, 5 minutes) (step S1102). In addition, since the one cycle processing related to the touch input function is performed every 60 Hz, the determination result of step S1101 is obtained every 60 Hz. Accordingly, the control circuit 300 may count the number of times of results of determination that there is no touch, which are continuously obtained, and determine whether or not the count value has reached the number of times equivalent to the predetermined time described above. In addition, the predetermined time may be set to an arbitrary time, such as 60 seconds or 30 minutes.

When it is determined that the state does not continue for the predetermined time in step S1102, the mode switching process 11 is ended. Also in this case, the scanning circuit 500 for sensors continues operating in the normal mode. On the other hand, when it is determined that the state continues for the predetermined time in step S1102, the control circuit 300 switches the operation mode of the scanning circuit 500 for sensors from the normal mode to the thinning-out mode (step S1103). In addition, when switching the operation mode to the thinning-out mode, a control signal that instructs switching of the operation mode (switching to the thinning-out mode) is transmitted from the control circuit 300 to the scanning circuit 500 for sensors. The scanning circuit 500 for sensors changes the operation mode to the thinning-out mode when the control signal is received. The scanning circuit 500 for sensors sequentially selects the scanning lines at the rate of one every ten scanning lines.

Then, the control circuit 300 changes a threshold value used in binarization processing from the threshold value T for touch determination to the threshold value S for approach determination after switching the operation mode of the scanning circuit 500 for sensors to the thinning-out mode (step S1104). Since the threshold values T1 and T2 for touch determination and the threshold values S1 and S2 for approach determination are stored in the memory within the liquid crystal display device 1 as described above, the control circuit 300 determines the brightness around the liquid crystal display device 1 on the basis of a measurement result of ambient light. When the surrounding area of the liquid crystal display device 1 is bright, the control circuit 300 reads the threshold value S1 for approach determination from the memory and sets the threshold value S1 as a threshold value to be used in the binarization processing. In addition, when the surrounding area of the liquid crystal display device 1 is dark, the control circuit 300 reads the threshold value S2 for approach determination from the memory and sets the threshold value S2 as a threshold value to be used in the binarization processing.

On the other hand, the mode switching process 12 shown in FIG. 14B is executed when the scanning circuit 500 for sensors is made to operate in the thinning-out mode. As described above, in the thinning-out mode, the scanning lines are selected at the rate of one every ten scanning lines. Accordingly, the number of received light signals for one screen becomes 1/10 of that in the normal mode. First, the control circuit 300 determines whether there is approach, that is, whether or not a finger or the touch pen 50 approaches close to the display screen on the basis of received light signals for one screen ('(m×n)/10' received light signals) that have been newly read (step S1201).

Specifically, first, the control circuit 300 compares a signal level of each of the received light signals for one screen with the threshold value S for approach determination (specifically, the threshold value S1 or S2) and converts each of the received light signals into a binary signal. In addition, although the threshold value S used herein is basically set in step S1104 of the mode switching process 11 described above, the threshold value S may be suitably changed between the threshold values S1 and S2 on the basis of a measurement result of ambient light when the surrounding area of the liquid crystal display device 1 has changed from a bright state to a dark state or from a dark state to a bright state on the contrary. That is, the threshold value S1 is used when the surrounding area of the liquid crystal display device 1 is bright, and the threshold value S2 is used when the surrounding area of the liquid crystal display device 1 is dark. Then, the control circuit 300 counts the number of binary signals with signal values of '1', for example, among the generated binary signals for one screen ('(m×n)/10' binary signals). When the count value is a value within a range set by the upper and lower limits stored in a memory, the control circuit 300 determines that there is approach. On the other hand, when the count value is not a value within the range, the control circuit 300 determines that there is no approach. Moreover, as described above, values of the upper and lower limits compared with the count value are different in the case where the surrounding area of the liquid crystal display device 1 is bright and the case where the surrounding area of the liquid crystal display device 1 is dark, in the case of touch determination and the case of approach determination, or the case where the operation mode of the scanning circuit 500 for sensors is the normal mode and the case where the operation mode of the scanning circuit 500 for sensors is the thinning-out mode.

When it is determined that there is no approach in step S1201, the mode switching process 12 is ended. In this case, the scanning circuit 500 for sensors continues operating in the thinning-out mode. On the other hand, when it is determined that there is approach in step S1201, the control circuit 300 switches the operation mode of the scanning circuit 500 for sensors from the thinning-out mode to the normal mode (step S1202). In addition, when switching the operation mode to the normal mode, a control signal that instructs switching of the operation mode (switching to the normal mode) is transmitted from the control circuit 300 to the scanning circuit 500 for sensors. The scanning circuit 500 for sensors changes the operation mode to the normal mode when the control signal is received. Then, the scanning circuit 500 for sensors selects all scanning lines one by one by in a sequential manner.

Then, the control circuit 300 changes the threshold value used in binarization processing from the threshold value S for approach determination to the threshold value T for touch determination after switching the operation mode of the scanning circuit 500 for sensors to the normal mode (step S1203). Since the threshold values T1 and T2 for touch determination and the threshold values S1 and S2 for approach determination are stored in the memory within the liquid crystal display device 1 as described above, the control circuit 300 determines the brightness around the liquid crystal display device 1 on the basis of a measurement result of ambient light. When the surrounding area of the liquid crystal display device 1 is bright, the control circuit 300 reads the threshold value T1 for touch determination from the memory and sets the threshold value T1 as a threshold value to be used in the binarization processing. In addition, when the surrounding area of the liquid crystal display device 1 is dark, the control circuit 300 reads the threshold value T2 for touch determination from the memory and sets the threshold value T2 as a threshold value to be used in the binarization processing.

As described above, according to the present embodiment, when the liquid crystal display device 1 senses that a finger or the touch pen 50 has not touched the display screen continuously for a predetermined time, the liquid crystal display device 1 switches the operation mode of the scanning circuit 500 for sensors from the normal mode to the thinning-out mode and sequentially selects the scanning lines at the rate of one every 10 scanning lines. In addition, when the liquid crystal display device 1 senses that the finger or the touch pen 50 has approached close to the display screen, the liquid crystal display device 1 switches the operation mode of the scanning circuit 500 for sensors from the thinning-out mode to the normal mode and selects all scanning lines one by one in a sequential manner. Accordingly, by making the scanning circuit 500 for sensors operate in the thinning-out mode until it is sensed that the finger or the touch pen 50 has approached close to the display screen after sensing that the finger or the touch pen 50 has not touched the display screen continuously for a predetermined time, the number of photodetection circuits O1 that reads the received light signals can be reduced to 1/10 of that in the normal mode.

Moreover, by making the scanning circuit 500 for sensors operate in the normal mode until it is sensed that the finger or the touch pen 50 has not touched the display screen continuously for a predetermined time after sensing that the finger or the touch pen 50 has approached close to the display screen, the received light signals can be read from all photodetection circuits O1 provided on the display screen, and the touch determination and detection of a touch position can be performed with high precision. In particular, by setting the timing for switching from the thinning-out mode to the normal mode to a point of time when approach is sensed rather than a point of time when a touch is sensed, the precision related to the touch determination or the detection of a touch position before the finger or the touch pen 50 actually touches the display screen can be improved.

Moreover, in the thinning-out mode, the scanning lines may be sequentially selected at the rate of one every 2 scanning lines or one every 15 scanning lines. Thus, in the thinning-out mode, the scanning lines may be sequentially selected at the rate of one every 'K' (integer of 2 or more and 'm' or less) scanning lines. In addition, although the case where switching to the normal mode is performed when reception of touch input starts has been described in the present embodiment, switching to the thinning-out mode may also be performed when reception of touch input starts.

Electronic Apparatus

Figure 15:
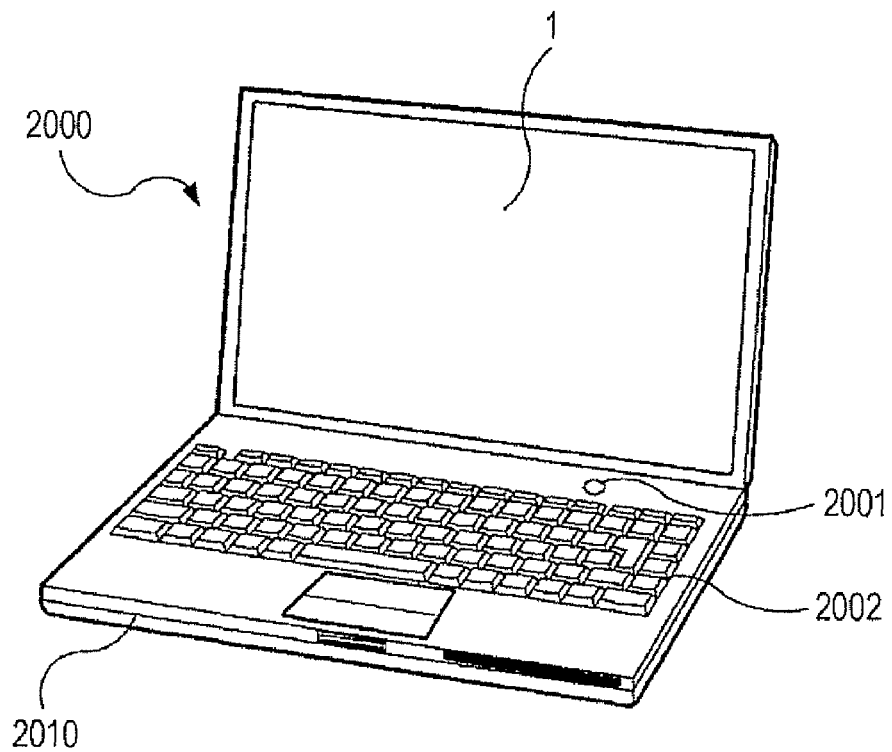
FIGS. 15 to 17 are perspective views illustrating specific examples of an electronic apparatus according to an embodiment of the invention.

Next, an electronic apparatus to which the liquid crystal display device 1 according to one of the above embodiments is applied will be described. FIG. 15 is a view illustrating the configuration of a mobile type personal computer to which the liquid crystal display device 1 is applied. A personal computer 2000 includes the liquid crystal display device 1 as a display unit and a touch input unit and a main body 2010. In addition, a power switch 2001 and a keyboard 2002 are provided in the main body 2010.

Figure 16:
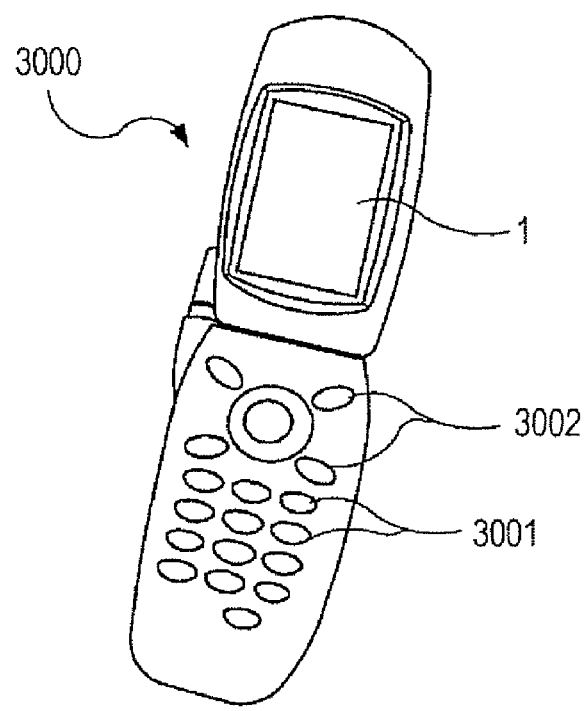

FIG. 16 is a view illustrating the configuration of a mobile phone to which the liquid crystal display device 1 is applied. A mobile phone 3000 includes the liquid crystal display device 1 as a display unit and a touch input unit, a plurality of operation buttons 3001, and a scroll button 3002. A screen displayed on the liquid crystal display device 1 is scrolled by operating the scroll buttons 3002.

Figure 17:
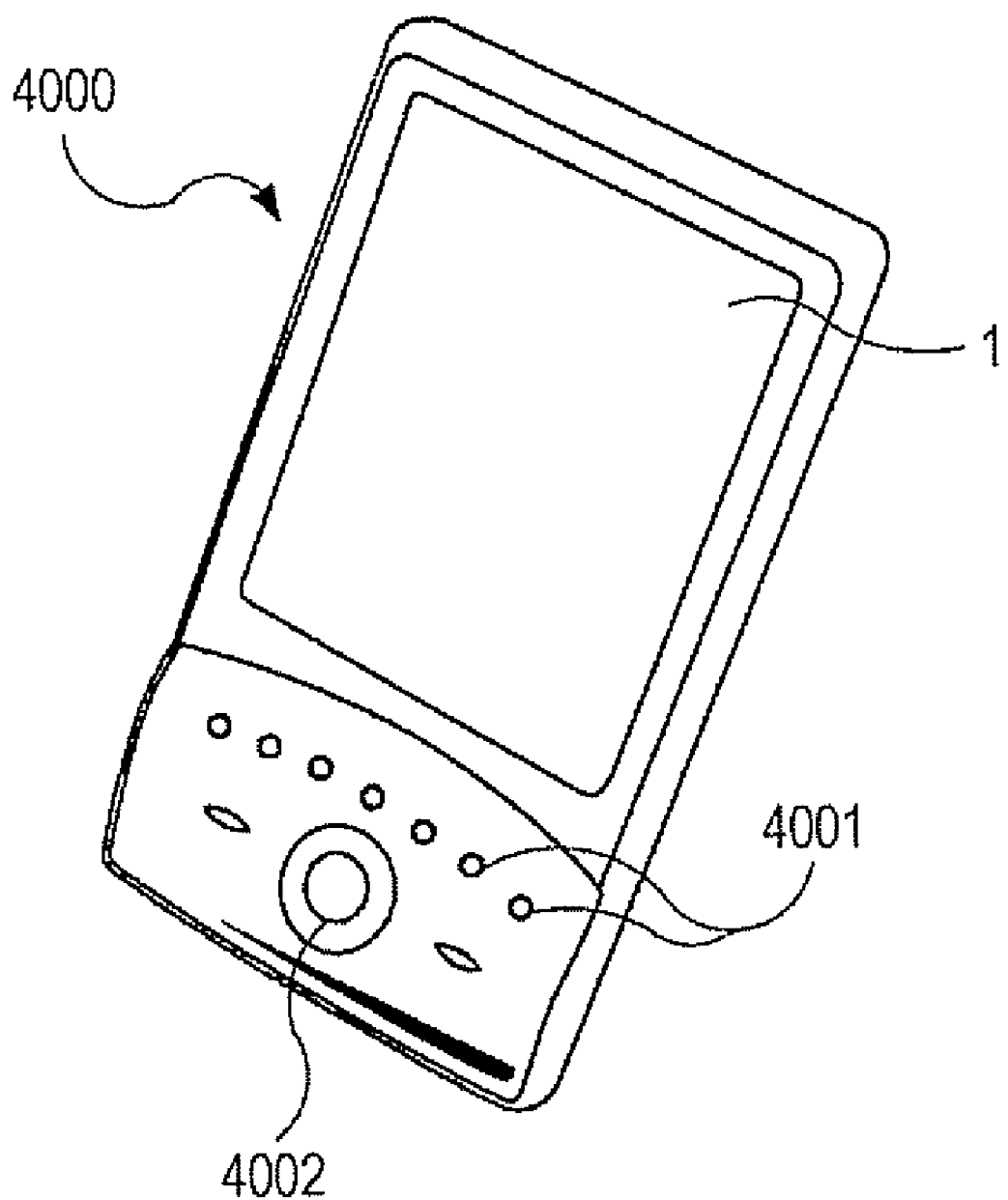

FIG. 17 is a view illustrating the configuration of a personal digital assistant (PDA) to which the liquid crystal display device 1 is applied. A personal digital assistant 4000 includes the liquid crystal display device 1 as a display unit and a touch input unit, a plurality of operation buttons 4001, and a power switch 4002. By operating the operation buttons 4001, various kinds of information, such as an address list or a schedule book, are displayed on the liquid crystal display device 1.

In addition, examples of an electronic apparatus to which the liquid crystal display device 1 is applied include a digital still camera, a car navigation apparatus, an electronic diary, a word processor, a workstation, a video phone, a POS terminal, an automated teller machine (ATM), an automatic vending machine, and the like, as well as those shown in FIGS. 15 to 17. Particularly in cases of portable devices, an operable time with one charge (or one battery change) can be extended since the excessive power consumption is suppressed by application of the invention.

Modifications

For example, various kinds of modifications described below may be made. In addition, two or more modifications shown below may also be combined suitably.

(1) In the embodiment A1, the case where the normal mode (60 Hz) and the fast mode (120 Hz) are prepared and switching to the normal mode is performed when reception of touch input starts and switching to the fast mode is performed when a finger or the touch pen 50 touches the display screen or when a time, for which the finger or the touch pen 50 touches the display screen continuously, reaches a predetermined time or more has been described. However, in the embodiment A1, switching to the fast mode may also be performed instead of switching to the normal mode when reception of touch input starts. Furthermore, in the embodiment A1, it may be possible to adopt a configuration where a normal mode (120 Hz) and a slow mode (60 Hz) are prepared and switching to the normal mode (120 Hz) is performed when reception of touch input starts and switching to the slow mode (60 Hz) is performed when a finger or the touch pen 50 does not touch the display screen or when a time, for which the state of no-touch continues, is counted and the count value reaches a predetermined time or more.

(2) In the embodiments B1 to B3, the case where switching from the low consumption mode to the normal mode is performed when it is sensed that the finger or the touch pen 50 has approached close to the display screen has been described. However, the switching from the low consumption mode to the normal mode may also be performed when it is sensed that the finger or the touch pen 50 has touched the display screen. Furthermore, in the embodiments B1 to B3, the case where switching from the normal mode to the low consumption mode is performed when it is sensed that the finger or the touch pen 50 has not touched the display screen continuously for a predetermined time has been described. However, the switching from the normal mode to the low consumption mode may also be performed when it is sensed that the finger or the touch pen 50 has not approached close to the display screen continuously for a predetermined time.

(3) In the embodiments C1 and C2, the case where switching from the partial read mode to the normal read mode is performed when it is sensed that the finger or the touch pen 50 has approached close to the display screen has been described. However, the switching from the partial read mode to the normal read mode may also be performed when it is sensed that the finger or the touch pen 50 has touched the display screen. Furthermore, in the embodiments C1 and C2, the case where switching from the normal read mode to the partial read mode is performed when it is sensed that the finger or the touch pen 50 has not touched the display screen continuously for a predetermined time has been described. However, the switching from the normal read mode to the partial read mode may also be performed when it is sensed that the finger or the touch pen 50 has not approached close to the display screen continuously for a predetermined time.

(4) In the embodiment D1, the case where switching from the thinning-out mode to the normal mode is performed when it is sensed that the finger or the touch pen 50 has approached close to the display screen has been described. However, the switching from the thinning-out mode to the normal mode may also be performed when it is sensed that the finger or the touch pen 50 has touched the display screen. Furthermore, in the embodiment D1, the case where switching from the normal mode to the thinning-out mode is performed when it is sensed that the finger or the touch pen 50 has not touched the display screen continuously for a predetermined time has been described. However, the switching from the normal mode to the thinning-out mode may also be performed when it is sensed that the finger or the touch pen 50 has not approached close to the display screen continuously for a predetermined time.

(5) When the surrounding area of the liquid crystal display device 1 is dark, it is sensed that a finger or the touch pen 50 has approached close to the display screen with the light of the backlight 800 reflected by the finger or the touch pen 50. For this reason, when the surrounding area of the liquid crystal display device 1 is dark, it is difficult to sense the approach when the brightness of light emitted from the backlight 800 is weak. Therefore, in the embodiment B2 described above, when a scanning backlight is adopted as the backlight 800, the surrounding area of the liquid crystal display device 1 is dark, and an operation mode is a low consumption mode, the amount of emitted light may be increased only for a light source that illuminates a portion of the operation button display area C so as to be larger than those for the other light sources.

Specifically, first, the scanning backlight includes a plurality of light sources capable of adjusting the amount of emitted light. For example, the scanning backlight includes three light sources of first, second, and third light sources. The first to third light sources illuminate different regions on the display screen. For example, in the case of the display screen shown in FIG. 8, when the display screen is divided into three belt-like regions (an upper region [scanning lines 1 to 80], a middle region [scanning lines 81 to 160], a lower region [scanning lines 161 to 240]) extending in the x direction, emitted light from the first light source illuminates the upper region, emitted light from the second light source illuminates the middle region, and emitted light from the third light source illuminates the lower region. The control circuit 300 calculates the illuminance of ambient light on the basis of a plurality of received light signals, and determines that the surrounding area of the liquid crystal display device 1 is dark when the calculated illuminance is less than a predetermined value. When it is determined that the surrounding area of the liquid crystal display device 1 is dark as described above and the operation mode is the low consumption mode, the control circuit 300 instructs the light control circuit 700 to increase the amount of emitted light by a predetermined amount only for the third light source when outputting to the light control circuit 700 data indicating the calculated illuminance of calculated ambient. In response to the instruction, the light control circuit 700 controls the first and second light sources to have the amount of emitted light corresponding to the illuminance of ambient light, and increases the amount of emitted light by a predetermined amount instructed from the control circuit 300 for the third light source such that the amount of emitted light from the third light source is larger than those from the first and second light sources.

According to the above configuration, when the surrounding area of the liquid crystal display device 1 is dark and the operation mode is the low consumption mode, light from the scanning backlight may be made strong only in the lower region, which includes the operation button display area C, on the display screen shown in FIG. 8. Accordingly, even if the surrounding area of the liquid crystal display device 1 is dark, it can be more easily sensed that the finger or the touch pen 50 has approached close to the display screen (operation button display area C). In addition, since it is sufficient to increase the amount of emitted light only for the third light source that illuminates the portion of the operation button display area C, it is not necessary to raise the brightness of the whole display screen. As a result, useless power consumption can be suppressed. In addition, an edge light type backlight or a direct type backlight may be adopted as the scanning backlight.

In addition, the modification (5) may also be applied to the embodiments C1 and C2. That is, in the liquid crystal display device 1 according to the embodiments C1 and C2, when a scanning backlight is adopted as the backlight 800, the surrounding area of the liquid crystal display device 1 is dark, and a read mode of received light signals is a partial read mode, the amount of emitted light may be increased only for a light source that illuminates a portion of the operation button display area C so as to be larger than those for the other light sources.

(6) In each of the embodiments described above, the photodetection circuit O1 is provided for every one pixel (pixel circuit P1). However, for example, one photodetection circuit O1 may be provided for every four pixels (pixel circuits P1) on the left, right, upper, and lower sides. In addition, the arrangement pattern of the photodetection circuits O1 is not limited to the matrix. For example, the photodetection circuits O1 may be formed in the image display area A to have a black (or white) arrangement pattern on a checker board. In addition, both the total number 'm' of scanning lines and the total number 'n' of read lines provided in the image display area A are preferably integers of 2 or more.

(7) The display device according to each of the embodiments may be a transflective or reflective liquid crystal display device or a display device using an OLED element. The OLED element is a current-driving-type light-emitting element that emits light by itself unlike a liquid crystal element that changes the transmission amount of light. In addition, the display device according to each of the embodiments may also be a display device that uses an electro-optical element other than the liquid crystal element or the OLED element. In addition, the electro-optical element refers to an element whose optical characteristic, such as a transmittance or brightness, changes with supply of an electric signal (current or voltage). The invention may also be applied to a display device that include a display panel using a light-emitting element such as an inorganic EL (electroluminescence) element or a light-emitting polymer element, an electrophoretic display panel using as an electro-optical material a microcapsule containing colored liquid and white particles dispersed in the liquid, a twist ball display panel using as an electro-optical material a twist ball in which regions having different polarities are divided by different colors, a toner display panel using a black toner as an electro-optical material, or a plasma display panel using a high pressure gas, such as helium or neon, as an electro-optical material, for example. In addition, the invention may also be applied to a display device including a touch panel that is of a resistance film type or a capacitive type.

(8) The sensing device according to the embodiment of the invention may also be applied to a computer device that has a so-called gesture function, specifies an operation command (for example, scroll, move to next page, return to previous page, paste, copy, delete, and undo) corresponding to the form when a liner a simple figure, and the like are drawn on a screen by a finger or the touch pen 50, and performs processing according to the specified operation command. In this case, an image showing the line or the figure drawn by the finger or the touch pen 50 does not need to be displayed. Thus, in the sensing device according to the embodiment of the invention, it is not essential to generate an image showing the locus of the detected touch position and to display the image.

The entire disclosure of Japanese Patent Application Nos: 2008-035640, filed Feb. 18, 2008, 2008-035641, filed Feb. 18, 2008, 2008-035646, filed Feb. 18, 2008 and 2008-035647, filed Feb. 18, 2008 are expressly incorporated by reference herein.

What is claimed is:
1. A sensing device comprising:
   a plurality of sensors that are arrayed on a screen and that generate first detection signals each having a level corresponding to a touch state of an object on the screen or a distance between the object and the screen;

a read unit that reads the first detection signals from the plurality of sensors at predetermined periods;
a binarization unit that compares a level of each of the first detection signals read by the read unit with a threshold value and generates a second detection signal that is binarized;
a determination unit that determines whether or not the object touches the screen on the basis of each second detection signal;
a detection unit that detects a touch position of the object on the screen on the basis of each second detection signal; and
a control unit that controls the read unit such that the predetermined period becomes a first period when the determination unit determines that there is no touch and that controls the read unit such that the predetermined period becomes a second period shorter than the first period when the determination unit determines that there is a touch,
wherein the control unit:
controls the read unit such that the predetermined period becomes the first period when (i) the determination unit determines that there is no touch and (ii) when the determination unit determines that there is a touch but the touch does not continue at least for a predetermined time and
controls the read unit such that the predetermined period becomes the second period when the determination unit determines that the touch continues at least for the predetermined time.

2. The sensing device according to claim 1 further comprising:
a change unit that changes the threshold value when the control unit controls the read unit such that the predetermined period becomes the first period and when the control unit controls the read unit such that the predetermined period becomes the second period.

3. The sensing device according to claim 2,
wherein the change unit set a first threshold value corresponding to the first period as the threshold value when the control unit controls the read unit such that the predetermined period becomes the first period and sets a second threshold value corresponding to the second period as the threshold value when the control unit controls the read unit such that the predetermined period becomes the second period.

4. The sensing device according to claim 1,
wherein the determination unit counts the number of second detection signals, which satisfy a condition set by the threshold value, among all of the second detection signals and determines whether or not the object touches the screen on the basis of the count result.

5. A display device comprising:
the sensing device according to claim 1, and
a display unit that displays an image.

6. The display device according to claim 5, further comprising:
a display control unit that generates an image showing the locus of the position detected by the detection unit and displays the image on the display unit.

7. An electronic apparatus comprising the display device according to claim 5.

8. The sensing device according to claim 1, wherein the first period is about 60 hertz and the second period is about 120 hertz or the first period is about 30 hertz and the second period is about 100 hertz.

9. A sensing device that detects a touch position of an object on a screen, comprising:
a plurality of sensors that are arrayed on the screen and that generate first detection signals each having a level corresponding to an amount of incident light,
a read unit that is operable in a normal mode, in which the first detection signals are read from the plurality of sensors at first periods, and a low consumption mode, in which the first detection signals are read from the plurality of sensors at second periods longer than the first period;
a binarization unit that compares a level of each of the first detection signals read by the read unit with a threshold value and generates a second detection signal that is binarized;
a sensing unit that senses that the object does not touch the screen on the basis of each second detection signal,
a detection unit that detects the touch position of the object on the screen on the basis of each second detection signal; and
a control unit that controls switching between the normal mode and the low consumption mode, controls the read unit to switch to the low consumption mode when the sensing unit senses that there is no touch continuously for a predetermined time in the normal mode, and controls the read unit to switch from the low consumption mode to the normal mode in a predetermined case,
wherein the control unit:
controls the read unit such that the read unit is switched to the low consumption mode when the sensing unit senses that there is a touch but the touch does not continue for at least for a predetermined time and
controls the read unit such that the read unit in the predetermined case is switched to the normal mode when the sensing unit senses that the touch continues for at least for the predetermined time.

10. The sensing device according to claim 9,
wherein the plurality of sensors are 'm×n' sensors arrayed on the screen corresponding to intersections between 'm' (integer of 2 or more) scanning lines and 'n' (integer of 2 or more) read lines, and
the read unit is operable in a normal mode, in which the first detection signals are read from the 'm×n' sensors at the first periods, and a low consumption mode, in which the first detection signals are read at the second periods from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed.

11. The sensing device according to claim 10, further comprising:
a backlight that includes a plurality of light sources capable of adjusting an amount of emitted light and that is provided on a back surface of the screen; and
an adjustment unit that calculates an illuminance of ambient light on the basis of the plurality of first detection signals read by the read unit and increases the amount of emitted light of the light source, which corresponds to an area where the 'M×N' sensors are arrayed, to be larger than those of the other light sources when the calculated illuminance is less than a predetermined value in the low consumption mode.

12. The sensing device according to claim 9,
wherein the plurality of sensors are arrayed on the screen corresponding to intersections between a plurality of scanning lines and a plurality of read lines, and the read unit includes a selection unit, which sequentially selects the plurality of scanning lines in the normal mode and sequentially selects the plurality of scanning lines at the rate of one every 'L' (integer of 2 or more) scanning lines in the low consumption mode, and reads the first detection signals through the plurality of read lines from the sensors corresponding to the scanning lines selected by the selection unit.

13. A sensing device that detects a touch position of an object on a screen, comprising:
'm×n' sensors that are arrayed on the screen corresponding to intersections between 'm' (integer of 2 or more) scanning lines and 'n' (integer of 2 or more) read lines and that generate first detection signals each having a level corresponding to an amount of incident light;
a read unit that is operable in a normal read mode, in which the first detection signals are read from the 'm×n' sensors, and a partial read mode, in which the first detection signals are read from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed;
a binarization unit that compares a level of each of the first detection signals read by the read unit with a threshold value and generates a second detection signal that is binarized;
a sensing unit that senses that the object does not touch the screen on the basis of each second detection signal;
a detection unit that detects the touch position of the object on the screen on the basis of each second detection signal; and
a control unit that controls switching between the normal read mode and the partial read mode, controls the read unit to switch to the partial read mode when the sensing unit senses that there is no touch continuously for a predetermined time in the normal read mode, and controls the read unit to switch from the partial read mode to the normal read mode in a predetermined case,
wherein the control unit:
controls the read unit such that the read unit is switched to the partial read mode when the sensing unit senses that there is a touch but the touch does not continue for at least for a predetermined time and
controls the read unit such that the read unit in the predetermined case is switched to the normal read mode when the sensing unit senses that the touch continues for at least for the predetermined time.

14. The sensing device according to claim 13, further comprising:
a backlight that includes a plurality of light sources capable of adjusting an amount of emitted light and that is provided on a back surface of the screen; and
an adjustment unit that calculates an illuminance of ambient light on the basis of the plurality of first detection signals read by the read unit and increases the amount of emitted light of the light source, which corresponds to an area where the 'M×N' sensors are arrayed, to be larger than those of the other light sources when the calculated illuminance is less than a predetermined value in the partial read mode.

15. A sensing device that detects a touch position of an object on a screen, comprising:
'm×n' sensors that are arrayed on the screen corresponding to intersections between 'm' (integer of 2 or more) scanning lines and (integer of 2 or more) read lines and that generate first detection signals each having a level corresponding to an amount of incident light;
a read unit that is operable in a normal read mode, in which the first detection signals are read from the 'm×n' sensors, and a partial read mode, in which the first detection signals are read from the 'M×N' (smaller than 'm×n') sensors corresponding to the 'M' (integer of 2 or more and 'm' or less) scanning lines continuously arrayed and the 'N' (integer of 2 or more and 'n' or less) read lines continuously arrayed;
a binarization unit that compares a level of each of the first detection signals read by the read unit with a threshold value and generates a second detection signal that is binarized;
a sensing unit that senses that the object does not touch the screen on the basis of each second detection signal;
a detection unit that detects the touch position of the object on the screen on the basis of each second detection signal; and
a control unit that controls switching between the normal read mode and the partial read mode, controls the read unit to switch to the partial read mode when the sensing unit senses that there is no touch continuously for a predetermined time in the normal read mode, and controls the read unit to switch from the partial read mode to the normal read mode in a predetermined case,
wherein the read unit includes a selection unit, which sequentially selects the 'm' scanning lines in the normal read mode and sequentially selects the 'M' scanning lines at the rate of one every (integer of 2 or more and or less) scanning lines in the partial read mode, and reads the first detection signals from the 'm×n' sensors in the normal read mode and reads the first detection signals from the '(M×N)/L' sensors in the partial read mode.

16. A sensing device that detects a touch position of an object on a screen, comprising:
a plurality of sensors that are arrayed on the screen and that generate first detection signals each having a level corresponding to an amount of incident light,
a read unit that is operable in a normal mode, in which the first detection signals are read from the plurality of sensors at first periods, and a low consumption mode, in which the first detection signals are read from the plurality of sensors at second periods longer than the first period;
a binarization unit that compares a level of each of the first detection signals read by the read unit with a threshold value and generates a second detection signal that is binarized;
a sensing unit that senses that the object does not touch the screen on the basis of each second detection signal,
a detection unit that detects the touch position of the object on the screen on the basis of each second detection signal; and
a control unit that controls switching between the normal mode and the low consumption mode, controls the read unit to switch to the low consumption mode when the sensing unit senses that there is no touch continuously for a predetermined time in the normal mode, and controls the read unit to switch from the low consumption mode to the normal mode in a predetermined case,
wherein the sensing unit counts the number of second detection signals, which satisfy a condition set by the threshold value, among all of the second detection signals and senses that the object does not touch the screen on the basis of the count result.

* * * * *